US 9,572,159 B2

(12) United States Patent
Nogami et al.

(10) Patent No.: US 9,572,159 B2
(45) Date of Patent: Feb. 14, 2017

(54) TERMINAL DEVICE, COMMUNICATION METHOD AND INTEGRATED CIRCUIT

(71) Applicant: Sharp Kabushiki Kaisha, Osaka-shi, Osaka (JP)

(72) Inventors: Toshizo Nogami, Osaka (JP); Shoichi Suzuki, Osaka (JP); Tatsushi Aiba, Osaka (JP); Kazunari Yokomakura, Osaka (JP); Kimihiko Imamura, Osaka (JP)

(73) Assignee: Sharp Kabushiki Kaisha, Sakai (JP)

( * ) Notice: Subject to any disclaimer, the term of this patent is extended or adjusted under 35 U.S.C. 154(b) by 0 days.

(21) Appl. No.: 14/440,635

(22) PCT Filed: Nov. 8, 2013

(86) PCT No.: PCT/JP2013/080343
§ 371 (c)(1),
(2) Date: May 5, 2015

(87) PCT Pub. No.: WO2014/073671
PCT Pub. Date: May 15, 2014

(65) Prior Publication Data
US 2015/0296513 A1    Oct. 15, 2015

(30) Foreign Application Priority Data

Nov. 9, 2012   (JP) ................................ 2012-246972

(51) Int. Cl.
*H04W 4/00* (2009.01)
*H04W 72/04* (2009.01)
(Continued)

(52) U.S. Cl.
CPC ............ *H04W 72/0453* (2013.01); *H04L 5/00* (2013.01); *H04L 5/0035* (2013.01); *H04W 28/18* (2013.01)

(58) Field of Classification Search
None
See application file for complete search history.

(56) References Cited

U.S. PATENT DOCUMENTS

| | | | |
|---|---|---|---|
| 2014/0092829 A1* | 4/2014 | Han | ...................... H04L 5/0053 370/329 |
| 2015/0181568 A1* | 6/2015 | Seo | ........................... H04L 5/00 370/329 |

(Continued)

OTHER PUBLICATIONS

Ericsson et al., "Resource Element Mapping for Support for CoMP Transmission," 3GPP TSG-RAN WG1 #70bis, R1-124535, Oct. 8, 2012, 2 pages.

(Continued)

*Primary Examiner* — Minh-Trang Nguyen
(74) *Attorney, Agent, or Firm* — Keating & Bennett, LLP

(57) ABSTRACT

A base station device and a terminal device determine resource element mapping in which a PDSCH is mapped and perform efficient communication. The terminal device uses a first parameter set among up to 4 parameter sets in order to determine resource element (RE) mapping for the PDSCH, when decoding the PDSCH based on detection of a Physical Downlink Control Channel (PDCCH) or an Enhanced Physical Downlink Control Channel (EPDCCH) with a Downlink Control Information (DCI) format 1A and transmitted on an antenna port 7, and determines RE mapping for the PDSCH by using the number of antenna ports for and/or a frequency position of a Cell-specific Reference Signal (CRS) in the serving cell when decoding the PDSCH based on detection of the PDCCH or the EPDCCH with the DCI format 1A and transmitted on antenna ports 0 to 3.

18 Claims, 24 Drawing Sheets

(51) Int. Cl.
*H04W 28/18* (2009.01)
*H04L 5/00* (2006.01)

(56) References Cited

U.S. PATENT DOCUMENTS

2015/0207601 A1\* 7/2015 Kim ..................... H04L 5/0048
                                                    370/329
2015/0223208 A1\* 8/2015 Park ...................... H04L 5/001
                                                    370/329

OTHER PUBLICATIONS

Suzuki et al.; "Terminal Device, Integrated Circuit, Radio Communication Method, and Base Station Device"; U.S. Appl. No. 14/440,148, filed May 1, 2015.

\* cited by examiner

FIG. 8

| Transmission mode | DCI format | Search Space | Transmission scheme of PDSCH corresponding to PDCCH |
|---|---|---|---|
| Mode 1 | DCI format 1A | Common and UE specific | Single-antenna port, port 0 |
|  | DCI format 1 | UE specific | Single-antenna port, port 0 |
| Mode 2 | DCI format 1A | Common and UE specific | Transmit diversity |
|  | DCI format 1 | UE specific | Transmit diversity |
| Mode 3 | DCI format 1A | Common and UE specific | Transmit diversity |
|  | DCI format 2A | UE specific | Large delay CDD or Transmit diversity |
| Mode 4 | DCI format 1A | Common and UE specific | Transmit diversity |
|  | DCI format 2 | UE specific | Closed-loop spatial multiplexing or Transmit diversity |
| Mode 5 | DCI format 1A | Common and UE specific | Transmit diversity |
|  | DCI format 1D | UE specific | Multi-user MIMO |
| Mode 6 | DCI format 1A | Common and UE specific | Transmit diversity |
|  | DCI format 1B | UE specific | Closed-loop spatial multiplexing using a single transmission layer |
| Mode 7 | DCI format 1A | Common and UE specific | If the number of PBCH antenna ports is one, Single-antenna port, port 0 is used, otherwise Transmit diversity |
|  | DCI format 1 | UE specific | Single-antenna port, port 5 |
| Mode 8 | DCI format 1A | Common and UE specific | If the number of PBCH antenna ports is one, Single-antenna port, port 0 is used, otherwise Transmit diversity |
|  | DCI format 2B | UE specific | Dual layer transmission, port 7 and 8 or single-antenna port, port 7 or 8 |
| Mode 9 | DCI format 1A | Common and UE specific | Single-antenna port, port 0 or 7, or Transmit diversity |
|  | DCI format 2C | UE specific | Up to 8 layer transmission, ports 7-14 |
| Mode 10 | DCI format 1A | Common and UE specific | Single-antenna port, port 0 or 7, or Transmit diversity |
|  | DCI format 2D | UE specific | Up to 8 layer transmission, ports 7-14 |

FIG. 9

| Transmission mode | DCI format | Search Space | Transmission scheme of PDSCH corresponding to EPDCCH |
|---|---|---|---|
| Mode 1 | DCI format 1A | UE specific | Single-antenna port, port 0 |
| | DCI format 1 | UE specific | Single-antenna port, port 0 |
| Mode 2 | DCI format 1A | UE specific | Transmit diversity |
| | DCI format 1 | UE specific | Transmit diversity |
| Mode 3 | DCI format 1A | UE specific | Transmit diversity |
| | DCI format 2A | UE specific | Large delay CDD or Transmit diversity |
| Mode 4 | DCI format 1A | UE specific | Transmit diversity |
| | DCI format 2 | UE specific | Closed-loop spatial multiplexing or Transmit diversity |
| Mode 5 | DCI format 1A | UE specific | Transmit diversity |
| | DCI format 1D | UE specific | Multi-user MIMO |
| Mode 6 | DCI format 1A | UE specific | Transmit diversity |
| | DCI format 1B | UE specific | Closed-loop spatial multiplexing using a single transmission layer |
| Mode 7 | DCI format 1A | UE specific | If the number of PBCH antenna ports is one, Single-antenna port, port 0 is used otherwise Transmit diversity |
| | DCI format 1 | UE specific | Single-antenna port, port 5 |
| Mode 8 | DCI format 1A | UE specific | If the number of PBCH antenna ports is one, Single-antenna port, port 0 is used, otherwise Transmit diversity |
| | DCI format 2B | UE specific | Dual layer transmission, port 7 and 8 or single-antenna port, port 7 or 8 |
| Mode 9 | DCI format 1A | UE specific | Single-antenna port, port 0 or 7, or Transmit diversity |
| | DCI format 2C | UE specific | Up to 8 layer transmission, ports 7-14 |
| Mode 10 | DCI format 1A | UE specific | Single-antenna port, port 0 or 7, or Transmit diversity |
| | DCI format 2D | UE specific | Up to 8 layer transmission, ports 7-14 |

FIG. 10

| Transmission Mode | DCI format | The starting OFDM symbol for the PDSCH of each cell, $l_{DataStart}$ |
|---|---|---|
| TM 1-9 | DCI format 1, 1A, 1B, 1C, 1D, 2, 2A, 2B or 2C | for a UE configured with transmission mode 1-9, or<br>○ if the UE is configured with carrier indicator field for the given serving cell and if PDSCH and the corresponding PDCCH/EPDCCH are received on different serving cells,<br>    • the higher-layer parameter *pdsch-Start* for the serving cell on which PDSCH is received<br>○ Else (if the UE is not configured with carrier indicator field for the given serving cell or if PDSCH and the corresponding PDCCH/EPDCCH are received on the same serving cell)<br>  − if the UE detected DCI format on EPDCCH and if the value for the higher-layer parameter *epdcch-Start* for the serving cell is configured by higher layers,<br>    • the higher-layer parameter *epdcch-Start* for the serving cell<br>  − if the UE detected DCI format on PDCCH, or<br>  − if the UE detected DCI format on EPDCCH and if no value for the higher-layer parameter *epdcch-Start* for the serving cell is configured by higher layers,<br>    • the span of the DCI given by the CFI of the serving cell |

FIG. 11

| Transmission Mode | DCI format | The starting OFDM symbol for the PDSCH of each cell, $l_{DataStart}$ |
|---|---|---|
| TM 10 | DCI format 1C | for a UE configured with transmission mode 10 with PDSCH corresponding to PDCCH with DCI format 1C<br>• the span of the DCI given by the CFI of the serving cell |

FIG. 12

| Transmission Mode | DCI format | The starting OFDM symbol for the PDSCH of each cell, $l_{DataStart}$. |
|---|---|---|
| TM 10 | DCI format 1A | for a UE configured with transmission mode 10 with PDSCH corresponding to PDCCH/EPDCCH with DCI format 1A<br>○ if the UE is configured with carrier indicator field for the given serving cell and if PDSCH and the corresponding PDCCH/EPDCCH are received on different serving cells,<br>    • the higher-layer parameter *pdsch-Start* for the serving cell on which PDSCH is received<br>○ Else (if the UE is not configured with carrier indicator field for the given serving cell or if PDSCH and the corresponding PDCCH/EPDCCH are received on the same serving cell)<br>    – if the UE detected DCI format on EPDCCH and if the value for the higher-layer parameter *epdcch-Start* for the serving cell is configured by higher layers,<br>        • the higher-layer parameter *epdcch-Start* for the serving cell or for the EPDCCH set on which EPDCCH was received<br>    – if the UE detected DCI format on PDCCH, or<br>    – if the UE detected DCI format on EPDCCH and if no value for the higher-layer parameter *epdcch-Start* for the serving cell is configured by higher layers,<br>        • the span of the DCI given by the CFI of the serving cell |

FIG. 13

| Transmission Mode | DCI format | The starting OFDM symbol for the PDSCH of each cell, /DataStart |
|---|---|---|
| TM 10 | DCI format 1A | for a UE configured with transmission mode 10 with PDSCH corresponding to PDCCH/EPDCCH with DCI format 1A<br>○ if the UE is configured with carrier indicator field for the given serving cell or if PDSCH and the corresponding PDCCH/EPDCCH are received on different serving cells,<br>　• the higher-layer parameter *pdsch-Start* for the serving cell on which PDSCH is received<br>○ Else (if the UE is not configured with carrier indicator field for the given serving cell and if PDSCH and the corresponding PDCCH/EPDCCH are received on the same serving cell)<br>　– if the value for the higher-layer parameter 'PDSCH starting position for PDSCH RE mapping' for the serving cell is 0, 1, 2, 3, or 4,<br>　　• the higher-layer parameter 'PDSCH starting position for PDSCH RE mapping' for DCI format 1A<br>　– if the value for the higher-layer parameter 'PDSCH starting position for PDSCH RE mapping' for the serving cell is 5,<br>　　• the span of the DCI given by the CFI of the serving cell |

FIG. 14

| Transmission Mode | DCI format | The starting OFDM symbol for the PDSCH of each cell, $l_{DataStart}$ |
|---|---|---|
| TM 10 | DCI format 1A | for a UE configured with transmission mode 10 with PDSCH corresponding to PDCCH/EPDCCH with DCI format 1A<br><br>○ if the UE is configured with carrier indicator field for the given serving cell and if PDSCH and the corresponding PDCCH/EPDCCH are received on different serving cells,<br><br>• the higher-layer parameter *pdsch-Start* for the serving cell on which PDSCH is received<br><br>○ Else (if the UE is not configured with carrier indicator field for the given serving cell or if PDSCH and the corresponding PDCCH/EPDCCH are received on the same serving cell)<br><br>  if the UE detected DCI format on EPDCCH and if the value for the higher layer parameter 'PDSCH starting position for PDSCH RE mapping' for the serving cell is 0, 1, 2, 3 or 4,<br><br>   the higher-layer parameter 'PDSCH starting position for PDSCH RE mapping' for DCI format 1A<br><br>  – if the UE detected DCI format on PDCCH, or<br><br>  – if the UE detected DCI format on EPDCCH and if the value for the higher-layer parameter 'PDSCH starting position for PDSCH RE mapping' for the serving cell is 5,<br><br>   the span of the DCI given by the CFI of the serving cell |

FIG. 15

| Transmission Mode | DCI format | The starting OFDM symbol for the PDSCH of each cell, $l_{DataStart}$ |
|---|---|---|
| TM 10 | DCI format 1A | for a UE configured with transmission mode 10 with PDSCH corresponding to PDCCH/EPDCCH with DCI format 1A<br>○ if the UE is configured with carrier indicator field for the given serving cell and if PDSCH and the corresponding PDCCH/EPDCCH are received on different serving cells,<br>• the higher-layer parameter *pdsch-Start* for the serving cell on which PDSCH is received<br>○ Else (if the UE is not configured with carrier indicator field for the given serving cell or if PDSCH and the corresponding PDCCH/EPDCCH are received on the same serving cell)<br>− if the UE detected DCI format on USS and if the value for the higher-layer parameter 'PDSCH starting position for PDSCH RE mapping' for the serving cell is 0, 1, 2, 3, or 4,<br>the higher-layer parameter 'PDSCH starting position for PDSCH RE mapping' for DCI format 1A<br>− if the UE detected DCI format on CSS, or<br>− if the UE detected DCI format on USS and if no value for the higher-layer parameter 'PDSCH starting position for PDSCH RE mapping' for the serving cell is 5,<br>the span of the DCI given by the CFI of the serving cell |

FIG. 16

| Transmission Mode | DCI format | The starting OFDM symbol for the PDSCH of each cell, $l_{DataStart}$ |
|---|---|---|
| TM 10 | DCI format 1A | for a UE configured with transmission mode 10 with PDSCH corresponding to PDCCH/EPDCCH with DCI format 1A<br><br>○ if the UE is configured with carrier indicator field for the given serving cell and if PDSCH and the corresponding PDCCH/EPDCCH are received on different serving cells,<br>    • the higher-layer parameter *pdsch-Start* for the serving cell on which PDSCH is received<br><br>○ Else (if the UE is not configured with carrier indicator field for the given serving cell or if PDSCH and the corresponding PDCCH/EPDCCH are received on the same serving cell)<br>    • if the value for the higher-layer parameter 'PDSCH starting position for PDSCH RE mapping' for the serving cell is 0, 1, 2, 3, or 4,<br>    • the higher-layer parameter 'PDSCH starting position for PDSCH RE mapping' for DCI format 1A<br>    – if the UE detected DCI format on EPDCCH and if the value for the higher-layer parameter 'PDSCH starting position for PDSCH RE mapping' for the serving cell is 5 and if the value for the higher-layer parameter *epdcch-Start* for the serving cell is configured by higher layers,<br>    • the higher-layer parameter *epdcch-Start* for the serving cell or for the EPDCCH set on which EPDCCH was received<br>    – if the UE detected DCI format on PDCCH and if the value for the higher-layer parameter 'PDSCH starting position for PDSCH RE mapping' for the serving cell is 5, or<br>    – if the UE detected DCI format on EPDCCH and if the value for the higher-layer parameter 'PDSCH starting position for PDSCH RE mapping' for the serving cell is 5 and if no value for the higher-layer parameter *epdcch-Start* for the serving cell is configured by higher layers,<br>    • the span of the DCI given by the CFI of the serving cell |

FIG. 17

| Transmission Mode | DCI format | The starting OFDM symbol for the PDSCH of each cell, $l_{DataStart}$ |
|---|---|---|
| TM 10 | DCI format 2D | for a UE configured with transmission mode 10 with PDSCH corresponding to PDCCH/EPDCCH with DCI format 2D<br><br>– if the value of the 'PDSCH starting position for PDSCH RE mapping' determined from the DCI format 2D for the serving cell on which PDSCH is received is 0, $l_{DataStart}$=0.<br><br>– if the value of the 'PDSCH starting position for PDSCH RE mapping' determined from the DCI format 2D for the serving cell on which PDSCH is received is 1, $l_{DataStart}$=1.<br><br>– if the value of the 'PDSCH starting position for PDSCH RE mapping' determined from the DCI format 2D for the serving cell on which PDSCH is received is 2, $l_{DataStart}$=2.<br><br>– if the value of the 'PDSCH starting position for PDSCH RE mapping' determined from the DCI format 2D for the serving cell on which PDSCH is received is 3, $l_{DataStart}$=3.<br><br>– if the value of the 'PDSCH starting position for PDSCH RE mapping' determined from the DCI format 2D for the serving cell on which PDSCH is received is 4, $l_{DataStart}$=4.<br><br>– if the value of the 'PDSCH starting position for PDSCH RE mapping' determined from the DCI format 2D for the serving cell on which PDSCH is received is 5, $l_{DataStart}$ is given by,<br><br>o if the UE is configured with carrier indicator field for the given serving cell and if PDSCH and the corresponding PDCCH/EPDCCH are received on different serving cells,<br>• the higher-layer parameter *pdsch-Start* for the serving cell on which PDSCH is received<br><br>o Else (if the UE is not configured with carrier indicator field for the given serving cell or if PDSCH and the corresponding PDCCH/EPDCCH are received on the same serving cell)<br>– if the UE detected DCI format on EPDCCH and if the value for the higher-layer parameter *epdcch-Start* for the serving cell is configured by higher layers,<br>• the higher-layer parameter *epdcch-Start* for the serving cell or for the EPDCCH set on which EPDCCH was received<br>– if the UE detected DCI format on PDCCH, or<br>– if the UE detected DCI format on EPDCCH and if no value for the higher-layer parameter *epdcch-Start* for the serving cell is configured by higher layers,<br>• the span of the DCI given by the CFI of the serving cell<br><br>– if the subframe is indicated by the 'MBSFN subframe configuration for PDSCH RE mapping' determined from the DCI format 2D for the serving cell on which PDSCH is received, $l_{DataStart}$=min(2, $l_{DataStart}$), otherwise $l_{DataStart}$=$l_{DataStart}$ |

FIG. 18

| Transmission Mode | DCI format | The starting OFDM symbol for the PDSCH of each cell, $l_{DataStart}$ |
|---|---|---|
| TM 10 | DCI format 2D | for a UE configured with transmission mode 10 with PDSCH corresponding to PDCCH/EPDCCH with DCI format 2D<br>– if the value of the 'PDSCH starting position for PDSCH RE mapping' determined from the DCI format 2D for the serving cell on which PDSCH is received is 0, $l_{DataStart}$=0,<br>– if the value of the 'PDSCH starting position for PDSCH RE mapping' determined from the DCI format 2D for the serving cell on which PDSCH is received is 1, $l_{DataStart}$=1,<br>– if the value of the 'PDSCH starting position for PDSCH RE mapping' determined from the DCI format 2D for the serving cell on which PDSCH is received is 2, $l_{DataStart}$=2,<br>– if the value of the 'PDSCH starting position for PDSCH RE mapping' determined from the DCI format 2D for the serving cell on which PDSCH is received is 3, $l_{DataStart}$=3,<br>– if the value of the 'PDSCH starting position for PDSCH RE mapping' determined from the DCI format 2D for the serving cell on which PDSCH is received is 4, $l_{DataStart}$=4,<br>– if the value of the 'PDSCH starting position for PDSCH RE mapping' determined from the DCI format 2D for the serving cell on which PDSCH is received is 5, $l_{DataStart}$=5 is given by,<br>○ if the UE is configured with carrier indicator field for the given serving cell and if PDSCH and the corresponding PDCCH/EPDCCH are received on different serving cells,<br>    • the higher-layer parameter *pdsch-Start* for the serving cell on which PDSCH is received<br>○ Else (if the UE is not configured with carrier indicator field for the given serving cell or if PDSCH and the corresponding PDCCH/EPDCCH are received on the same serving cell)<br>  – if the value for the higher-layer parameter 'PDSCH starting position for PDSCH RE mapping' for DCI format 1A is 0, 1, 2, 3, or 4,<br>    • the higher-layer parameter 'PDSCH starting position for PDSCH RE mapping' for DCI format 1A<br>  – if the value for the higher-layer parameter 'PDSCH starting position for PDSCH RE mapping' for DCI format 1A is 5,<br>    • the span of the DCI given by the CFI of the serving cell<br>– if the subframe is indicated by the 'MBSFN subframe configuration for PDSCH RE mapping' determined from the DCI format 2D for the serving cell on which PDSCH is received or if the subframe is indicated by the 'MBSFN subframe configuration for PDSCH RE mapping for DCI format 1A, $l_{DataStart}$=min(2, $l_{DataStart}$), otherwise $l_{DataStart}$=$l_{DataStart}$ |

FIG. 19

| Transmission Mode | DCI format | The starting OFDM symbol for the PDSCH of each cell, $l_{DataStart}$ |
|---|---|---|
| TM 10 | DCI format 2D | for a UE configured with transmission mode 10 with PDSCH corresponding to PDCCH/EPDCCH with DCI format 2D<br><br>- if the value of the 'PDSCH starting position for PDSCH RE mapping' determined from the DCI format 2D for the serving cell on which PDSCH is received is 0, $l_{DataStart}=0$,<br>- if the value of the 'PDSCH starting position for PDSCH RE mapping' determined from the DCI format 2D for the serving cell on which PDSCH is received is 1, $l_{DataStart}=1$,<br>- if the value of the 'PDSCH starting position for PDSCH RE mapping' determined from the DCI format 2D for the serving cell on which PDSCH is received is 2, $l_{DataStart}=2$,<br>- if the value of the 'PDSCH starting position for PDSCH RE mapping' determined from the DCI format 2D for the serving cell on which PDSCH is received is 3, $l_{DataStart}=3$,<br>- if the value of the 'PDSCH starting position for PDSCH RE mapping' determined from the DCI format 2D for the serving cell on which PDSCH is received is 4, $l_{DataStart}=4$,<br>- if the value of the 'PDSCH starting position for PDSCH RE mapping' determined from the DCI format 2D for the serving cell on which PDSCH is received is 5, $l_{DataStart}$ is given by,<br><br>o if the UE is configured with carrier indicator field for the given serving cell and if PDSCH and the corresponding PDCCH/EPDCCH are received on different serving cells.<br><br>- the higher-layer parameter $pdsch\text{-}Start$ for the serving cell on which PDSCH is received<br><br>o Else (if the UE is not configured with carrier indicator field for the given serving cell or if PDSCH and the corresponding PDCCH/EPDCCH are received on the same serving cell)<br><br>- if the UE detected DCI format on EPDCCH and if the value for the higher-layer parameter 'PDSCH starting position for PDSCH RE mapping' for DCI format 1A is 0, 1, 2, 3, or 4,<br><br>the higher-layer parameter 'PDSCH starting position for PDSCH RE mapping' for DCI format 1A<br><br>- if the UE detected DCI format on PDCCH, or<br>- if the UE detected DCI format on EPDCCH and if the value for the higher-layer parameter 'PDSCH starting position for PDSCH RE mapping' for DCI format 1A is 5,<br><br>the span of the DCI given by the CFI of the serving cell<br><br>- if the subframe is indicated by the 'MBSFN subframe configuration for PDSCH RE mapping' determined from the DCI format 2D for the serving cell on which PDSCH is received or if the subframe is indicated by the 'MBSFN subframe configuration for PDSCH RE mapping' for DCI format 1A, $l_{DataStart}=\min(2, l_{DataStart})$, otherwise $l_{DataStart}=l_{DataStart}$ |

FIG. 20

| Transmission Mode | DCI format | The starting OFDM symbol for the PDSCH of each cell, $l_{DataStart}$ |
|---|---|---|
| | | for a UE configured with transmission mode 10 with PDSCH corresponding to PDCCH/EPDCCH with DCI format 2D<br>- if the value of the 'PDSCH starting position for PDSCH RE mapping' determined from the DCI format 2D for the serving cell on which PDSCH is received is 0, $l'_{DataStart}=0$,<br>- if the value of the 'PDSCH starting position for PDSCH RE mapping' determined from the DCI format 2D for the serving cell on which PDSCH is received is 1, $l'_{DataStart}=1$,<br>- if the value of the 'PDSCH starting position for PDSCH RE mapping' determined from the DCI format 2D for the serving cell on which PDSCH is received is 2, $l'_{DataStart}=2$,<br>- if the value of the 'PDSCH starting position for PDSCH RE mapping' determined from the DCI format 2D for the serving cell on which PDSCH is received is 3, $l'_{DataStart}=3$,<br>- if the value of the 'PDSCH starting position for PDSCH RE mapping' determined from the DCI format 2D for the serving cell on which PDSCH is received is 4, $l'_{DataStart}=4$,<br>- if the value of the 'PDSCH starting position for PDSCH RE mapping' determined from the DCI format 2D for the serving cell on which PDSCH is received is 5, $l'_{DataStart}=5$ is given by,<br>o if the UE is configured with carrier indicator field for the given serving cell and if PDSCH and the corresponding PDCCH/EPDCCH are received on different serving cells, |
| TM 10 | DCI format 2D | • the higher-layer parameter $pdsch$-$Start$ for the serving cell on which PDSCH is received<br>o Else (if the UE is not configured with carrier indicator field for the given serving cell or if PDSCH and the corresponding PDCCH/EPDCCH are received on the same serving cell)<br>- if the value for the higher-layer parameter 'PDSCH starting position for PDSCH RE mapping,' for DCI format 1A is 0, 1, 2, 3, or 4,<br>  • the higher-layer parameter 'PDSCH starting position for PDSCH RE mapping' for DCI format 1A<br>- if the UE detected DCI format on EPDCCH and if the value for the higher-layer parameter 'PDSCH starting position for PDSCH RE mapping,' for DCI format 1A is 5 and if the value for the higher-layer parameter $epdcch$-$Start$ for the serving cell is configured by higher layers,<br>  • the higher-layer parameter $epdcch$-$Start$ for the serving cell or for the EPDCCH set on which EPDCCH was received<br>- if the UE detected DCI format on PDCCH and if the value for the higher-layer parameter 'PDSCH starting position for PDSCH RE mapping,' for DCI format 1A is 5, or<br>  if the UE detected DCI format on EPDCCH and if the value for the higher-layer parameter 'PDSCH starting position for PDSCH RE mapping,' for DCI format 1A is 5 and if no value for the higher-layer parameter $epdcch$-$Start$ for the serving cell is configured by higher layers,<br>  • the span of the DCI given by the CFI of the serving cell<br>- if the subframe is indicated by the 'MBSFN subframe configuration for PDSCH RE mapping,' determined from the DCI format 2D for the serving cell on which PDSCH is received or if the subframe is indicated by the 'MBSFN subframe configuration for PDSCH RE mapping' for DCI format 1A, $l'_{DataStart}=\min(2, l'_{DataStart})$, otherwise $l'_{DataStart}=l'_{DataStart}$ |

FIG. 21

| Transmission Mode | DCI format | The starting OFDM symbol for the PDSCH of each cell, $l_{DataStart}$ |
|---|---|---|
| TM 10 | DCI format 1A | for a UE configured with transmission mode 10 with PDSCH corresponding to PDCCH/EPDCCH with DCI format 1A,<br><br>if PDSCH is transmitted by antenna port 0-3<br>• the span of the DCI given by the CFI of the serving cell<br><br>if PDSCH is transmitted by antenna port 7<br>- if the value of the 'PDSCH starting position for PDSCH RE mapping' corresponding to DCI format 1A for the serving cell on which PDSCH is received is 0, $l_{DataStart}$=0,<br>- if the value of the 'PDSCH starting position for PDSCH RE mapping' corresponding to DCI format 1A for the serving cell on which PDSCH is received is 1, $l_{DataStart}$=1,<br>- if the value of the 'PDSCH starting position for PDSCH RE mapping' corresponding to DCI format 1A for the serving cell on which PDSCH is received is 2, $l_{DataStart}$=2,<br>- if the value of the 'PDSCH starting position for PDSCH RE mapping' corresponding to DCI format 1A for the serving cell on which PDSCH is received is 3, $l_{DataStart}$=3,<br>- if the value of the 'PDSCH starting position for PDSCH RE mapping' corresponding to DCI format 1A for the serving cell on which PDSCH is received is 4, $l_{DataStart}$=4,<br>- if the value of the 'PDSCH starting position for PDSCH RE mapping' corresponding to DCI format 1A for the serving cell on which PDSCH is received is 5, $l_{DataStart}$=is given by,<br>◦ if the UE is configured with carrier indicator field for the given serving cell and if PDSCH and the corresponding PDCCH/EPDCCH are received on different serving cells,<br>• the higher-layer parameter *pdsch-Start* for the serving cell on which PDSCH is received<br>◦ Else (if the UE is not configured with carrier indicator field for the given serving cell or if PDSCH and the corresponding PDCCH/EPDCCH are received on the same serving cell)<br>• the span of the DCI given by the CFI of the serving cell<br>- if the subframe is indicated by the 'MBSFN subframe configuration for PDSCH RE mapping' for DCI format 1A, $l_{DataStart}$=min(2, $l'_{DataStart}$), otherwise $l_{DataStart}$=$l'_{DataStart}$. |

FIG. 22

| Transmission Mode | DCI format | The starting OFDM symbol for the PDSCH of each cell, $l_{DataStart}$ |
|---|---|---|
| TM 10 | DCI format 1A | for a UE configured with transmission mode 10 with PDSCH corresponding to PDCCH/EPDCCH with DCI format 1A,<br><br>if PDSCH is transmitted by antenna port 0-3<br>  • the span of the DCI given by the CFI of the serving cell<br><br>if PDSCH is transmitted by antenna port 7<br>  – if the value of the 'PDSCH starting position for PDSCH RE mapping' corresponding to DCI format 1A for the serving cell on which PDSCH is received is 0. $l_{DataStart}=0$,<br>  – if the value of the 'PDSCH starting position for PDSCH RE mapping' corresponding to DCI format 1A for the serving cell on which PDSCH is received is 1. $l_{DataStart}=1$,<br>  – if the value of the 'PDSCH starting position for PDSCH RE mapping' corresponding to DCI format 1A for the serving cell on which PDSCH is received is 2, $l_{DataStart}=2$,<br>  – if the value of the 'PDSCH starting position for PDSCH RE mapping' corresponding to DCI format 1A for the serving cell on which PDSCH is received is 3. $l_{DataStart}=3$,<br>  – if the value of the 'PDSCH starting position for PDSCH RE mapping' corresponding to DCI format 1A for the serving cell on which PDSCH is received is 4. $l_{DataStart}=4$,<br>  – if the value of the 'PDSCH starting position for PDSCH RE mapping' corresponding to DCI format 1A for the serving cell on which PDSCH is received is 5. $l_{DataStart}=5$ is given by,<br>  ◦ if the UE is configured with carrier indicator field for the given serving cell and if PDSCH and the corresponding PDCCH/EPDCCH are received on different serving cells,<br>    • the higher-layer parameter *pdsch-Start* for the serving cell on which PDSCH is received<br>  ◦ Else (if the UE is not configured with carrier indicator field for the given serving cell or if PDSCH and the corresponding PDCCH/EPDCCH are received on the same serving cell)<br>    – if the UE detected DCI format on EPDCCH and if the value for the higher-layer parameter *epdcch-Start* for the serving cell is configured by higher layers,<br>      • the higher-layer parameter *epdcch-Start* for the serving cell or for the EPDCCH set on which EPDCCH was received<br>    – if the UE detected DCI format on PDCCH, or<br>    – if the UE detected DCI format on EPDCCH and if no value for the higher-layer parameter *epdcch-Start* for the serving cell is configured by higher layers,<br>      • the span of the DCI given by the CFI of the serving cell<br>  – if the subframe is indicated by the 'MBSFN subframe configuration for PDSCH RE mapping' for DCI format 1A. $l_{DataStart}=\min(2, l_{DataStart})$, otherwise $l_{DataStart}=l_{DataStart}$ |

TERMINAL DEVICE, COMMUNICATION METHOD AND INTEGRATED CIRCUIT

TECHNICAL FIELD

The present invention relates to a terminal device, a communication method, and an integrated circuit.

BACKGROUND ART

In the 3rd Generation Partnership Project (3GPP), a radio access method and a radio network for cellular mobile communication (hereinafter referred to as "Long Term Evolution (LTE)," or "Evolved Universal Terrestrial Radio Access (EUTRA)") have been considered. In LTE, an Orthogonal Frequency Division Multiplexing (OFDM) scheme is used as a downlink communication scheme. In LTE, a Single-Carrier Frequency Division Multiple Access (SC-FDMA) scheme is used as an uplink communication scheme. In LTE, a base station device is referred to as an evolved NodeB (eNodeB) and a mobile station device (a terminal device) is referred to as User Equipment (UE). LTE is a cellular communication system in which the area covered by a base station device is divided in a cellular pattern into multiple cells. A single base station device may manage multiple cells. A single mobile station device performs communication in single or multiple cells. A cell that is used for communication is also referred to as a serving cell.

In LTE, a physical downlink shared channel (PDSCH) is used for data transmission from the base station device to a mobile station device. Furthermore, in the 3GPP, the support of a coordinated multi-point transmission and reception (CoMP) transfer scheme in which multiple base station devices mutually cooperate to perform interference coordination has been considered.

It is proposed that, in such radio communication system, in addition to determining a starting position of a resource element to which the PDSCH is mapped based on information (a control format indicator (CFI)) that is transmitted on a Physical Control Format Indicator Channel (PCFICH), the starting position is included as part of PDSCH resource element mapping configuration (NPL 1).

CITATION LIST

NPL 1: "Resource Element Mapping for support of CoMP Transmission", R1-124535, 3GPP TSG-RAN WG1 Meeting #70bis, 8-12 Oct. 2012.

DISCLOSURE OF THE INVENTION

Problems to be Solved by the Invention

However, in the radio communication system described above, there is no description of a specific procedure for determining resource element mapping in which the PDSCH is mapped.

The present invention is made in view of the problem described above and aims to provide a terminal device, a communication method, and an integrated circuit, in which a base station device and a terminal device determine resource element mapping in which a PDSCH is mapped, and perform efficient communication.

Means for Solving the Problems (1) The present invention is made to deal with the above-described problem, and a terminal device according to an aspect of the present invention is a terminal device that communicates with a base station device, the terminal device including: a configuration unit that configures a transmission mode 10 in a serving cell and up to 4 parameter sets based on a higher layer signal; and a decoding unit that decodes a Physical Downlink Shared Channel (PDSCH). The decoding unit uses a first parameter set among the up to 4 parameter sets in order to determine resource element (RE) mapping for the PDSCH, when decoding the PDSCH based on detection of a Physical Downlink Control Channel (PDCCH) or an Enhanced Physical Downlink Control Channel (EPDCCH) with a Downlink Control Information (DCI) format 1A and transmitted on an antenna port 7, and determines RE mapping for the PDSCH by using the number of antenna ports for and/or a frequency position of a Cell-specific Reference Signal (CRS) in the serving cell when decoding the PDSCH based on detection of the PDCCH or the EPDCCH with the DCI format 1A and transmitted on antenna ports 0 to 3. Each of the up to 4 parameter sets 1 includes a parameter relating to the number of the CRS ports, a parameter relating to the CRS frequency position, and/or a parameter relating to a Multimedia Broadcast multicast service over a Single Frequency Network (MBSFN) subframe.

(2) Furthermore, in the terminal device according to the aspect of the present invention, the decoding unit may use the first parameter set in order to determine the RE mapping for the PDSCH when decoding the PDSCH based on detection of the PDCCH or the EPDCCH with the DCI format 1A with CRC parity bits scrambled with a terminal identity (SPS C-RNTI) for semi-static scheduling.

(3) Furthermore, in the terminal device according to the aspect of the present invention, each of the up to 4 parameter sets 1 can further include a parameter relating to quasi co-location of an antenna port for the PDSCH.

(4) Furthermore, in the terminal device according to the aspect of the present invention, the transmission mode 10 may be a transmission mode in which a plurality of channel state information reference signals can be configured.

(5) Furthermore, in the terminal device according to the aspect of the present invention, the DCI format 1A may be a DCI format which can be used in any of transmission modes.

(6) A communication method according to an aspect of the present invention is a communication method for use in a terminal device that communicates with a base station device, the communication method including: a step of configuring a transmission mode 10 in a serving cell based on a higher layer signal; a step of configuring up to 4 parameter sets; and a step of decoding a Physical Downlink Shared Channel (PDSCH), in which a first parameter set among the up to 4 parameter sets is used in order to determine resource element (RE) mapping for the PDSCH, when decoding the PDSCH based on detection of a Physical Downlink Control Channel (PDCCH) or an Enhanced Physical Downlink Control Channel (EPDCCH) with a Downlink Control Information (DCI) format 1A and transmitted on an antenna port 7, and RE mapping for the PDSCH is determined using a position of a Cell-specific Reference Signal (CRS) in the serving cell when decoding the PDSCH based on detection of the PDCCH or the EPDCCH with the DCI format 1A and transmitted on antenna ports 0 to 3, and in which each of the up to 4 parameter sets 1 includes a parameter relating to the number of the CRS ports, a parameter relating to the CRS frequency position, and/or a parameter relating to a Multimedia Broadcast multicast service over a Single Frequency Network (MBSFN) subframe.

(7) An integrated circuit according to an aspect of the present invention is an integrated circuit in a terminal device that communicates with a base station device, the integrated circuit being configured to perform: configuring a transmission mode 10 in a serving cell based on a higher layer signal; configuring up to 4 parameter sets; and decoding a Physical Downlink Shared channel (PDSCH), in which a first parameter set among the up to 4 parameter sets is used in order to determine resource element (RE) mapping for the PDSCH, when decoding the PDSCH based on detection of a Physical Downlink Control Channel (PDCCH) or an Enhanced Physical Downlink Control Channel (EPDCCH) with a Downlink Control Information (DCI) format 1A and transmitted on an antenna port 7, and RE mapping for the PDSCH is determined using a position of a Cell-specific Reference Signal (CRS) in the serving cell when decoding the PDSCH based on detection of the PDCCH or the EPDCCH with the DCI format 1A and transmitted on antenna ports 0 to 3, and in which each of the up to 4 parameter sets 1 includes a parameter relating to the number of the CRS ports, a parameter relating to the CRS frequency position, and/or a parameter relating to a Multimedia Broadcast multicast service over a Single Frequency Network (MBSFN) subframe.

Effects of the Invention

According to the present invention, a base station device and a terminal device can determine resource element mapping in which a PDSCH is mapped, and can perform efficient communication.

BRIEF DESCRIPTION OF THE DRAWINGS

FIG. 8 is a first table for describing a transmission mode according to the present embodiment.

FIG. 9 is a second table for describing the transmission mode according to the present embodiment.

FIG. 10 is a diagram for describing a starting position of an OFDM symbol to which a PDSCH for a mobile station device 1 configured with any one of transmission modes 1 to 9 for a certain cell is mapped, according to the present embodiment.

FIG. 11 is a diagram for describing the starting position of the OFDM symbol to which the PDSCH, which is scheduled by a DCI format 1C, for the mobile station device 1 configured with a transmission mode 10 for a certain cell, is mapped, according to the present embodiment.

FIG. 12 is a diagram for describing a first example of the starting position of the OFDM symbol to which the PDSCH, which is scheduled by a DCI format 1A, for the mobile station device 1 configured with the transmission mode 10 for a certain cell, is mapped, according to the present embodiment.

FIG. 13 is a diagram for describing a second example of the starting position of the OFDM symbol to which the PDSCH, which is scheduled by the DCI format 1A, for the mobile station device 1 configured with the transmission mode 10 for a certain cell, is mapped, according to the present embodiment.

FIG. 14 is a diagram for describing a third example of the starting position of the OFDM symbol to which the PDSCH, which is scheduled by the DCI format 1A, for the mobile station device 1 configured with the transmission mode 10 for a certain cell, is mapped, according to the present embodiment.

FIG. 15 is a diagram for describing a fourth example of the starting position of the OFDM symbol to which the PDSCH, which is scheduled by the DCI format 1A, for the mobile station device 1 configured with the transmission mode 10 for a certain cell, is mapped, according to the present embodiment.

FIG. 16 is a diagram for describing a fifth example of the starting position of the OFDM symbol to which the PDSCH, which is scheduled by the DCI format 1A, for the mobile station device 1 configured with the transmission mode 10 for a certain cell, is mapped, according to the present embodiment.

FIG. 17 is a diagram for describing a first example of the starting position of the OFDM symbol to which the PDSCH, which is scheduled by a DCI format 2D, for the mobile station device 1 configured with the transmission mode 10 for a certain cell, is mapped, according to the present embodiment.

FIG. 18 is a diagram for describing a second example of the starting position of the OFDM symbol to which the PDSCH, which is scheduled by the DCI format 2D, for the mobile station device 1 configured with the transmission mode 10 for a certain cell, is mapped, according to the present embodiment.

FIG. 19 is a diagram for describing a third example of the starting position of the OFDM symbol to which the PDSCH, which is scheduled by the DCI format 2D, for the mobile station device 1 configured with the transmission mode 10 for a certain cell, is mapped, according to the present embodiment.

FIG. 20 is a diagram for describing a fourth example of the starting position of the OFDM symbol to which the PDSCH, which is scheduled by the DCI format 2D, for the mobile station device 1 configured with the transmission mode 10 for a certain cell, is mapped, according to the present embodiment.

FIG. 21 is a diagram for describing a sixth example of the starting position of the OFDM symbol to which the PDSCH, which is scheduled by the DCI format 1A, for the mobile station device 1 configured with the transmission mode 10 for a certain cell, is mapped, according to the present embodiment.

FIG. 22 is a diagram for describing a seventh example of the starting position of the OFDM symbol to which the PDSCH, which is scheduled by the DCI format 1A, for the mobile station device 1 configured with the transmission mode 10 for a certain cell, is mapped, according to the present embodiment.

MODE FOR CARRYING OUT THE INVENTION

Embodiments of the present invention will be described below.

According to the present embodiment, a mobile station device performs transmission and reception in multiple cells at the same time. A technology in which a mobile station device communicates with multiple cells is referred to as a cell aggregation or a carrier aggregation. The present invention may be applied to each of the multiple cells that are aggregated. Furthermore, the present invention may be applied to some of the multiple cells that are aggregated.

One serving cell among multiple serving cells is a primary cell (PCell). The primary cell is a cell in which a mobile station device 1 performs an initial connection establishment procedure, a cell in which the mobile station device 1 starts a connection re-establishment procedure, or a cell that is designated as the primary cell while a handover procedure is in progress.

The serving cells excluding the primary cell from multiple serving cells are secondary cells (SCell). The secondary cells are used for providing additional radio resources. The secondary cells are used mainly to transmit and receive a PDSCH, a PUSCH, and a PRACH. The secondary cells operate at frequencies different from the frequency at which the primary cell operates, and are added by a base station device 3 after establishing a connection between the mobile station device 1 and the base station device 3. Furthermore, the mobile station device 1 is notified of the secondary cell by the base station device 3 while the handover procedure is in progress.

Even if the mobile station device performs the transmission and the reception in a single cell, the present invention may be applied.

The present embodiment will be described below referring to a Frequency Division Duplex (FDD) mode radio communication system. However, the present invention also can be applied to a Time Division Duplex (TDD) mode radio communication system. Furthermore, the present invention also can be applied to a radio communication system in which a cell that uses the TDD mode and a cell that uses the FDD mode are aggregated.

Figure 1:
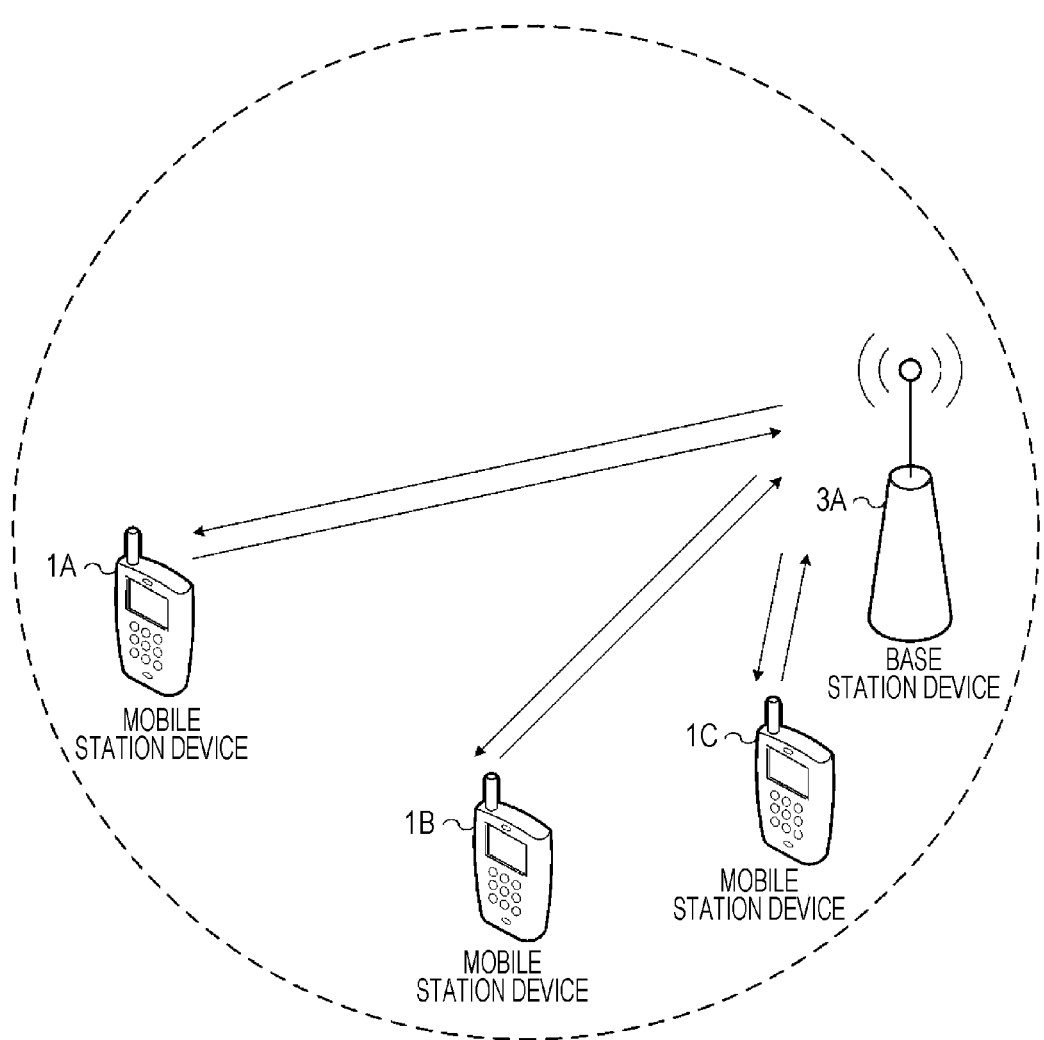
FIG. 1 is a schematic diagram of a radio communication system according to the present embodiment.

FIG. 1 is a schematic diagram of a radio communication system according to the present embodiment. In FIG. 1, the radio communication system includes mobile station devices 1A to 1C, and a base station device 3. The mobile station devices 1A to 1C are hereinafter referred to as a mobile station device 1.

A physical channel and a physical signal according to the present embodiment will be described below.

In FIG. 1, the following uplink physical channels are used for uplink radio communication from the mobile station device 1 to the base station device 3. The uplink physical channel is used to transmit information that is output from a higher layer.

Physical Uplink Control Channel (PUCCH)
Physical Uplink Shared Channel (PUSCH)
Physical Random Access Channel (PRACH)

The PUCCH is used to transmit the Uplink Control Information (UCI). A HARQ-ACK (HARQ feedback, response information) to a Downlink-Shared Channel (DL-SCH) is included in the Uplink Control Information.

The PUSCH is used to transmit an Uplink-Shared Channel (UL-SCH). The PUSCH may be used to transmit the Uplink Control Information, along with uplink data. PUSCH may be used to transmit only the uplink control information.

The PRACH is used to transmit a random access preamble. A main object of the PRACH is for the mobile station device 1 to be synchronized to the base station device 3 in terms of a time domain.

In FIG. 1, the following uplink physical signal is used for the uplink radio communication. The uplink physical signal is not used to transmit the information that is output from the higher layer, but is used by a physical layer.

Uplink Reference Signal (UL RS)

According to the present embodiment, two types of uplink reference signal are used as follows.

Demodulation Reference Signal (DMRS)
Sounding Reference Signal (SRS)

The DMRS is associated with transmission of the PUSCH or the PUCCH. The DMRS is time-multiplexed together with the PUSCH or the PUCCH. The base station device 3 performs demodulation processing of the PUSCH or the PUCCH by using the DMRS. Transmission of the PUSCH and the DMRS taken together is hereinafter simply also referred to as transmission of the PUSCH. Transmission of the PUCCH and the DMRS taken together is hereinafter simply also referred to as transmission of the PUCCH.

The SRS is not associated with the transmission of the PUSCH or the PUCCH. The base station device 3 uses the SRS in order to measure an uplink channel state. A symbol that is transmitted by the SRS is also referred to as a sounding reference symbol. The SRS will be described in detail below.

In FIG. 1, the following downlink physical channels are used for downlink radio communication from the base station device 3 to the mobile station device 1. The downlink physical channels are used to transmit the information that is output from the higher layer.

Physical Broadcast Channel (PBCH)
Physical Control Format Indicator Channel (PCFICH)
Physical Hybrid automatic repeat request Indicator Channel (PHICH)
Physical Downlink Control Channel (PDCCH)
Enhanced Physical Downlink Control Channel (EPDCCH)
Physical Downlink Shared Channel (PDSCH)
Physical Multicast Channel (PMCH)

The PBCH is used to broadcast system information (Broadcast Channel (BCH)) that is used in common in the mobile station device 1. The PBCH is transmitted at an interval of 40 ms. Timings at an interval of 40 ms are blind-detected in the mobile station device 1. Furthermore, the PBCH is retransmitted at an interval of 10 ms.

The PCFICH is used to transmit information indicating a region (OFDM symbols) reserved for transmission of the PDCCH. Such information is referred to as a Control Format Indicator (CFI). In a case where the number of OFDM symbols that are used for the transmission of the PDCCH in a certain subframe is greater than 0, the PCFICH is transmitted in the certain subframe.

In a case where a cell bandwidth is greater than 11 physical resource blocks, the number of OFDM symbols that are used for the transmission of the PDCCH (DCI) in a certain subframe is equal to a value of the CFI that is transmitted on the PCFICH in the certain subframe. In a case where the cell bandwidth is 10 physical resource blocks or smaller, the number of OFDM symbols that are used for the transmission of the PDCCH (the DCI) is one greater than the value of the CFI that is transmitted on the PCFICH in the certain subframe.

Moreover, "the number of OFDM symbols that are used for the transmission of the PDCCH (the DCI)" is also referred to as "a span of the DCI." The span of the DCI for a certain cell is determined based on the CFI that is transmitted on the PCFICH in the certain subframe.

The PHICH is used to transmit a HARQ indicator (the HARQ feedback, the response information) indicating the HARQ-ACK to an Uplink Shared Channel (UL-SCH) that is received by the base station device 3. For example, in a case where the mobile station device 1 receives the HARQ indicator indicating an ACK, corresponding uplink data is not retransmitted. For example, in a case where the mobile station device 1 receives the HARQ indicator indicating a NACK, the corresponding uplink data is retransmitted.

The PDCCH and the EPDCCH are used to transmit downlink control information (DCI). The downlink control information is also referred to as a DCI format. The downlink control information includes a downlink grant (downlink assignment, or also referred to as "downlink assignment") and an uplink grant. The downlink grant is the downlink control information that is used for scheduling of a single PDSCH within a single cell. The downlink grant is used in the scheduling of the PDSCH within a subframe that is the same as the subframe in which the downlink grant is transmitted. The uplink grant is the downlink control information that is used for scheduling of a single PUSCH within a single cell. The uplink grant is used for the scheduling of the single PUSCH within the fourth or later subframe after the subframe in which the uplink grant is transmitted.

The PDSCH is used to transmit downlink data (Downlink Shared Channel (DL-SCH)).

The PMCH is used to transmit a Multicast Channel (MCH).

In FIG. 1, the following downlink physical signals are used for the downlink radio communication. The downlink physical signal is not used to transmit the information that is output from the higher layer, but is used by the physical layer.

Synchronization Signal (SS)
Downlink Reference Signal (DL RS)

The synchronization signal is used in order for the mobile station device 1 to be synchronized in terms of downlink frequency and time domains.

The downlink reference signal is used in order for the mobile station device 1 to perform channel reconfiguration of the downlink physical channel. The downlink reference signal is used in order for the mobile station device 1 to calculate downlink channel state information.

The downlink physical channel and the downlink physical signal are collectively referred to as a downlink signal. The uplink physical channel and the uplink physical signal are collectively referred to as an uplink signal. The downlink physical channel and the uplink physical channel are collectively referred to as a physical channel. The downlink physical signal and the uplink physical signal are collectively referred to as a physical signal.

The physical channel and the physical signal are not transmitted over multiple cells. The physical channel and the physical signal are transmitted in any one cell.

A BCH, a UL-SCH, and a DL-SCH are transport channels. A channel that is used in a Medium Access Control (MAC) layer is referred to as a transport channel. Furthermore, the transport channel is also referred to as a transport block.

A configuration of a radio frame according to the present embodiment will be described below.

Figure 2:
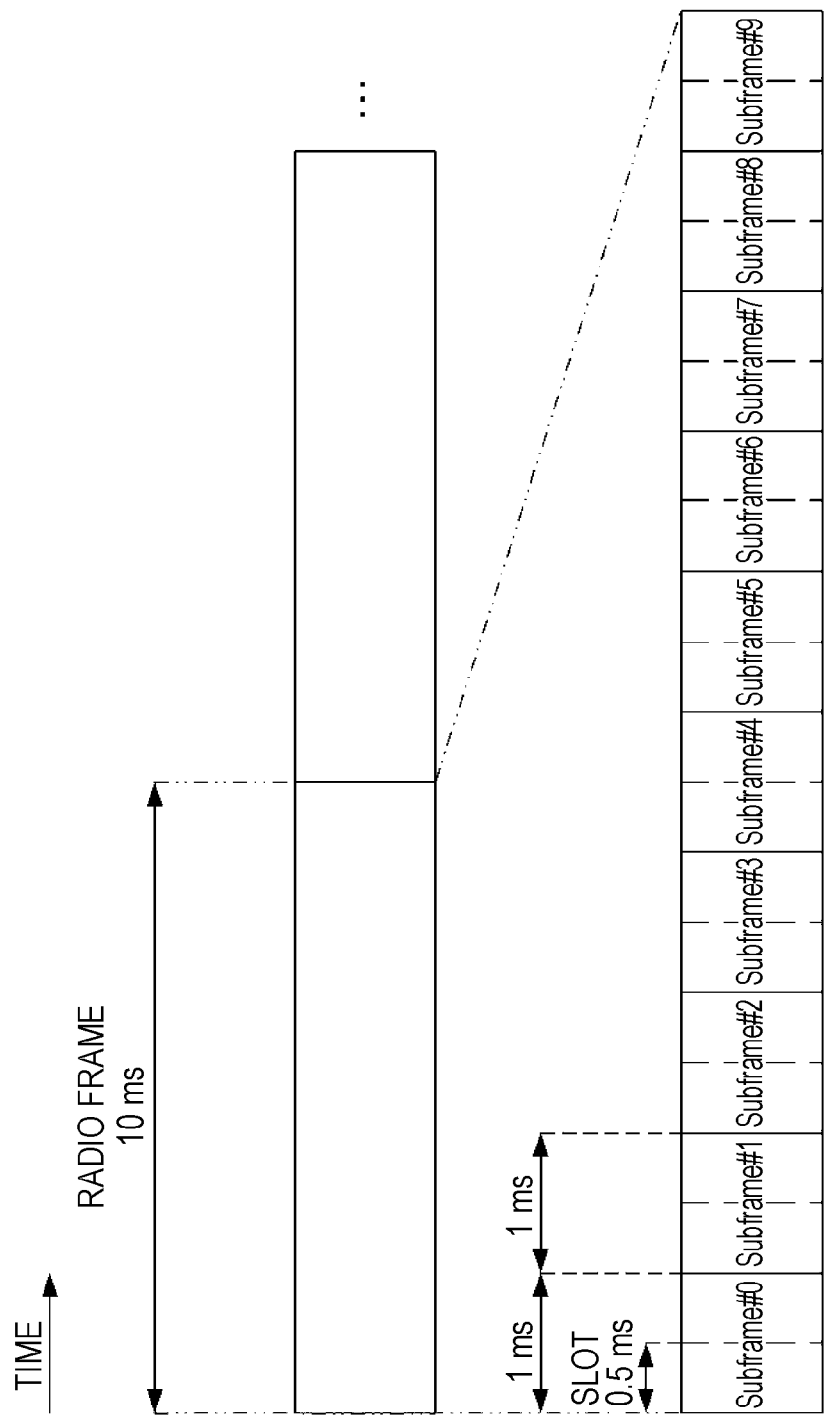
FIG. 2 is a diagram illustrating a schematic configuration of a radio frame according to the present embodiment.

FIG. 2 is a diagram illustrating a schematic configuration of the radio frame according to the present embodiment. For each of the multiple cells, radio frames are configured in the same manner. Each of the radio frames is 10 ms in length. Furthermore, each of the radio frames is configured from 10 subframes. Each of the subframes is 1 ms in length, and is defined by two consecutive slots. An i-th subframe within the radio frame is configured from a (2×i)-th slot and a (2×i+1)-th slot. Each of the slots is 0.5 ms in length.

A configuration of the slot according to the present embodiment will be described below.

Figure 3:
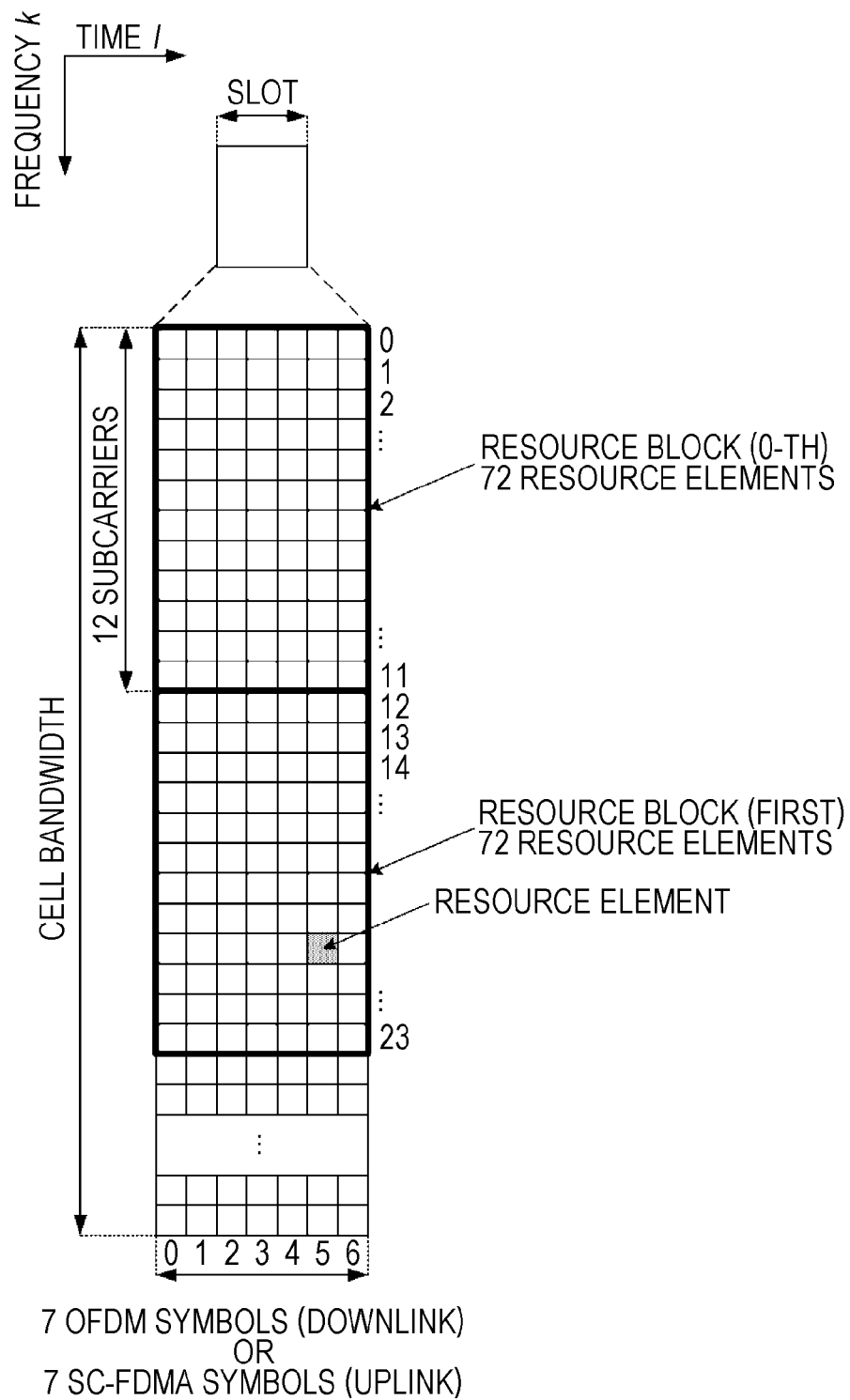
FIG. 3 is a diagram illustrating a configuration of a slot according to the present embodiment.

FIG. 3 is a diagram illustrating the configuration of the slot according to the present embodiment. The physical signal or physical channel that is transmitted in each of the slots is expressed by a resource grid. In the downlink, the resource grid is defined by multiple subcarriers and multiple OFDM symbols. In the uplink, the resource grid is defined by multiple subcarriers and multiple SC-FDMA symbols. The number of subcarriers that construct one slot depends on an uplink bandwidth or a downlink bandwidth for a cell. The number of OFDM symbols or SC-FDMA symbols that construct one slot is 7.

Each of the elements within the resource grid is referred to as a resource element. The resource element is identified by using a subcarrier number k (0, 1, and so forth), and an OFDM symbol number l (0, 1, and so forth up to 6) or an SC-FDMA symbol number l (0, 1, and so forth up to 6) within a slot.

A resource block is used to express mapping of a certain physical channel (the PDSCH, the PUSCH, or the like) to resource elements. The resource block is defined by a virtual resource block and a physical resource block. A certain physical channel is first mapped to the virtual resource block. Thereafter, the virtual resource block is mapped to the physical resource block. One physical resource block is defined by 7 consecutive OFDM symbols or SC-FDMA symbols in the time domain and by 12 consecutive subcarriers in the frequency domain. Therefore, one physical resource block is configured from (7×12) resource elements. Furthermore, one physical resource block corresponds to one slot in the time domain, and corresponds to 180 kHz in the frequency domain. The physical resource blocks are numbered from 0 in the frequency domain.

The physical channel and the physical signal that are transmitted in each of the subframes will be described below.

Figure 4:
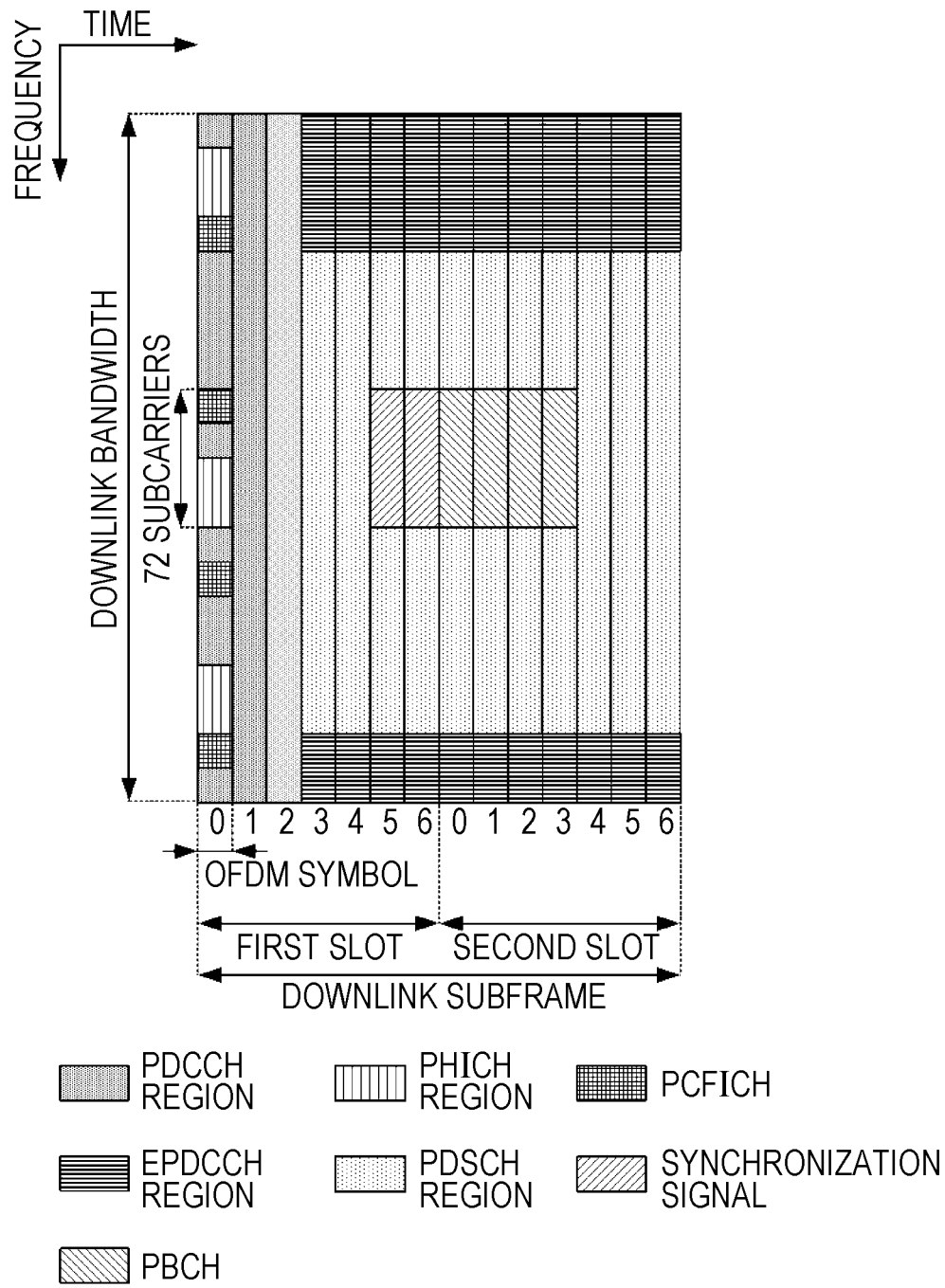
FIG. 4 is a diagram illustrating one example of arrangement of physical channels and physical signals in a downlink subframe according to the present embodiment.

FIG. 4 is a diagram illustrating one example of arrangement of the physical channels and the physical signals in a downlink subframe according to the present embodiment. In the downlink subframe, the base station device 3 can transmit the downlink physical channel (the PBCH, the PCFICH, the PHICH, the PDCCH, the EPDCCH, the PDSCH), and the downlink physical signal (the synchronization signal, the downlink reference signal). Moreover, the PBCH is transmitted only in a subframe 0 within the radio frame. Moreover, the synchronization signal is arranged only in subframes 0 and 5 within the radio frame. Moreover, the downlink reference signal is arranged in the resource elements that are distributed in the frequency domain and the time EPDCCH regions. The downlink reference signal is not illustrated in FIG. 4 for brief description.

The PCFICH is arranged in an initial OFDM symbol in a first slot. The PHICH is arranged in the initial OFDM symbol in the first slot.

In a PDCCH region, multiple PDCCH's are frequency- and time-multiplexed. The PDCCH is arranged, starting from an initial OFDM symbol in the first slot. The span of the DCI is determined based on the CFI.

In an EPDCCH region, multiple EPDCCH's are frequency- and time-multiplexed. The base station device 3 may transmit information indicating a starting position of the OFDM symbol in which the EPDCCH is arranged in the first slot in the subframe to the mobile station device 1. "Information indicating a starting position of the OFDM symbol in which the EPDCCH is arranged" is referred to as "epdcch-Start." The "starting position of the OFDM symbol in which the EPDCCH is arranged" is also referred to as a "starting position for EPDCCCH resource mapping" and a "starting position of the resource element to which the EPDCCH is mapped."

The base station device 3 configures the epdcch-Start for every cell. In a case where the mobile station device 1 is configured with a specific transmission mode (for example, a transmission mode 10), the base station device 3 may configure each of the EPDCCH regions with a different epdcch-Start. A transmission mode will be described below.

Based on the received epdcch-Start, the mobile station device 1 determines the starting position of the OFDM symbol in which the EPDCCH is arranged in the first slot in the subframe. In a case where the epdcch-Start is not received, based on the span of the DCI, the mobile station device 1 determines the starting position of the OFDM symbol in which the EPDCCH is arranged in the first slot in the subframe. For example, in a case where the span of the DCI is 3 (in a case where the PDCCH region is configured from the first, second, and third OFDM symbols in the first slot in the subframe), the mobile station device 1 determines that the EPDCCH is arranged in the first slot in the subframe, starting from the fourth OFDM symbol.

In a PDSCH region, multiple PDSCH's are frequency- and space-multiplexed. The starting position of the OFDM symbol in which the PDSCH is arranged will be described below.

The PDCCH is time-multiplexed along with the PDSCH and the EPDCCH. The EPDCCH is frequency-multiplexed along with the PDSCH.

A PDCCH resource will be described below.

The PDCCH is mapped to one PDCCH candidate. One PDCCH candidate is configured from one or multiple consecutive Control Channel Elements (CCE's). The CCE is arranged in the PDCCH region.

Figure 5:
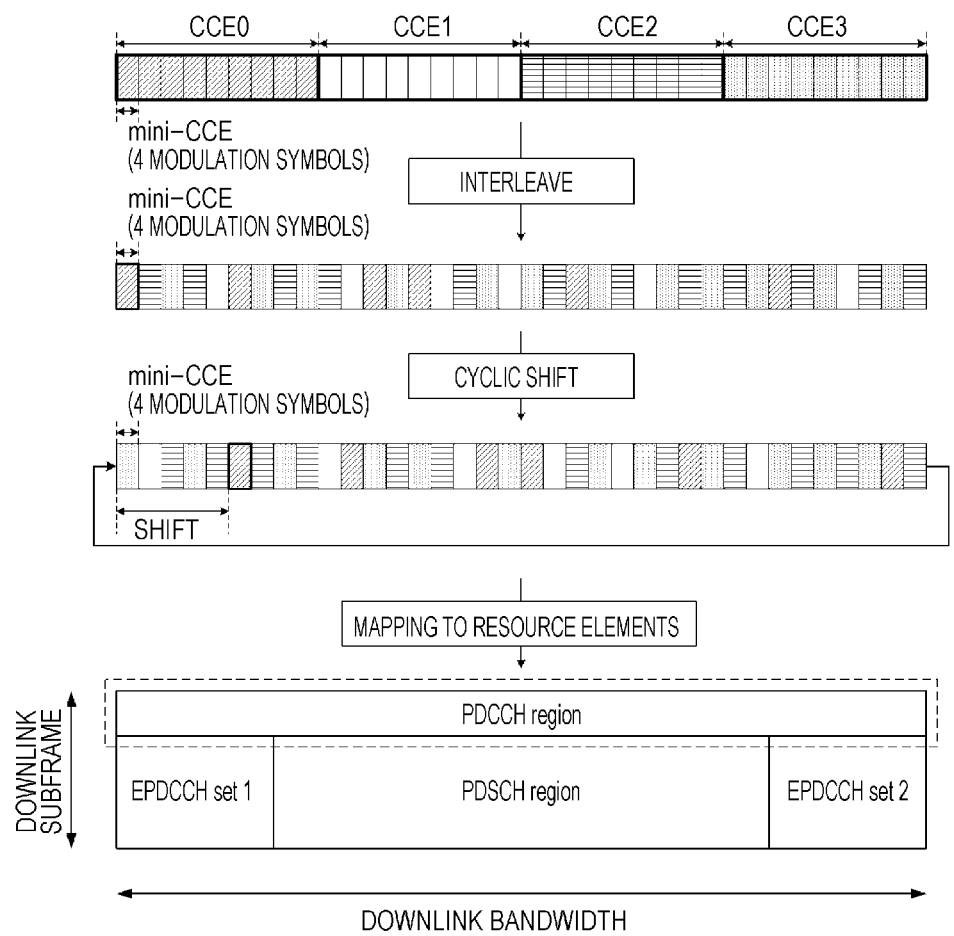
FIG. 5 is a diagram illustrating a method of mapping a PDCCH according to the present embodiment to a resource element.

FIG. 5 is a diagram illustrating a method of mapping the PDCCH according to the present embodiment to the resource element. One CCE is used to transmit 36 modulation symbols (complex-valued symbols). One CCE is configured from 9 mini-CCE's. One mini-CCE is configured from 4 modulation symbols. The base station device 3 maps one mini-CCE to one resource element group. One resource element group is configured from 4 consecutive resource elements in the frequency domain. To be more precise, one modulation symbol is mapped to one resource element.

The base station device 3 interleaves the CCE's in units of mini-CCE's. Next, the base station device 3 cyclic-shifts the mini-CCE's that are interleaved. A value of the cyclic shift is a value of a Physical layer Cell Identity (PCI). To be more precise, among cells that have different physical layer cell identities, the cyclic shifts having different values are performed. Accordingly, interference with the PDCCH among cells can be randomized. Moreover, the mobile station device 1 can detect the Physical layer Cell Identity from the synchronization signal. Furthermore, the base station device 3 can transmit a handover command that includes information indicating the Physical layer Cell Identity to the mobile station device 1.

Next, the base station device 3 maps a cyclic-shifted mini-CCE to the resource element group in the PDCCH region. The base station device 3 maps the mini-CCE of the PDCCH to resource elements other than the resource elements to which the PHICH and the PCFICH are mapped.

An EPDCCH resource will be described below.

The EPDCCH is mapped to one EPDCCH candidate. One EPDCCH candidate is configured from one or multiple consecutive Enhanced Control Channel Elements (ECCE's). Multiple EPDCCH regions may be defined for a single mobile station device. The base station device 3 transmits information indicating one or multiple physical resource blocks that construct the EPDCCH region, to the mobile station device 1. The ECCE is defined for each of the EPDCCH regions. Furthermore, a single ECCE is arranged in a single EPDCCH region. The EPDCCH region is also referred to as an EPDCCH set.

Figure 6:
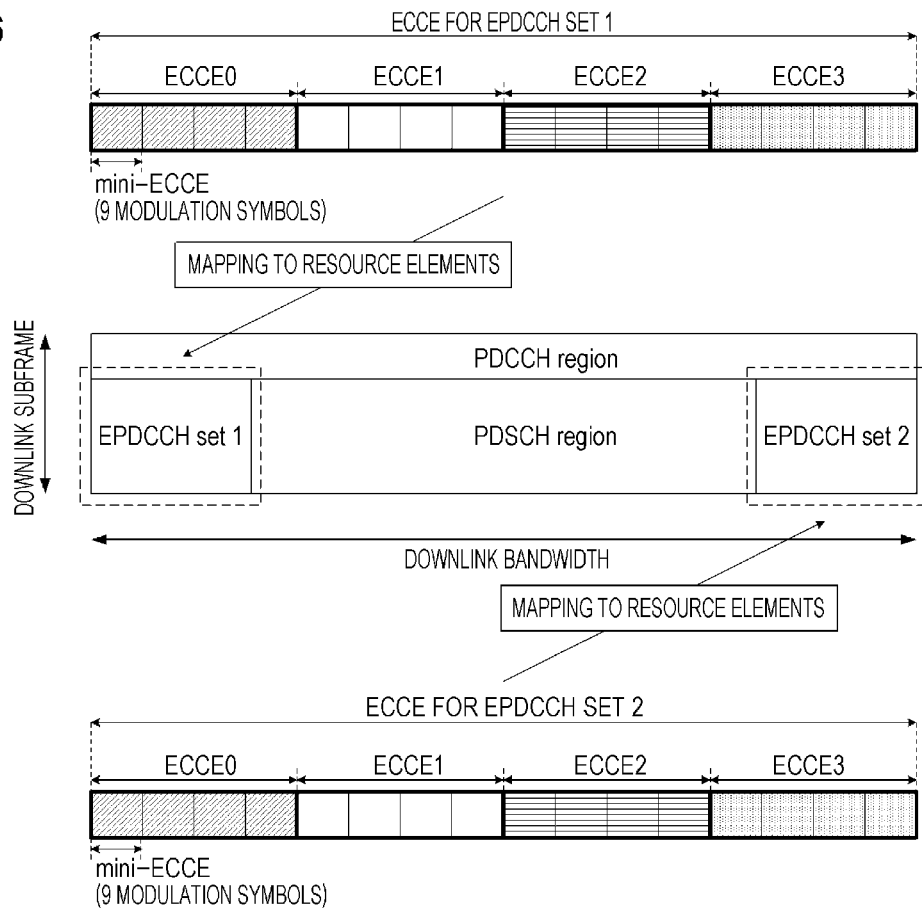
FIG. 6 is a diagram illustrating a method of mapping an EPDCCH according to the present embodiment to a resource element.

FIG. 6 is a diagram illustrating a method of mapping the EPDCCH according to the present embodiment to a resource element. One ECCE is used to transmit multiple modulation symbols (complex-valued symbols). One ECCE is configured from multiple mini-ECCE's. One mini-ECCE is configured from multiple modulation symbols. The base station device 3 maps one mini-ECCE to one enhanced resource element group. Within a subframe, multiple resource elements that construct 2 consecutive physical resource blocks (one physical resource block in the first slot and one physical resource block in the second slot) in the time domain are divided into 16 enhanced resource element groups. One enhanced resource element group is configured from 9 resource elements.

In FIG. 6, ECCE's (an ECCE 0, an ECCE 1, an ECCE 2, and an ECCE 3) for an EPDCCH set 1 are arranged in resource elements in the EPDCCH set 1. Furthermore, in FIG. 6, ECCE's (an ECCE 0, an ECCE 1, an ECCE 2, and an ECCE 3) for an EPDCCH set 2 are arranged in resource elements in the EPDCCH set 2. Moreover, according to the present embodiment, ECCE numbers that correspond to the EPDCCH sets, respectively, are assigned starting from 0.

A search space will be described below.

Figure 7:
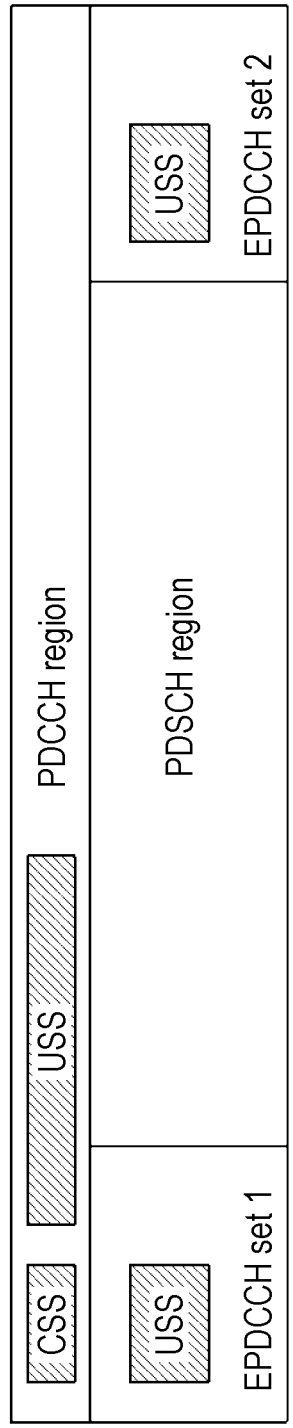
FIG. 7 is a diagram illustrating one example of a configuration of a search space according to the present embodiment.

The search space is configured from a set of PDCCH candidates or from a set of EPDCCH candidates. FIG. 7 is a diagram illustrating one example of a configuration of the search space according to the present embodiment. The PDCCH region is configured to have a Common Search Space (CSS) and a user equipment-specific Search Space (USS). The secondary cell is not configured to have the CSS. Only the primary cell is configured to have the CSS.

Each of the EPDCCH sets is configured to have the USS. The CSS is defined by resources that are common to multiple mobile stations 1. The USS is defined independently of each of the mobile station devices 1.

The mobile station device 1 monitors the PDCCH on the CSS in the primary cell.

In a certain serving cell, the mobile station device 1 monitors the PDCCH or the EPDCCH on any one of the USS in the PDCCH region and the USS in the region set in a certain subframe. The base station device 3 transmits information that, in every subframe, indicates which one of the USS in the PDCCH domain and the USS of the EPDCCH the mobile station device 1 monitors on, to the mobile station device 1. Based on the received information, in a certain subframe, the mobile station device 1 determines whether the PDCCH is monitored on the USS in the PDCCH region and whether the EPDCCH is monitored on the USS in the EPDCCH set. Moreover, in a case where the information is not received, the mobile station device 1 monitors the PDCCH on the USS in the PDCCH region in all subframes.

The transmission mode will be described below.

The base station device 3 configures the mobile station device 1 with the transmission mode through a higher layer signal. The base station device 3 configures the transmission mode for every cell. Based on the received higher layer signal, the mobile station device 1 is configured with the transmission mode.

Through the higher-layer signal, the mobile station device 1 is configured to receive PDSCH data transmission that is signaled through the PDCCH/EPDCCH, according to one of transmission modes 1 to 10.

Moreover, in a case where the transmission mode is not configured through the higher layer signal, the mobile station device 1 is configured with the transmission mode 1 or the transmission mode 2. In a case where a single-antenna port is used for the transmission of the PBCH and the transmission mode is not configured through the higher layer signal, the mobile station device 1 is configured with the transmission mode 1. In a case where multiple antenna ports are used for the transmission of the PBCH and the transmission mode is not configured through the higher-layer signal, the mobile station device 1 is configured with the transmission mode 2.

In a case where the PDCCH is configured by the higher layer to be decoded, based on each of the combinations defined in FIG. 8, the mobile station device 1 decodes the PDCCH and the PDSCH that corresponds to the PDCCH. For example, the mobile station device 1 that is configured with the transmission mode 7 monitors the PDCCH with a DCI format 1A, on the CSS and the USS, and based on the detected DCI format 1A, receives the PDSCH that is transmitted with a single-antenna port (a port 0) or with a transmit diversity scheme. For example, the mobile station device 1 that is configured with the transmission mode 7 monitors the PDCCH with a DCI format 1, on the USS, and based on the detected DCI format 1, receives the PDSCH that is transmitted with a single-antenna port (a port 5).

In a case where the EPDCCH is configured by the higher layer to be decoded, based on each of the combinations defined in FIG. 9, the mobile station device 1 decodes the EPDCCH and the PDSCH that corresponds to the EPDCCH. For example, the mobile station device 1 that is configured with the transmission mode 7 monitors the EPDCCH with the DCI format 1A, on the USS, and based on the detected DCI format 1A, receives the PDSCH that is transmitted with the single-antenna port (the port 0) or with the transmit diversity scheme. For example, the mobile station device 1 that is configured with the transmission mode 7 monitors the EPDCCH with the DCI format 1, on the USS, and based on the detected DCI format 1, receives the PDSCH that is transmitted with a single-antenna port (the port 5).

The starting position of the 01-DM symbol in which the PDSCH is arranged in the first slot in the subframe will be described below.

The "starting position of the OFDM symbol in which the PDSCH is arranged" is also referred to as a "starting position for PDSCH resource mapping" and a "starting position of the resource element/the OFDM symbol to which the PDSCH is mapped."

FIGS. 10 to 20 are diagrams for describing the starting position of the OFDM symbol to which the PDSCH is mapped. The mobile station device 1 and the base station device 3 determine a starting position $l_{DataStart}$ of the OFDM symbol to which the PDSCH is mapped for every cell, based on FIGS. 10 to 20. For example, in a case where the transmission mode 10 is configured and the PDSCH that is scheduled in the DCI format 1A is transmitted and received, the mobile station device 1 and the base station device 3 determine the starting position $l_{DataStart}$ of the OFDM symbol to which the PDSCH for every cell is mapped using any one example in FIGS. 12 to 16. For example, in a case where the transmission mode 10 is configured and the PDSCH that is scheduled in a DCI format 2D is transmitted and received, the mobile station device 1 and the base station device 3 determine the starting position $l_{DataStart}$ of the OFDM symbol to which the PDSCH for every cell is mapped using any one example in FIGS. 17 to 20.

The base station device 3 maps the PDSCH, starting from the OFDM symbol of which the starting position is $1=l_{DataStart}$ in the first slot in the subframe. The mobile station device 1 maps the PDSCH, starting from the OFDM symbol of which the starting position is $1=l_{DataStart}$ in the first slot in the subframe.

FIG. 10 is a diagram for describing the starting position of the OFDM symbol to which the PDSCH for the mobile station device 1 configured with any one of the transmission modes 1 to 9 for a certain cell is mapped.

The mobile station device 1 that is configured with any one of the transmission modes 1 to 9 monitors a DCI format 1, 1A, 1B, 1C, 1D, 2, 2A, 2B, or 2C. The DCI format 1C is used for scheduling and the like of a paging channel (PCH), a random access response, and a system information block. Furthermore, the DCI format 1C is transmitted on the CSS.

In FIG. 10, for the mobile station device 1 that is configured with any one of the transmission modes 1 to 9, in a case where the mobile station device 1 is configured with a carrier indicator field (CIF) for a cell and in a case where, in a different cell, the mobile station device 1 receives the PDSCH and the PDCCH/EPDCCH to which the PDSCH corresponds, $l_{DataStart}$ is given, by a higher-layer parameter pdsch-Start for a cell that receives the PDSCH.

The carrier indicator field is included in the DCI format. A carrier indicator is mapped to the carrier indicator field. The carrier indicator is used to indicate a cell to which the DCI format corresponds.

For every cell, the base station device 3 can configure whether or not the carrier indicator field is included in the DCI format that is transmitted in the cell. For every secondary cell, the base station device 3 can configures a cell to which the DCI format that is used for the scheduling of the secondary cell is transmitted. The DCI format that is used for the scheduling of the primary cell is necessarily transmitted in the primary cell.

The base station device 3 configures pdsch-Start for every cell that is scheduled by the DCI format of a different cell. Moreover, the configuration with the carrier indicator field and the configuration with pdsch-Start may vary among the mobile station devices 1 that perform communication using the same cell.

In FIG. 10, for the mobile station device 1 that is configured with any one of the transmission modes 1 to 9, in a case where the mobile station device 1 is not configured with the carrier indicator field for a cell, or in the same cell, the mobile station device 1 receives the PDSCH and the PDCCH/EPDCCH to which the PDSCH corresponds, in a case where the mobile station device 1 detects the DCI format 1, 1A, 1B, 1C, 1D, 2, 2A, 2B, or 2C on the EPDCCH, and in a case where a value for the higher-layer parameter epdcch-Start for the cell is configured by the higher layer, $l_{DataStart}$ is given, by the higher-layer parameter epdcch-Start.

In FIG. 10, for the mobile station device 1 that is configured with any one of the transmission modes 1 to 9, in the case where the mobile station device 1 is not configured with the carrier indicator field for a cell, or in the same cell, the mobile station device 1 receives the PDSCH and the PDCCH/EPDCCH to which the PDSCH corresponds, and in a case where the mobile station device 1 detects the DCI format 1, 1A, 1B, 1C, 1D, 2, 2A, 2B, or 2C on the PDCCH, $l_{DataStart}$ is given, by the span of the DCI that is given by the CFI of the cell.

In FIG. 10, for the mobile station device 1 that is configured with any one of the transmission modes 1 to 9, in the case where the mobile station device 1 is not configured with the carrier indicator field for a cell, or in the same cell, the mobile station device 1 receives the PDSCH and the PDCCH/EPDCCH to which the PDSCH corresponds, in the case where the mobile station device 1 detects the DCI format 1, 1A, 1B, 1C, 1D, 2, 2A, 2B, or 2C on the EPDCCH, and in a case where the value for the higher-layer parameter epdcch-Start for the cell is not configured by the higher layer, $l_{DataStart}$ is given, by the span of the DCI that is given by the CFI of the cell.

FIG. 11 is a diagram for describing the starting position of the OFDM symbol to which the PDSCH, which is scheduled by the DCI format 1C is mapped, for the mobile station device 1 configured with the transmission mode 10 for a certain cell. For the mobile station device 1 that is configured with the transmission mode 10 and that receives the PDSCH that is scheduled in the DCI format 1C, $l_{DataStart}$ is given by the span of the DCI that is given by the CFI of a cell.

FIG. 12 is a diagram for describing a first example of the starting position of the OFDM symbol to which the PDSCH, which is scheduled by the DCI format 1A, for the mobile station device 1 configured with the transmission mode 10 for a certain cell, is mapped.

In FIG. 12, in a case where the mobile station device 1 is configured with the carrier indicator field for a cell, and in the case where, in a different cell, the mobile station device 1 receives the PDSCH and the PDCCH/EPDCCH to which the PDSCH corresponds, $l_{DataStart}$ is given, by the higher-layer parameter pdsch-Start for a cell that receives the PDSCH, to the mobile station device 1 that is configured with the transmission mode 10 and that receives the PDSCH that is scheduled in the DCI format 1A.

In FIG. 12, for the mobile station device 1 that is configured with the transmission mode 10 and that receives the PDSCH that is scheduled in the DCI format 1A, in a case where the mobile station device 1 is not configured with the carrier indicator field for a cell, or in the same cell, the mobile station device 1 receives the PDSCH and the PDCCH/EPDCCH to which the PDSCH corresponds, in a case where the mobile station device 1 detects the DCI format 1A on the EPDCCH, and in a case where a value for the higher-layer parameter epdcch-Start for a cell is configured by the higher layer, $l_{DataStart}$ is given, by the higher-layer parameter epdcch-Start for the cell or by epdcch-Start for the EPDCCH set in which the EPDCCH is received.

In FIG. 12, in the case where the mobile station device 1 is not configured with the carrier indicator field for a cell, or in the same cell, the mobile station device 1 receives the PDSCH and the PDCCH/EPDCCH to which the PDSCH corresponds, and in a case where the mobile station device 1 detects the DCI format 1A on the PDCCH, $l_{DataStart}$ is given, by the span of the DCI that is given by the CFI of the cell, to the mobile station device 1 that is configured with the transmission mode 10 and that receives the PDSCH that is scheduled in the DCI format 1A.

In FIG. 12, in the case where the mobile station device 1 is not configured with the carrier indicator field for a cell, or in the same cell, the mobile station device 1 receives the PDSCH and the PDCCH/EPDCCH to which the PDSCH corresponds, in the case where the mobile station device 1 detects the DCI format 1A on the EPDCCH, and in a case where a value for the higher-layer parameter epdcch-Start for a cell is not configured by the higher layer, $l_{DataStart}$ is given, by the span of the DCI that is given by the CFI of the cell, to the mobile station device 1 that is configured with the transmission mode 10 and that receives the PDSCH that is scheduled in the DCI format 1A.

FIG. 13 is a diagram for describing a second example of the starting position of the OFDM symbol to which the PDSCH, which is scheduled by the DCI format 1A, for the mobile station device 1 configured with the transmission mode 10 for a certain cell, is mapped.

In FIG. 13, in a case where the mobile station device 1 is configured with the carrier indicator field for a cell, and in the case where, in a different cell, the mobile station device 1 receives the PDSCH and the PDCCH/EPDCCH to which the PDSCH corresponds, $l_{DataStart}$ is given, by the higher-layer parameter pdsch-Start for a cell that receives the PDSCH, to the mobile station device 1 that is configured with the transmission mode 10 and that receives the PDSCH that is scheduled in the DCI format 1A.

In FIG. 13, in the case where the mobile station device 1 is not configured with the carrier indicator field for a cell, or in the same cell, the mobile station device 1 receives the PDSCH and the PDCCH/EPDCCH to which the PDSCH corresponds, and in a case where a value for the higher-layer parameter, 'PDSCH starting position for PDSCH RE mapping,' for a cell is 0, 1, 2, 3, or 4, $l_{DataStart}$ is given, by the higher-layer parameter, 'PDSCH starting position for PDSCH RE mapping,' which corresponds to the DCI format 1A, to the mobile station device 1 that is configured with the transmission mode 10 and that receives the PDSCH that is scheduled in the DCI format 1A.

In FIG. 13, in the case where the mobile station device 1 is not configured with the carrier indicator field for a cell, or in the same cell, the mobile station device 1 receives the PDSCH and the PDCCH/EPDCCH to which the PDSCH corresponds, and in a case where a value for the higher-layer parameter, 'PDSCH starting position for PDSCH RE mapping,' for a cell is 5, $l_{DataStart}$ is given by the span of the DCI that is given, by the CFI of the cell, to the mobile station device 1 that is configured with the transmission mode 10 and that receives the PDSCH that is scheduled in the DCI format 1A.

A value for 'PDSCH starting position for PDSCH RE mapping' ranges from 0 to 5. The base station device 3 may configure the higher-layer parameter, 'PDSCH starting position for PDSCH RE mapping,' for every cell. In a case where the higher-layer parameter, 'PDSCH starting position for PDSCH RE mapping,' for a cell is not configured by the base station device 3, the mobile station device 1 sets the higher-layer parameter, 'PDSCH starting position for PDSCH RE mapping,' for a cell to 5.

To be more precise, the "case where the value for the higher-layer parameter, 'PDSCH starting position for PDSCH RE mapping,' for a cell is 5" includes a "case where the value for the higher-layer parameter, 'PDSCH starting position for PDSCH RE mapping,' for a cell, is not configured by the higher layer."

Furthermore, the "case where the value for the higher-layer parameter, 'PDSCH starting position for PDSCH RE mapping,' for a cell is 0, 1, 2, 3, or 4," is a "case where the value for the higher-layer parameter, 'PDSCH starting position for PDSCH RE mapping,' for a cell, is configured by the higher layer."

The base station device 3 configures the mobile station device 1 with the higher-layer parameter through the higher-layer signal. The base station device 3 transmits a higher-layer signal indicating a value for the higher-layer parameter to the mobile station device 1. The mobile station device 1 configures the higher-layer parameter based on the received higher-layer signal.

Moreover, a value for epdcch-Start ranges from 0 to 5. In a case where the higher-layer parameter epdcch-Start for a cell is not configured by the base station device 3, the mobile station device 1 may set the higher-layer parameter epdcch-Start for the cell to 5.

To be more precise, the "case where the higher-layer parameter epdcch-Start for a cell is 5" includes a "case where a value for the higher-layer parameter epdcch-Start for a cell is not configured by the higher layer."

Furthermore, the "case where the value for the higher-layer parameter epdcch-Start for a cell is 0, 1, 2, 3, or 4," is a "case where a value for higher-layer parameter epdcch-Start for a cell is configured by the higher layer."

The base station device 3 configures the mobile station device 1 with the higher-layer parameter through the higher-layer signal. The base station device 3 transmits a higher-layer signal indicating the value for the higher-layer parameter to the mobile station device 1. The mobile station device 1 configures the higher-layer parameter based on the received higher-layer signal.

FIG. 14 is a diagram for describing a third example of the starting position of the OFDM symbol to which the PDSCH, which is scheduled by the DCI format 1A, for the mobile station device 1 configured with the transmission mode 10 for a certain cell, is mapped.

In FIG. 14, in a case where the mobile station device 1 is configured with the carrier indicator field for a cell, and in the case where, in a different cell, the mobile station device 1 receives the PDSCH and the PDCCH/EPDCCH to which the PDSCH corresponds, $l_{DataStart}$ is given, by the higher-layer parameter pdsch-Start for a cell that receives the PDSCH, to the mobile station device 1 that is configured with the transmission mode 10 and that receives the PDSCH that is scheduled in the DCI format 1A.

In FIG. 14, in the case where the mobile station device 1 is not configured with the carrier indicator field for a cell, or in the same cell, the mobile station device 1 receives the PDSCH and the PDCCH/EPDCCH to which the PDSCH corresponds, in a case where the mobile station device 1 detects the DCI format 1A on the EPDCCH, and in the case where the value for the higher-layer parameter, 'PDSCH starting position for PDSCH RE mapping,' for a cell is 0, 1, 2, 3, or 4, $l_{DataStart}$ is given, by the higher-layer parameter, 'PDSCH starting position for PDSCH RE mapping,' which corresponds to the DCI format 1A, to the mobile station device 1 that is configured with the transmission mode 10 and that receives the PDSCH that is scheduled in the DCI format 1A.

In FIG. 14, in the case where the mobile station device 1 is not configured with the carrier indicator field for a cell, or in the same cell, the mobile station device 1 receives the PDSCH and the PDCCH/EPDCCH to which the PDSCH corresponds, and in a case where the mobile station device 1 detects the DCI format 1A on the PDCCH, $l_{DataStart}$ is given, by the span of the DCI that is given by the CFI of the cell, to the mobile station device 1 that is configured with the transmission mode 10 and that receives the PDSCH that is scheduled in the DCI format 1A.

In FIG. 14, in the case where the mobile station device 1 is not configured with the carrier indicator field for a cell, or in the same cell, the mobile station device 1 receives the PDSCH and the PDCCH/EPDCCH to which the PDSCH corresponds, in the case where the mobile station device 1 detects the DCI format 1A on the EPDCCH, and in the case where the value for the higher-layer parameter, 'PDSCH starting position for PDSCH RE mapping,' for a cell, is 5, $l_{DataStart}$ is given, by the span of the DCI that is given by the CFI of the cell, to the mobile station device 1 that is configured with the transmission mode 10 and that receives the PDSCH that is scheduled in the DCI format 1A.

FIG. 15 is a diagram for describing a fourth example of the starting position of the OFDM symbol to which the PDSCH, which is scheduled by the DCI format 1A, for the mobile station device 1 configured with the transmission mode 10 for a certain cell, is mapped.

In FIG. 15, in a case where the mobile station device 1 is configured with the carrier indicator field for a cell, and in the case where, in a different cell, the mobile station device 1 receives the PDSCH and the PDCCH/EPDCCH to which the PDSCH corresponds, $l_{DataStart}$ is given, by the higher-layer parameter pdsch-Start for a cell that receives the PDSCH, to the mobile station device 1 that is configured with the transmission mode 10 and that receives the PDSCH that is scheduled in the DCI format 1A.

In FIG. 15, in the case where the mobile station device 1 is not configured with the carrier indicator field for a cell, or in the same cell, the mobile station device 1 receives the PDSCH and the PDCCH/EPDCCH to which the PDSCH corresponds, in a case where the mobile station device 1 detects the DCI format 1A on the USS, and in the case where the value for the higher-layer parameter, 'PDSCH starting position for PDSCH RE mapping,' for a cell is 0, 1, 2, 3, or 4, $l_{DataStart}$ is given, by the higher-layer parameter, 'PDSCH starting position for PDSCH RE mapping,' which corresponds to the DCI format 1A, to the mobile station device 1 that is configured with the transmission mode 10 and that receives the PDSCH that is scheduled in the DCI format 1A.

In FIG. 15, in the case where the mobile station device 1 is not configured with the carrier indicator field for a cell, or in the same cell, the mobile station device 1 receives the PDSCH and the PDCCH/EPDCCH to which the PDSCH corresponds, and in a case where the mobile station device 1 detects the DCI format 1A on the CSS, $l_{DataStart}$ is given, by the span of the DCI that is given by the CFI of the cell, to the mobile station device 1 that is configured with the transmission mode 10 and that receives the PDSCH that is scheduled in the DCI format 1A.

In FIG. 15, in the case where the mobile station device 1 is not configured with the carrier indicator field for a cell, or in the same cell, the mobile station device 1 receives the PDSCH and the PDCCH/EPDCCH to which the PDSCH corresponds, in the case where the mobile station device 1 detects the DCI format 1A on the USS, and in the case where the value for the higher-layer parameter, 'PDSCH starting position for PDSCH RE mapping,' for a cell, is 5, $l_{DataStart}$ is given, by the span of the DCI that is given by the CFI of the cell, to the mobile station device 1 that is configured with the transmission mode 10 and that receives the PDSCH that is scheduled in the DCI format 1A.

FIG. 16 is a diagram for describing a fifth example of the starting position of the OFDM symbol to which the PDSCH, which is scheduled by the DCI format 1A, for the mobile station device 1 configured with the transmission mode 10 for a certain cell, is mapped.

In FIG. 16, in a case where the mobile station device 1 is configured with the carrier indicator field for a cell, and in the case where, in a different cell, the mobile station device 1 receives the PDSCH and the PDCCH/EPDCCH to which the PDSCH corresponds, $l_{DataStart}$ is given, by the higher-layer parameter pdsch-Start for a cell that receives the PDSCH, to the mobile station device 1 that is configured with the transmission mode 10 and that receives the PDSCH that is scheduled in the DCI format 1A.

In FIG. 16, in the case where the mobile station device 1 is not configured with the carrier indicator field for a cell, or in the same cell, the mobile station device 1 receives the PDSCH and the PDCCH/EPDCCH to which the PDSCH corresponds, and in a case where a value for the higher-layer parameter, 'PDSCH starting position for PDSCH RE mapping,' for a cell is 0, 1, 2, 3, or 4, $l_{DataStart}$ is given, by the higher-layer parameter, 'PDSCH starting position for PDSCH RE mapping,' which corresponds to the DCI format 1A, to the mobile station device 1 that is configured with the transmission mode 10 and that receives the PDSCH that is scheduled in the DCI format 1A.

In FIG. 16, in the case where the mobile station device 1 is not configured with the carrier indicator field for a cell, or in the same cell, the mobile station device 1 receives the PDSCH and the PDCCH/EPDCCH to which the PDSCH corresponds, in the case where the mobile station device 1 detects the DCI format 1A on the EPDCCH, in the case where the value for the higher-layer parameter, 'PDSCH starting position for PDSCH RE mapping,' for a cell is 5, and in the case where the value for the higher-layer parameter epdcch-Start for a cell is configured by the higher layer, $l_{DataStart}$ is given, by the higher-layer parameter epdcch-Start for the cell or by epdcch-Start for the EPDCCH set in which the EPDCCH is received, to the mobile station device 1 that is configured with the transmission mode 10 and that receives the PDSCH that is scheduled in the DCI format 1A.

In FIG. 16, in the case where the mobile station device 1 is not configured with the carrier indicator field for a cell, or in the same cell, the mobile station device 1 receives the PDSCH and the PDCCH/EPDCCH to which the PDSCH corresponds, in the case where the mobile station device 1 detects the DCI format 1A on the PDCCH, and in the case where the value for the higher-layer parameter, 'PDSCH starting position for PDSCH RE mapping,' for a cell, is 5, $l_{DataStart}$ is given, by the span of the DCI that is given by the CFI of the cell, to the mobile station device 1 that is configured with the transmission mode 10 and that receives the PDSCH that is scheduled in the DCI format 1A.

In FIG. 16, in the case where the mobile station device 1 is not configured with the carrier indicator field for a cell, or in the same cell, the mobile station device 1 receives the PDSCH and the PDCCH/EPDCCH to which the PDSCH corresponds, in the case where the mobile station device 1 detects the DCI format 1A on the EPDCCH, in the case where the value for the higher-layer parameter, 'PDSCH starting position for PDSCH RE mapping,' for a cell, is 5, and in the case where the value for the higher-layer parameter epdcch-Start for a cell is not configured by the higher layer, $l_{DataStart}$ is given, by the span of the DCI that is given by the CFI of the cell, to the mobile station device 1 that is configured with the transmission mode 10 and that receives the PDSCH that is scheduled in the DCI format 1A.

FIG. 17 is a diagram for describing a first example of the starting position of the OFDM symbol to which the PDSCH, which is scheduled by the DCI format 2D, for the mobile station device 1 configured with the transmission mode 10 for a certain cell, is mapped.

For the mobile station device 1, the base station device 3 can configure 4 sets of higher-layer parameters for the DCI format 2D. The set of higher-layer parameters includes at least 'PDSCH starting position for PDSCH RE mapping' and 'MBSFN subframe configuration for PDSCH RE mapping.'

The base station device 3 transmits information indicating one set among the 4 sets of higher-layer parameters to the mobile station device 1. The information indicating one set among the 4 sets of higher-layer parameters is included in the DCI format 2D. To be more precise, 'PDSCH starting position for PDSCH RE mapping' and 'MBSFN subframe configuration for PDSCH RE mapping' are determined from the DCI format 2D.

The PDCCH and the PMCH, or the PDCCH and the PDSCH are mapped to an MBSFN subframe at the same time. It is difficult to map the PMCH and the PDSCH to a Multimedia Broadcast multicast service over a Single Frequency Network (MBSFN) subframe at the same time. In the MBSFN subframe, the span of the DCI is 1 or 2.

'MBSFN subframe configuration for PDSCH RE mapping' is a parameter that is used only for mapping the PDSCH to resource elements. Actually, a higher-layer parameter, 'MBSFN subframe configuration,' which indicates whether or not a subframe is the MBSFN subframe, is defined separately from 'MBSFN subframe configuration for PDSCH RE mapping.'

For example, 'MBSFN subframe configuration' and 'MBSFN subframe configuration for PDSCH RE mapping' are bitmaps, and one bit in the bitmap corresponds to one subframe. The bitmap is periodically used. For example, a subframe to which a bit having a value of 1 corresponds is a subframe that is indicated by 'MBSFN subframe configuration' or 'MBSFN subframe configuration for PDSCH RE mapping.'

A subframe that is indicated by 'MBSFN subframe configuration' is an MBSFN subframe. A subframe that is not indicated by 'MBSFN subframe configuration' is a non-MBSFN subframe.

In a case where 'MBSFN subframe configuration for PDSCH RE mapping' is not configured by the base station device 3, the mobile station device 1 sets a bitmap of 'MBSFN subframe configuration' to 'MBSFN subframe configuration for PDSCH RE mapping.' In a case where 'PDSCH starting position for PDSCH RE mapping' is not configured by the base station device 3, the mobile station device 1 sets 'PDSCH starting position for PDSCH RE mapping' to 5.

In FIG. 17, in the case where the value for 'PDSCH starting position for PDSCH RE mapping,' which is determined from the DCI format 2D for a cell that receives the PDSCH, is 0, 1, 2, 3, or 4, the mobile station device 1 that is configured with the transmission mode 10 and that receives the PDSCH that is scheduled in the DCI format 2D sets l'$_{DataStart}$ to the value for 'PDSCH starting position for PDSCH RE mapping.'

In FIG. 17, in the case where the value for 'PDSCH starting position for PDSCH RE mapping,' which is determined from the DCI format 2D for a cell that receives the PDSCH, is 5, in the case where the mobile station device 1 is configured with the carrier indicator field for a cell, and in the case where, in a different cell, the mobile station device 1 receives the PDSCH and the PDCCH/EPDCCH to which the PDSCH corresponds, l'$_{DataStart}$ is given, by the higher-layer parameter pdsch-Start for a cell that receives the PDSCH, to the mobile station device 1 that is configured with the transmission mode 10 and that receives the PDSCH that is scheduled in the DCI format 2D.

In FIG. 17, in the case where the value for 'PDSCH starting position for PDSCH RE mapping' that is determined from the DCI format 2D for a cell that receives the PDSCH is 5, in the case where the mobile station device 1 is not configured with the carrier indicator field for a cell, or in the same cell, the mobile station device 1 receives the PDSCH and the PDCCH/EPDCCH to which the PDSCH corresponds, in the case where the mobile station device 1 detects the DCI format 2D on the EPDCCH, and in the case where the value for the higher-layer parameter epdcch-Start for a cell is configured by the higher layer, l'$_{DataStart}$ is given, by the higher-layer parameter epdcch-Start for the cell or by epdcch-Start for the EPDCCH set in which the EPDCCH is received, to the mobile station device 1 that is configured with the transmission mode 10 and that receives the PDSCH that is scheduled in the DCI format 2D.

In FIG. 17, in the case where the value for 'PDSCH starting position for PDSCH RE mapping' that is determined from the DCI format 2D for a cell that receives the PDSCH is 5, in the case where the mobile station device 1 is not configured with the carrier indicator field for a cell, or in the same cell, the mobile station device 1 receives the PDSCH and the PDCCH/EPDCCH to which the PDSCH corresponds, and in the case where the mobile station device 1 detects the DCI format 2D on the PDCCH, l'$_{DataStart}$ is given, by the span of the DCI that is given by the CFI of the cell, to the mobile station device 1 that is configured with the transmission mode 10 and that receives the PDSCH that is scheduled in the DCI format 2D.

In FIG. 17, in the case where the value for 'PDSCH starting position for PDSCH RE mapping' that is determined from the DCI format 2D for a cell that receives the PDSCH is 5, in the case where the mobile station device 1 is not configured with the carrier indicator field for a cell, or in the same cell, the mobile station device 1 receives the PDSCH and the PDCCH/EPDCCH to which the PDSCH corresponds, in the case where the mobile station device 1 detects the DCI format 2D on the EPDCCH, and in the case where the value for the higher-layer parameter epdcch-Start for a cell is not configured by the higher layer, l'$_{DataStart}$ is given, by the span of the DCI that is given by the CFI of the cell, to the mobile station device 1 that is configured with the transmission mode 10 and that receives the PDSCH that is scheduled in the DCI format 2D.

In FIG. 17, in a case where a subframe is indicated by 'MBSFN subframe configuration for PDSCH RE mapping' that is determined from the DCI format 2D for a cell that receives the PDSCH, l$_{DataStart}$ is given based on Equation (1). min(X,Y) is a function for outputting the smallest of the values (values in parentheses), which are input.

$$l_{DataStart} = \min(2, l'_{DataStart}) \quad [\text{Math 1}]$$

In FIG. 17, in a case other than the case where the subframe is indicated by 'MBSFN subframe configuration for PDSCH RE mapping' that is determined from the DCI format 2D for a cell that receives the PDSCH, l$_{DataStart}$ is set to a value for l'$_{DataStart}$.

Among 4 higher-layer parameters, 4 items of 'PDSCH starting position for PDSCH RE mapping,' for the DCI format 2D, one parameter may be same as the higher-layer parameter, 'PDSCH starting position for PDSCH RE mapping,' for the DCI format 1A. Furthermore, among 4 higher-layer parameters, 4 items of 'PDSCH starting position for PDSCH RE mapping,' for the DCI format 2D, one parameter may be defined independently of the higher-layer parameter, 'PDSCH starting position for PDSCH RE mapping,' for the DCI format 1A.

Moreover, an example in FIG. 17 may be applied to the mobile station device 1 that is configured with the transmission mode 10 and that receives the PDSCH that is scheduled in the DCI format 1A. In this case, the DCI format 1A can be configured with one set of higher-layer parameters. Among 4 sets of higher-layer parameters for the DCI format 2D, one set may be shared as one set for higher-layer parameters for the DCI format 1A. Furthermore, among 4 sets of higher-layer parameters for the DCI format 2D, one set may be defined independently of one set of higher-layer parameters for the DCI format 1A.

FIG. 18 is a diagram for describing a second example of the starting position of the OFDM symbol to which the PDSCH, which is scheduled by the DCI format 2D, for the mobile station device 1 configured with the transmission mode 10 for a certain cell, is mapped.

In FIG. 18, in the case where the value for 'PDSCH starting position for PDSCH RE mapping,' which is determined from the DCI format 2D for a cell that receives the PDSCH, is 0, 1, 2, 3, or 4, the mobile station device 1 that is configured with the transmission mode 10 and that receives the PDSCH that is scheduled in the DCI format 2D sets l'$_{DataStart}$ to the value for 'PDSCH starting position for PDSCH RE mapping.'

In FIG. 18, in the case where the value for 'PDSCH starting position for PDSCH RE mapping,' which is determined from the DCI format 2D for a cell that receives the PDSCH, is 5, in the case where the mobile station device 1 is configured with the carrier indicator field for a cell, and in the case where, in a different cell, the mobile station device 1 receives the PDSCH and the PDCCH/EPDCCH to which the PDSCH corresponds, l'$_{DataStart}$ is given, by the higher-layer parameter pdsch-Start for a cell that receives the PDSCH, to the mobile station device 1 that is configured with the transmission mode 10 and that receives the PDSCH that is scheduled in the DCI format 2D.

In FIG. 18, in the case where the value for 'PDSCH starting position for PDSCH RE mapping,' which is determined from the DCI format 2D for a cell that receives the PDSCH is 5, in the case where the mobile station device 1 is not configured with the carrier indicator field for a cell, or in the same cell, the mobile station device 1 receives the PDSCH and the PDCCH/EPDCCH to which the PDSCH corresponds, and in the case where the value for the higher-layer parameter, 'PDSCH starting position for PDSCH RE mapping,' for the DCI format 1A, is 0, 1, 2, 3, or 4, l'$_{DataStart}$ is given, by the higher-layer parameter, 'PDSCH starting position for PDSCH RE mapping,' which corresponds to the DCI format 1A, to the mobile station device 1 that is configured with the transmission mode 10 and that receives the PDSCH that is scheduled in the DCI format 2D.

In FIG. 18, in the case where the value for 'PDSCH starting position for PDSCH RE mapping,' which is determined from the DCI format 2D for a cell that receives the PDSCH is 5, in the case where the mobile station device 1 is not configured with the carrier indicator field for a cell, or in the same cell, the mobile station device 1 receives the PDSCH and the PDCCH/EPDCCH to which the PDSCH corresponds, and in the case where the value for the higher-layer parameter, 'PDSCH starting position for PDSCH RE mapping,' for the DCI format 1A, is 5, $l'_{DataStart}$ is given, by the span of the DCI that is given by the CFI of the cell, to the mobile station device 1 that is configured with the transmission mode 10 and that receives the PDSCH that is scheduled in the DCI format 2D.

In FIG. 18, in a case where the PDSCH is scheduled by the DCI format 2D and a subframe is indicated by 'MBSFN subframe configuration for PDSCH RE mapping' that is determined from the DCI format 2D for a cell that receives the PDSCH, and in a case where the PDSCH is scheduled by the DCI format 1A and a subframe is indicated by 'MBSFN subframe configuration for PDSCH RE mapping' for the DCI format 1A for a cell that receives the PDSCH, $l'_{DataStart}$ is given based on Equation (1). In FIG. 18, in other cases, $l_{DataStart}$ is set to a value for $l'_{DataStart}$.

"Other cases" include a "case where the PDSCH is scheduled by the DCI format 2D and a subframe is not indicated by 'MBSFN subframe configuration for PDSCH RE mapping' that is determined from the DCI format 2D for a cell that receives the PDSCH," and a "case where the PDSCH is scheduled by the DCI format 1A and a subframe is not indicated by 'MBSFN subframe configuration for PDSCH RE mapping' for the DCI format 1A for a cell that receives the PDSCH."

FIG. 19 is a diagram for describing a third example of the starting position of the OFDM symbol to which the PDSCH, which is scheduled by the DCI format 2D, for the mobile station device 1 configured with the transmission mode 10 for a certain cell, is mapped.

In FIG. 19, in the case where the value for 'PDSCH starting position for PDSCH RE mapping,' which is determined from the DCI format 2D for a cell that receives the PDSCH, is 0, 1, 2, 3, or 4, the mobile station device 1 that is configured with the transmission mode 10 and that receives the PDSCH that is scheduled in the DCI format 2D sets $l'_{DataStart}$ to the value for 'PDSCH starting position for PDSCH RE mapping.'

In FIG. 19, in the case where the value for 'PDSCH starting position for PDSCH RE mapping,' which is determined from the DCI format 2D for a cell that receives the PDSCH, is 5, in the case where the mobile station device 1 is configured with the carrier indicator field for a cell, and in the case where, in a different cell, the mobile station device 1 receives the PDSCH and the PDCCH/EPDCCH to which the PDSCH corresponds, $l'_{DataStart}$ is given, by the higher-layer parameter pdsch-Start for a cell that receives the PDSCH, to the mobile station device 1 that is configured with the transmission mode 10 and that receives the PDSCH that is scheduled in the DCI format 2D.

In FIG. 19, in the case where the value for 'PDSCH starting position for PDSCH RE mapping,' which is determined from the DCI format 2D for a cell that receives the PDSCH is 5, in the case where the mobile station device 1 is not configured with the carrier indicator field for a cell, or in the same cell, the mobile station device 1 receives the PDSCH and the PDCCH/EPDCCH to which the PDSCH corresponds, in the case where the mobile station device 1 detects the DCI format 2D on the EPDCCH, and in the case where the value for the higher-layer parameter, 'PDSCH starting position for PDSCH RE mapping,' for the DCI format 1A, is 0, 1, 2, 3, or 4, $l'_{DataStart}$ is given, by the higher-layer parameter, 'PDSCH starting position for PDSCH RE mapping,' which corresponds to the DCI format 1A, to the mobile station device 1 that is configured with the transmission mode 10 and that receives the PDSCH that is scheduled in the DCI format 2D.

In FIG. 19, in the case where the value for 'PDSCH starting position for PDSCH RE mapping' that is determined from the DCI format 2D for a cell that receives the PDSCH is 5, in the case where the mobile station device 1 is not configured with the carrier indicator field for a cell, or in the same cell, the mobile station device 1 receives the PDSCH and the PDCCH/EPDCCH to which the PDSCH corresponds, and in the case where the mobile station device 1 detects the DCI format 2D on the PDCCH, $l'_{DataStart}$ is given, by the span of the DCI that is given by the CFI of the cell, to the mobile station device 1 that is configured with the transmission mode 10 and that receives the PDSCH that is scheduled in the DCI format 2D.

In FIG. 19, in the case where the value for 'PDSCH starting position for PDSCH RE mapping,' which is determined from the DCI format 2D for a cell that receives the PDSCH is 5, in the case where the mobile station device 1 is not configured with the carrier indicator field for a cell, or in the same cell, the mobile station device 1 receives the PDSCH and the PDCCH/EPDCCH to which the PDSCH corresponds, in the case where the mobile station device 1 detects the DCI format 2D on the EPDCCH, and in the case where the value for the higher-layer parameter, 'PDSCH starting position for PDSCH RE mapping,' for the DCI format 1A, is 5, $l'_{DataStart}$ is given, by the span of the DCI that is given by the CFI of the cell, to the mobile station device 1 that is configured with the transmission mode 10 and that receives the PDSCH that is scheduled in the DCI format 2D.

In FIG. 19, in a case where the PDSCH is scheduled by the DCI format 2D and a subframe is indicated by 'MBSFN subframe configuration for PDSCH RE mapping' that is determined from the DCI format 2D for a cell that receives the PDSCH, and in a case where the PDSCH is scheduled by the DCI format 1A and a subframe is indicated by 'MBSFN subframe configuration for PDSCH RE mapping' for the DCI format 1A for a cell that receives the PDSCH, $l_{DataStart}$ is given based on Equation (1). In FIG. 19, in other cases, $l_{DataStart}$ is set to a value for $l'_{DataStart}$.

"Other cases" include a "case where the PDSCH is scheduled by the DCI format 2D and a subframe is not indicated by 'MBSFN subframe configuration for PDSCH RE mapping' that is determined from the DCI format 2D for a cell that receives the PDSCH," and a "case where the PDSCH is scheduled by the DCI format 1A and a subframe is not indicated by 'MBSFN subframe configuration for PDSCH RE mapping' for the DCI format 1A for a cell that receives the PDSCH."

FIG. 20 is a diagram for describing a fourth example of the starting position of the OFDM symbol to which the PDSCH, which is scheduled by the DCI format 2D, for the mobile station device 1 configured with the transmission mode 10 for a certain cell, is mapped.

In FIG. 20, in the case where the value for 'PDSCH starting position for PDSCH RE mapping,' which is determined from the DCI format 2D for a cell that receives the PDSCH, is 0, 1, 2, 3, or 4, the mobile station device 1 that is configured with the transmission mode 10 and that receives the PDSCH that is scheduled in the DCI format 2D sets $l'_{DataStart}$ to the value for 'PDSCH starting position for PDSCH RE mapping.'

In FIG. 20, in the case where the value for 'PDSCH starting position for PDSCH RE mapping,' which is determined from the DCI format 2D for a cell that receives the PDSCH, is 5, in the case where the mobile station device 1 is configured with the carrier indicator field for a cell, and in the case where, in a different cell, the mobile station device 1 receives the PDSCH and the PDCCH/EPDCCH to which the PDSCH corresponds, $l'_{DataStart}$ is given, by the higher-layer parameter pdsch-Start for a cell that receives the PDSCH, to the mobile station device 1 that is configured with the transmission mode 10 and that receives the PDSCH that is scheduled in the DCI format 2D.

In FIG. 20, in the case where the value for 'PDSCH starting position for PDSCH RE mapping,' which is determined from the DCI format 2D for a cell that receives the PDSCH is 5, in the case where the mobile station device 1 is not configured with the carrier indicator field for a cell, or in the same cell, the mobile station device 1 receives the PDSCH and the PDCCH/EPDCCH to which the PDSCH corresponds, and in the case where the value for the higher-layer parameter, 'PDSCH starting position for PDSCH RE mapping,' for the DCI format 1A, is 0, 1, 2, 3, or 4, $l'_{DataStart}$ is given, by the higher-layer parameter, 'PDSCH starting position for PDSCH RE mapping,' which corresponds to the DCI format 1A, to the mobile station device 1 that is configured with the transmission mode 10 and that receives the PDSCH that is scheduled in the DCI format 2D.

In FIG. 20, in the case where the value for 'PDSCH starting position for PDSCH RE mapping' that is determined from the DCI format 2D for a cell that receives the PDSCH is 5, in the case where the mobile station device 1 is not configured with the carrier indicator field for a cell, or in the same cell, the mobile station device 1 receives the PDSCH and the PDCCH/EPDCCH to which the PDSCH corresponds, in the case where the mobile station device 1 detects the DCI format 2D on the EPDCCH, in the case where the value for the higher-layer parameter, 'PDSCH starting position for PDSCH RE mapping,' for the DCI format 1A, is 5, and in the case where the value for the higher-layer parameter epdcch-Start for a cell is configured by the higher layer, $l'_{DataStart}$ is given, by the higher-layer parameter epdcch-Start for the cell or by epdcch-Start for the EPDCCH set in which the EPDCCH is received, to the mobile station device 1 that is configured with the transmission mode 10 and that receives the PDSCH that is scheduled in the DCI format 2D.

In FIG. 20, in the case where the value for 'PDSCH starting position for PDSCH RE mapping,' which is determined from the DCI format 2D for a cell that receives the PDSCH is 5, in the case where the mobile station device 1 is not configured with the carrier indicator field for a cell, or in the same cell, the mobile station device 1 receives the PDSCH and the PDCCH/EPDCCH to which the PDSCH corresponds, in the case where the mobile station device 1 detects the DCI format 2D on the PDCCH, and in the case where the value for the higher-layer parameter, 'PDSCH starting position for PDSCH RE mapping,' for the DCI format 1A, is 5, $l'_{DataStart}$ is given, by the span of the DCI that is given by the CFI of the cell, to the mobile station device 1 that is configured with the transmission mode 10 and that receives the PDSCH that is scheduled in the DCI format 2D.

In FIG. 20, in the case where the value for 'PDSCH starting position for PDSCH RE mapping,' which is determined from the DCI format 2D for a cell that receives the PDSCH is 5, in the case where the mobile station device 1 is not configured with the carrier indicator field for a cell, or in the same cell, the mobile station device 1 receives the PDSCH and the PDCCH/EPDCCH to which the PDSCH corresponds, in the case where the mobile station device 1 detects the DCI format 2D on the EPDCCH, and in the case where the value for the higher-layer parameter, 'PDSCH starting position for PDSCH RE mapping,' for the DCI format 1A, is 5, and the value for the higher-layer parameter epdcch-Start for a cell is not configured by the higher layer, $l'_{DataStart}$ is given, by the span of the DCI that is given by the CFI of the cell, to the mobile station device 1 that is configured with the transmission mode 10 and that receives the PDSCH that is scheduled in the DCI format 2D.

In FIG. 20, in a case where the PDSCH is scheduled by the DCI format 2D and a subframe is indicated by 'MBSFN subframe configuration for PDSCH RE mapping' that is determined from the DCI format 2D for a cell that receives the PDSCH, and in a case where the PDSCH is scheduled by the DCI format 1A and a subframe is indicated by 'MBSFN subframe configuration for PDSCH RE mapping' for the DCI format 1A for a cell that receives the PDSCH, $l_{DataStart}$ is given based on Equation (1). In FIG. 20, in other cases, $l_{DataStart}$ is set to a value for $l'_{DataStart}$.

"Other cases" include a "case where the PDSCH is scheduled by the DCI format 2D and a subframe is not indicated by 'MBSFN subframe configuration for PDSCH RE mapping' that is determined from the DCI format 2D for a cell that receives the PDSCH," and a "case where the PDSCH is scheduled by the DCI format 1A and a subframe is not indicated by 'MBSFN subframe configuration for PDSCH RE mapping' for the DCI format 1A for a cell that receives the PDSCH."

Furthermore, in a case where the DCI format 1A is received on the CSS, $l'_{DataStart}$ is given by the span of the DCI that is given by the CFI of the cell, and in a case where the DCI format 1A/2D is received on the USS, the example in FIG. 17 may be applied.

Furthermore, the starting position of the resource element to which the physical downlink shared channel is mapped in the first slot in a certain subframe may be determined based on the antenna port that is used for the transmission of the PDSCH.

Antenna ports 0 to 3 are used for the transmission of a Cell-specific Reference Signal (CRS). The CRS's are arranged in a state of being distributed over the whole cell area.

An antenna port 7 is used for transmission of a UE-specific Reference Signal (URS). The URS's are arranged in a state of being distributed within the physical resource block in which the PDSCH is arranged.

In the MBSFN subframe, the PDSCH that is scheduled in the DCI format 1A is transmitted on the antenna port 7. In the non-MBSFN subframe, the PDSCH that is scheduled in the DCI format 1A detected on the CSS is transmitted on the antenna ports 0 to 3.

In the non-MBSFN subframe, the PDSCH that is scheduled in the DCI format 1A that is detected on the USS may be transmitted on the antenna ports 0 to 3. In the non-MBSFN subframe, the PDSCH that is scheduled in the DCI format 1A that is detected on the USS may be transmitted on the antenna port 7.

For example, in a case where the antenna ports 0 to 3 are used for the transmission of the PDSCH, $l_{DataStart}$ may be given, by the span of the DCI that is given by the CFI of a cell, to the mobile station device 1 that is configured with the transmission mode 10 and that receives the PDSCH that is scheduled in the DCI format 1A.

For example, in a case where the antenna port 7 is used for the transmission of the PDSCH, $l_{DataStart}$ is given, based on examples in FIGS. 12 to 16, to the mobile station device 1 that is configured with the transmission mode 10 and that receives the PDSCH that is scheduled in the DCI format 1A.

FIG. 21 is a diagram for describing a sixth example of the starting position of the OFDM symbol to which the PDSCH, which is scheduled by the DCI format 1A, for the mobile station device 1 configured with the transmission mode 10 for a certain cell, is mapped.

For example, in FIG. 21, in the case where the antenna ports 0 to 3 are used for the transmission of the PDSCH, $l_{DataStart}$ may be given, by the span of the DCI that is given by the CFI of a cell, to the mobile station device 1 that is configured with the transmission mode 10 and that receives the PDSCH that is scheduled in the DCI format 2D.

In FIG. 21, in the mobile station device 1 that is configured with the transmission mode 10 and that receives the PDSCH that is scheduled in the DCI format 2D, in the case where the antenna port 7 is used for the transmission of the PDSCH, and in the case where the value for 'PDSCH starting position for PDSCH RE mapping,' which corresponds to the DCI format 1A for a cell that receives the PDSCH, is 0, 1, 2, 3, or 4, $l'_{DataStart}$ is set to the value for 'PDSCH starting position for PDSCH RE mapping.'

In FIG. 21, in the case where the antenna port 7 is used for the transmission of the PDSCH, in the case where the value for 'PDSCH starting position for PDSCH RE mapping,' which corresponds to the DCI format 1A for a cell that receives the PDSCH, is 5, in the case where the mobile station device 1 is configured with the carrier indicator field for a cell, and in the case where, in a different cell, the mobile station device 1 receives the PDSCH and the PDCCH/EPDCCH to which the PDSCH corresponds, $l'_{DataStart}$ is given, by the higher-layer parameter pdsch-Start for a cell that receives the PDSCH, to the mobile station device 1 that is configured with the transmission mode 10 and that receives the PDSCH that is scheduled in the DCI format 2D.

In FIG. 21, in the case where the antenna port 7 is used for the transmission of the PDSCH, in the case where the value for 'PDSCH starting position for PDSCH RE mapping,' which corresponds to the DCI format 1A for a cell that receives the PDSCH, is 5, and in the case where the mobile station device 1 is not configured with the carrier indicator field for a cell, or in the same cell, the mobile station device 1 receives the PDSCH and the PDCCH/EPDCCH to which the PDSCH corresponds, $l'_{DataStart}$ is given, by the span of the DCI that is given by the CFI of the cell, to the mobile station device 1 that is configured with the transmission mode 10 and that receives the PDSCH that is scheduled in the DCI format 2D.

In FIG. 21, in the case where a subframe is indicated by 'MBSFN subframe configuration for PDSCH RE mapping' that corresponds to the DCI format 1A for a cell that receives the PDSCH, $l_{DataStart}$ is given based on Equation (1). In FIG. 21, in other cases, $l_{DataStart}$ is set to a value for $l'_{DataStart}$.

In FIG. 21, "other cases" include the "case where a subframe is not indicated by 'MBSFN subframe configuration for PDSCH RE mapping' that corresponds to the DCI format 1A for a cell that receives the PDSCH."

FIG. 22 is a diagram for describing a seventh example of the starting position of the OFDM symbol to which the PDSCH, which is scheduled by the DCI format 1A, for the mobile station device 1 configured with the transmission mode 10 for a certain cell, is mapped.

In FIG. 22, in the case where the antenna ports 0 to 3 are used for the transmission of the PDSCH, $l_{DataStart}$ is given, by the span of the DCI that is given by the CFI of a cell, to the mobile station device 1 that is configured with the transmission mode 10 and that receives the PDSCH that is scheduled in the DCI format 1A.

In FIG. 22, in the mobile station device 1 that is configured with the transmission mode 10 and that receives the PDSCH that is scheduled in the DCI format 1A, in the case where the antenna port 7 is used for the transmission of the PDSCH, and in the case where the value for 'PDSCH starting position for PDSCH RE mapping,' which corresponds to the DCI format 1A for a cell that receives the PDSCH, is 0, 1, 2, 3, or 4, $l'_{DataStart}$ is set to the value for 'PDSCH starting position for PDSCH RE mapping.'

In FIG. 22, for the mobile station device 1 that is configured with the transmission mode 10 and that receives the PDSCH that is scheduled in the DCI format 1A, in the case where the antenna port 7 is used for the transmission of the PDSCH, in the case where the value for 'PDSCH starting position for PDSCH RE mapping,' which corresponds to the DCI format 1A for a cell that receives the PDSCH, is 5, in the case where the mobile station device 1 is configured with the carrier indicator field for a cell, and in the case where, in a different cell, the mobile station device 1 receives the PDSCH and the PDCCH/EPDCCH to which the PDSCH corresponds, $l'_{DataStart}$ is given, by the higher-layer parameter pdsch-Start for a cell that receives the PDSCH.

In FIG. 22, for the mobile station device 1 that is configured with the transmission mode 10 and that receives the PDSCH that is scheduled in the DCI format 1A, in the case where the antenna port 7 is used for the transmission of the PDSCH, in the case where the value for 'PDSCH starting position for PDSCH RE mapping,' which corresponds to the DCI format 1A for a cell that receives the PDSCH, is 5, in the case where the mobile station device 1 is not configured with the carrier indicator field for a cell, or in the same cell, the mobile station device 1 receives the PDSCH and the PDCCH/EPDCCH to which the PDSCH corresponds, in the case where the mobile station device 1 detects the DCI format 1A on the EPDCCH, and in the case where the value for the higher-layer parameter epdcch-Start for a cell is configured by the higher layer, $l'_{DataStart}$ is given, by the higher-layer parameter epdcch-Start for the cell or by epdcch-Start for the EPDCCH set in which the EPDCCH is received.

In FIG. 22, for the mobile station device 1 that is configured with the transmission mode 10 and that receives the PDSCH that is scheduled in the DCI format 1A, in the case where the antenna port 7 is used for the transmission of the PDSCH, in the case where the value for 'PDSCH starting position for PDSCH RE mapping,' which corresponds to the DCI format 1A for a cell that receives the PDSCH, is 5, in the case where the mobile station device 1 is not configured with the carrier indicator field for a cell, or in the same cell, the mobile station device 1 receives the PDSCH and the PDCCH/EPDCCH to which the PDSCH corresponds, and in the case where the mobile station device 1 detects the DCI format 1A on the PDCCH, $l'_{DataStart}$ is given, by the span of the DCI that is given by the CFI of the cell.

In FIG. 22, for the mobile station device 1 that is configured with the transmission mode 10 and that receives the PDSCH that is scheduled in the DCI format 1A, in the case where the antenna port 7 is used for the transmission of the PDSCH, in the case where the value for 'PDSCH starting position for PDSCH RE mapping,' which corresponds to the DCI format 1A for a cell that receives the PDSCH, is 5, in the case where the mobile station device 1 is not configured with the carrier indicator field for a cell, or in the same cell, the mobile station device 1 receives the PDSCH and the PDCCH/EPDCCH to which the PDSCH corresponds, in the case where the mobile station device 1 detects the DCI format 1A on the EPDCCH, and in the case where the value for the higher-layer parameter epdcch-Start for a cell is not configured by the higher layer, $l'_{DataStart}$ is given, by the span of the DCI that is given by the CFI of the cell.

In FIG. 22, in the case where a subframe is indicated by 'MBSFN subframe configuration for PDSCH RE mapping' that corresponds to the DCI format 1A for a cell that receives the PDSCH, $l_{DataStart}$ is given based on Equation (1). In FIG. 22, in other cases, $l_{DataStart}$ is set to a value for $l'_{DataStart}$.

"Other cases" include the "case where a subframe is not indicated by 'MBSFN subframe configuration for PDSCH RE mapping' that corresponds to the DCI format 1A for a cell that receives the PDSCH."

The starting position (an initial ODFM symbol positioned temporally within the subframe) when mapping the PDSCH to a RE has been focused upon when describing as above. Next, other parameters will be described as well. In the transmission mode 10 (a transmission mode in which configuration with Channel State: Information Reference Signal (CSIRS) (or also referred to as Non Zero Power-CSIRS (NZP-CSIRS) is allowed), a transmission mode in which a virtual cell identity is allowed to be used in a state of being changed to a physical cell identity (in addition to the physical cell identity), or a transmission mode in which CoMP is supported), for example, at least the following can be used as a parameter of the PDSCH:

(P1) the number of CRS ports
(P2) a position of a frequency domain of the CRS
(P3) a position of an MBSFN subframe
(P4) a starting position of the PDSCH
(P5) a position of Zero Power-CSIRS (ZP-CSIRS)
(P6) an index of a CSIRS resource The number of CRS ports according to (P1), for example, takes on any one of values of 1, 2, and 4. When the PDSCH is mapped to the RE, a base station does not map the PDSCH to the RE to which the CRS is mapped. That is, the number of CRS ports according to (P1) is a parameter that is used for specifying the RE (the RE that corresponds to the CRS) to which the PDSCH is not mapped. Preferably, the number of CRS ports in a serving cell, or the number of CRS ports in a cell that performs coordinated communication with the serving cell is configured.

The position of the CRS in frequency domain according to (P2) indicates a subcarrier in which the CRS is arranged within one PRB, and, for example, takes on any one of values ranging from 0 to 5. Like the number of CRS ports according to (P1), the position of the CRS in frequency domain according to (P2) is also a parameter that is used for specifying the RE (the RE that corresponds to the CRS) to which the PDSCH is not mapped. Preferably, the position of the CRS in frequency domain for the serving cell, or the position of the CRS in frequency domain in the cell that performs the coordinated communication with the serving cell is configured.

The position of the MBSFN subframe according to (P3), for example, includes information that specifies a period of a radio frame (10 subframes), information that specifies an offset, information that specifies a subframe within the radio frame, and the like. For the information that specifies a subframe within the radio frame, a method can be used in which, for example, one bit is prepared for one or each of four consecutive candidates for MBSFN subframes within the radio frame, and with one such bit, it is indicated whether or not the corresponding subframe is the MBSFN subframe. The CRS is not arranged in the PDSCH region (an OFDM symbol region to which the PDCCH is not mapped) in the MBSFN subframe. For this reason, like the number of CRS ports according to (P1), the position of the MBSFN subframe according to (P3) is also a parameter that is used for specifying the RE (the RE that corresponds to the CRS) to which the PDSCH is not mapped. Preferably, the position of the MBSFN subframe of the serving cell, or the MBSFN subframe in a cell that performs the coordinated communication with a certain serving cell is configured.

The starting position of the PDSCH according to (P4), for example, takes on any one of values of 0, 1, 2, 3, and 4. For example, in a case where 2 is indicated, this means that the PDSCH is mapped to the second OFDM symbol or a subsequent OFDM symbol within one subframe. Furthermore, in addition to the state indicating these values, one state can be also configured by being selected from among states indicating the starting positions (or the starting positions that are specified by configuration of certain cross carrier scheduling) that are based on the PCFICH. The starting position of the PDSCH according to (P4) is a parameter that is used for designating a RE region to which the PDSCH is mapped. Alternatively, it can be said that the starting position of the PDSCH in (P4) is a parameter that is used for specifying the RE region (a region that is reserved for the transmission of the PDSCH and the like) to which the PDSCH is not mapped. Preferably, a number of the OFDM symbol in a region after the region reserved for the transmission of the PDCCH and the like in the serving cell, or a number of the OFDM symbol in a region after the region reserved for the transmission of the PDCCH and the like in a cell that performs the coordinated communication with a certain serving cell is configured.

The position of the ZP-CSIRS according to (P5), for example, includes information specifying a period of a subframe including the ZP-CSIRS and specifying the offset, information specifying the position (a position of the RE that is configured as the ZP-CSIRS) of the ZP-CSIRS within the subframe, and the like. The base station does not map the PDSCH to the RE that is configured as the ZP-CSIRS when the PDSCH is mapped to the RE. That is, the position of the ZP-CSIRS according to (P5) is a parameter that is used for specifying the RE (the RE that corresponds to the ZP-CSIRS) to which the PDSCH is not mapped. Preferably, the position(s) of the ZP-CSIRS and/or the CSIRS in the serving cell, or the position(s) the ZP-CSIRS and/or the CSIRS in a cell that perform(s) the coordinated communication with a certain serving cell is (are) configured.

According to (P6), the index of the CSIRS resource is an index that is assigned to one or more CSIRS resources. When demodulating the PDSCH, the terminal uses the Demodulation Reference Signal (DMRS) (also referred to as a UE-specific Reference Signal). According to (P6), the index of the CSIRS resource indicates which CSIRS resource (only) the CSIRS that is transmitted (co-located) from the same transmission point as the DMRS can be regarded as corresponding to (whether or not being quasi co-located). That is suitable for performing channel estimation with the DMRS, because the terminal can assume that the CSIRS and the DMRS that are indicated are received through channels similar to each other. That is, the CSIRS resource in (P6) is a parameter that is used for specifying the CSIRS resource of the CSIRS that is regarded as being transmitted from the same transmission point as the DMRS that is transmitted together with the PDSCH. Preferably, the CSIRS resource of the CSIRS that is transmitted from the serving cell, or the CSIRS resource of the CSIRS that is transmitted from a cell that performs the coordinated communication with a certain serving cell is configured. At this point, the CSIRS resource means not only a RE resource with which the CSIRS is transmitted, but also one unit of configuration information for the RE resource with which the CSIRS is transmitted. In other words, (P6) is information relating to the quasi co-location of the UE-specific reference signal, which is added to a physical downlink shared channel.

In a case where the transmission mode 10 is configured, the base station can configure the terminal with one or more (for example 4 types) combinations of above-described parameters as a parameter set. Moreover, multiple parameter sets may include combinations of substantially the same parameters. One or more such parameter sets are configured using dedicated RRC signaling that is semi-static signaling for the base station to the terminal. Additionally, in a case where the PDSCH is scheduled using the DCI format 2D (the DCI format that supports MIMO transmission, the DCI format specific to the transmission mode 10), the base station assigns any parameter among configured parameter sets to the terminal using a combination of bits in a predetermined field within the DCI format 2D. For example, when 4 parameter sets are expressed, a 2-bit field can be used. The base station (or the cooperative base station) transmits the PDSCH using a parameter that is included in such a parameter set. Furthermore, the terminal performs processing (RE demapping processing of the PDSCH, demodulation processing that receives the PDSCH, or the like), assuming that the PDSCH is transmitted using the parameter that is included in the parameter set. Preferably, each parameter set is configured from a combination of parameters that corresponds to each cell (or each transmission point) that performs downlink coordinated communication, or corresponds to a combination of such cells.

At this time, a sequence identity for generating a sequence that is used for the DMRS on the PDSCH is indicated using a combination of bits in a field indicating the sequence identity within the DCI format 2D. Preferably, any one of 2 identities (for example, 0 and 1) is indicated. The base station, in advance, notifies the terminal of a virtual cell identity (for example, $X_0$ for 0, $X_1$ for 1) that corresponds to each of the sequence identities as a cell identity for generating a sequence that is used for the DMRS on the PDSCH, and the sequence is determined that corresponds to the sequence identity indicated within the DCI format 2D. Moreover, the virtual cell identity may have the same value as the physical cell identity.

Furthermore, at least the combination of bits in the field indicating the sequence identity within the DCI format 2D can be used for assigning any parameter set among the parameter sets that are configured with the DCI format 2D to the terminal. For example, a combination of two types of sequence identities and a different one-bit can be used when 4 parameter sets are expressed. In this case, for example, among 4 parameter sets, in 2 parameter sets, the sequence identify is 0 and in the other 2 parameter sets, the sequence identity is 1.

On the other hand, in a case where the DCI format 1A (the DCI format that does not support the MIMO transmission of the PDSCH, the DCI format that is used in common among all the transmission modes, or the DCI format that, in one cell, is used for compact scheduling of one PDSCH codeword and for a random access procedure due to a PDCCH order) is used, the base station can use a different method from a method of specifying a parameter in a case of the DCI format 2D (the DCI format that supports the MIMO transmission of the PDSCH, or the DCI format that is used only in the transmission mode 10).

In a case where the base station transmits the DCI format 1A to the terminal using the PDCCH, any one of the following methods (L1) to (L5) and the like can be used.

(L1) Parameters for the serving cell are used, and the physical cell identity is used as the cell identity.

(L2) One predetermined parameter set (for example, any one of the first parameter set and a parameter set in which the sequence identity is 0) among the one or more parameter sets described above is used, and the physical cell identity is used as the cell identity.

(L3) One predetermined parameter set (for example, any one of the first parameter set and a parameter set in which the sequence identity is 0) among the one or more parameter sets described above is used, and $X_0$ that is the virtual cell identity corresponding to a sequence identity 0 is used as the cell identity.

(L4) One parameter set that is indicated by a bit in a predetermined field in the DCI format 1A among the one or more parameter sets described above is used, and the physical cell identity is used as the cell identity. At this point, as the predetermined field, a field for arranging bits indicating whether resource blocks are arranged in a local or distributed manner can be used. In this case, bits in such a field are not indicating any type of resource blocks and it is assumed to be arranged at all times in a local manner.

(L5) One parameter set that is indicated by a bit in a predetermined field in the DCI format 1A among the one or more parameter sets described above is used, and $X_0$ that is the virtual cell identity corresponding to the sequence identity 0 is used as the cell identity. At this point, as the predetermined field, a field for arranging bits indicating whether resource blocks are arranged in a local or distributed manner can be used. In this case, bits in such a field are not indicating any type of resource blocks and it is assumed to be arranged at all times in a local manner.

In the transmission mode 10 in which the coordinated communication can be performed, the PDCCH can be transmitted at all times from the serving cell. That is, as parameters, for example, the number of CRS ports when transmitting and receiving the PDCCH, the position of the CRS in frequency domain, the position of the MBSFN subframe, the position of the ZP-CSIRS, the position of the CRS in frequency domain in the serving cell, the position of the MBSFN subframe, and the position of the ZP-CSIRS are used. Furthermore, as the starting position of the PDSCH, the starting position that is indicated by the PCFICH is used.

According to (L1), the parameters for the serving cell are used, and the physical cell identity is used as the cell identity. That is, the PDSCH that is triggered with the PDCCH is regarded as being transmitted from the serving cell. More specifically, as parameters, for example, the number of CRS ports when transmitting and receiving the PDSCH, the position of the CRS in frequency domain, the position of the MBSFN subframe, and the position of the ZP-CSIRS, the position of the CRS in frequency domain in the serving cell, the position of the MBSFN subframe, and the position of the ZP-CSIRS are used. Furthermore, as the starting position of the PDSCH, the starting position that is indicated by the PCFICH is used. Furthermore, the DMRS on the PDSCH is regarded as being co-located with the CRS. Additionally, as the cell identity in the DMRS, the physical cell identity that is the cell identity of the serving cell is used. Accordingly, even if the PDSCH is in the communication mode in which the coordinated communication is performed, the base station can fall back to PDSCH transmission from only the serving cell by using the DCI format 1A.

According to (L2), one predetermined parameter set (for example, any one of the first parameter set and a parameter set in which the sequence identity is 0) among one or more parameter sets is used, and the physical cell identity is used as the cell identity. That is, the PDSCH that is triggered with the PDCCH is regarded as being transmitted from a cell (or a transmission point) that is configured in a semi-static manner. More specifically, as parameters, for example, the number of CRS ports when transmitting and receiving the PDSCH, the position of the CRS in frequency domain, the position of the MBSFN subframe, and the position of the ZP-CSIRS, the position of the CRS in frequency domain in the cell (or the transmission point) that is configured in a semi-stationary manner, the position of the MBSFN subframe, and the position of the ZP-CSIRS are used. Furthermore, as the starting position of the PDSCH, a starting position based on a region of a physical control channel in the cell (or the transmission point) that is configured in a semi-static manner is configured. Furthermore, the DMRS on the PDSCH is regarded as being co-located with the CSIRS that is transmitted from the cell (or the transmission point) that is configured in a semi-static manner. On the other hand, as the cell identity in the DMRS, the physical cell identity that is the cell identity of the serving cell is used. Accordingly, because the cell (or the transmission point) of which a channel state is comparatively satisfactory as the cell (or the transmission point) that is configured in a semi-static manner can be configured, the base station can perform the PDSCH transmission from the cell (or the transmission point) of which the channel state is comparatively satisfactory by using the DCI format 1A. On the other hand, the cell identity in the DMRS can retain orthogonality with the DMRS that is transmitted from the serving cell by using the physical cell identity.

According to (L3), one predetermined parameter set (for example, any one of the first parameter set and a parameter set in which the sequence identity is 0) among one or more parameter sets is used, and the physical cell identity is used as the cell identity. That is, the PDSCH that is triggered with the PDCCH is regarded as being transmitted from a cell (or a transmission point) that is configured in a semi-static manner. More specifically, as parameters, for example, the number of CRS ports when transmitting and receiving the PDSCH, the position of the CRS in frequency domain, the position of the MBSFN subframe, and the position of the ZP-CSIRS, the position of the CRS in frequency domain in the cell (or the transmission point) that is configured in a semi-static manner, the position of the MBSFN subframe, and the position of the ZP-CSIRS are used. Furthermore, as the starting position of the PDSCH, a starting position based on a region of a physical control channel in the cell (or the transmission point) that is configured in a semi-static manner is configured. Furthermore, the DMRS on the PDSCH is regarded as being co-located with the CSIRS that is transmitted from the cell (or the transmission point) that is configured in a semi-static manner. Additionally, as the cell identity in the DMRS, the physical cell identity of the cell (or the transmission point) that is configured in a semi-static manner is used as the virtual cell identity. Accordingly, because the cell (or the transmission point) of which a channel state is comparatively satisfactory as the cell (or the transmission point) that is configured in a semi-static manner can be configured, the base station can perform the PDSCH transmission from the cell (or the transmission point) of which the channel state is comparatively satisfactory by using the DCI format 1A. Furthermore, by using the virtual cell identity, the cell identity in the DMRS can retain the orthogonality to the DMRS on the PDSCH that is intended for a different terminal and that is transmitted from the cell (or the transmission point) that is configured in a semi-static manner.

According to (L4), one parameter set that is indicated by a bit in a predetermined field in the DCI format 1A among one or more parameter sets is used, and the physical cell identity is used as the cell identity. That is, the PDSCH that is triggered with the PDCCH is regarded as being transmitted from multiple cells (or transmission points) that are dynamically selected from among cells (or transmission points) that are configured in a semi-static manner. More specifically, as parameters, for example, the number of CRS ports when transmitting and receiving the PDSCH, the position of the CRS in frequency domain, the position of the MBSFN subframe, and the position of the ZP-CSIRS, the position of the CRS in frequency domain in the cell (or the transmission point) that is dynamically selected, the position of the MBSFN subframe, and the position of the ZP-CSIRS are used. Furthermore, as the starting position of the PDSCH, a starting position based on a region of a physical control channel in the cell (or the transmission point) that is dynamically selected is configured. Furthermore, the DMRS on the PDSCH is regarded as being co-located with the CSIRS that is transmitted from the cell (or the transmission point) that is dynamically selected. Additionally, as the cell identity in the DMRS, the physical cell identity is used. Accordingly, because the cell (or the transmission point) of which a channel state is satisfactory as the cell (or the transmission point) that is dynamically selected can be selected, the base station can perform the PDSCH transmission from the cell (or the transmission point) of which the channel state is satisfactory by using the DCI format 1A. On the other hand, the cell identity in the DMRS can retain the orthogonality with the DMRS that is transmitted from the serving cell by using the physical cell identity.

According to (L5), one parameter set that is indicated by a bit in a predetermined field in the DCI format 1A among one or more parameter sets is used, and $X_0$ that is the virtual cell identity corresponding to the sequence identity 0 is used as the cell identity. That is, the PDSCH that is triggered with the PDCCH is regarded as being transmitted from multiple cells (or transmission points) that are dynamically selected from among cells (or transmission points) that are configured in a semi-static manner. More specifically, as parameters, for example, the number of CRS ports when transmitting and receiving the PDSCH, the position of the CRS in frequency domain, the position of the MBSFN subframe, and the position of the ZP-CSIRS, the position of the CRS in frequency domain in the cell (or the transmission point) that is dynamically selected, the position of the MBSFN subframe, and the position of the ZP-CSIRS are used. Furthermore, as the starting position of the PDSCH, a starting position based on a region of a physical control channel in the cell (or the transmission point) that is dynamically selected is configured. Furthermore, the DMRS on the PDSCH is regarded as being co-located with the CSIRS that is transmitted from the cell (or the transmission point) that is dynamically selected. Additionally, as the cell identity in the DMRS, the physical cell identity of the cell (or the transmission point) that is configured in a semi-static manner can be used as the virtual cell identity. Accordingly, because the cell (or the transmission point) of which a channel state is satisfactory as the cell (or the transmission point) that is dynamically selected can be selected, the base station can perform the PDSCH transmission from the cell (or the transmission point) of which the channel state is satisfactory by using the DCI format 1A. Furthermore, by using the virtual cell identity, the cell identity in the DMRS can retain the orthogonality to the DMRS on the PDSCH that is intended for a different terminal and that is transmitted from the cell (or the transmission point) that is configured in a semi-static manner.

Moreover, here, a case where each parameter set corresponds to each of the cells (or of the transmission points) is described, but the present invention is not limited to this case. Two or more parameter sets may correspond to the same cell (or the transmission points). For example, in a case where, in two parameter sets, (P1), (P2), (P3), (P5), and (P6) are common, and (P4) is different, these two parameter sets correspond to the same cell (or the same transmission point) and indicate that control channel regions are different from one another.

In a case where the base station transmits the DCI format 1A to the terminal using the EPDCCH, any one of the following methods (E1) to (E7) can be used.

(E1) Parameters for the serving cell are used, and the physical cell identity is used as the cell identity.

(E2) One predetermined parameter set (for example, any one of the first parameter set and a parameter set in which the sequence identity is 0) among the one or more parameter sets described above is used, and the physical cell identity is used as the cell identity.

(E3) One predetermined parameter set (for example, any one of the first parameter set and a parameter set in which the sequence identity is 0) among the one or more parameter sets described above is used, and $X_0$ that is the virtual cell identity corresponding to the sequence identity 0 is used as the cell identity.

(E4) One parameter set that is indicated by a bit in a predetermined field in the DCI format 1A among the one or more parameter sets described above is used, and the physical cell identity is used as the cell identity. At this point, as the predetermined field, a field for arranging bits indicating whether resource blocks are arranged in a local or distributed manner can be used. In this case, bits in such a field are not indicating any type of resource blocks and it is assumed to be arranged at all times in a local manner.

(E5) One parameter set that is indicated by a bit in a predetermined field in the DCI format 1A among the one or more parameter sets described above is used, and $X_0$ that is the virtual cell identity corresponding to the sequence identity 0 is used as the cell identity. At this point, as the predetermined field, a field for arranging bits indicating whether resource blocks are arranged in a local or distributed manner can be used. In this case, bits in such a field are not indicating any type of resource blocks and it is assumed to be arranged at all times in a local manner.

(E6) One parameter set that corresponds to the EPDCCH set that includes the search space in which the EPDCCH that triggers the PDSCH is arranged, among one or more parameter sets described above is used, and the physical cell identity is used as the cell identity. At this point, information that indicates one parameter set among the one or more parameter sets described above in advance as one parameter set that corresponds to the EPDCCH set may be included in the configuration information on the EPDCCH set. That is, one parameter set that corresponds to the EPDCCH set is one parameter set that is indicated by configuration information on the EPDCCH set which is included in the dedicated RRC signaling, among the one or more parameter sets described above.

(E7) One parameter set that corresponds to the EPDCCH set that includes the search space in which the EPDCCH that triggers the PDSCH is arranged, among one or more parameter sets described above is used, and $X_0$ that is the virtual cell identity corresponding to the sequence 0 is used as the cell identity. At this point, information that indicates one parameter set among the one or more parameter sets described above in advance as one parameter set that corresponds to the EPDCCH set may be included in the configuration information on the EPDCCH set. That is, one parameter set that corresponds to the EPDCCH set is one parameter set that is indicated by the configuration information on the EPDCCH set which is included in the dedicated RRC signaling, among the one or more parameter sets described above.

In the transmission mode 10 that can perform the coordinated communication, the EPDCCH can be transmitted from any one of an serving cell, a different cell, or a combination of these. The EPDCCH is arranged in the search space that is included in each of multiple EPDCCH sets (for example, two EPDCCH sets). At this time, by associating an individual parameter set with each of the EPDCCH sets, the base station (or the cooperative base station) can dynamically select the parameter set, depending on which EPDCCH set the EPDCCH is arranged in the search space in. Consequently, any one of an serving cell, a different cell, and a combination of these, from which the transmission takes place, can be dynamically selected. Moreover, at this point, a case where a parameter set that is associated with each EPDCCH set is any one among one or more parameter sets relating to the PDSCH described above is described, but the present invention is not limited to this case. The parameter set that is associated with each EPDCCH set can be configured in advance independently of the one or more parameter sets relating to the PDSCH.

According to (E1), the parameters for the serving cell are used, and the physical cell identity is used as the cell identity. That is, the PDSCH that is triggered with the EPDCCH is regarded as being transmitted from the serving cell. More specifically, as parameters, for example, the number of CRS ports when transmitting and receiving the PDSCH, the position of the CRS in frequency domain, the position of the MBSFN subframe, and the position of the ZP-CSIRS, the position of the CRS in frequency domain in the serving cell, the position of the MBSFN subframe, and the position of the ZP-CSIRS are used. Furthermore, the starting position of the EPDCCH that is triggered is configured in advance with the dedicated RRC signaling and the like, and as the starting position of the PDSCH, the same starting position as the starting position of the EPDCCH is used. Furthermore, the DMRS on the PDSCH is regarded as being co-located with the CRS. Additionally, as the cell identity in the DMRS, the physical cell identity that is the cell identity of the serving cell is used. Accordingly, even if the PDSCH is in the mode in which the coordinated communication is performed, the base station can fall back to the PDSCH transmission from only the serving cell by using the DCI format 1A.

According to (E2), one predetermined parameter set (for example, any one of the first parameter set and a parameter set in which the sequence identity is 0) among one or more parameter sets is used, and the physical cell identity is used as the cell identity. That is, the PDSCH that is triggered with the EPDCCH is regarded as being transmitted from a cell (or a transmission point) that is configured in a semi-static manner. More specifically, as parameters, for example, the number of CRS ports when transmitting and receiving the PDSCH, the position of the CRS in frequency domain, the position of the MBSFN subframe, and the position of the ZP-CSIRS, the position of the CRS in frequency domain in the cell (or the transmission point) that is configured in a semi-static manner, the position of the MBSFN subframe, and the position of the ZP-CSIRS are used. Furthermore, as the starting position of the PDSCH, a starting position based on a region of a physical control channel in the cell (or the transmission point) that is configured in a semi-static manner is configured. Furthermore, the DMRS on the PDSCH is regarded as being co-located with the CSIRS that is transmitted from the cell (or the transmission point) that is configured in a semi-static manner. On the other hand, as the cell identity in the DMRS, the physical cell identity that is the cell identity of the serving cell is used. Accordingly, because the cell (or the transmission point) of which a channel state is comparatively satisfactory as the cell (or the transmission point) that is configured in a semi-static manner can be configured, the base station can perform the PDSCH transmission from the cell (or the transmission point) of which the channel state is comparatively satisfactory by using the DCI format 1A. On the other hand, the cell identity in the DMRS can retain the orthogonality with the DMRS that is transmitted from the serving cell by using the physical cell identity.

According to (E3), one predetermined parameter set (for example, any one of the first parameter set and a parameter set in which the sequence identity is 0) among one or more parameter sets is used, and the physical cell identity is used as the cell identity. That is, the PDSCH that is triggered with the EPDCCH is regarded as being transmitted from a cell (or a transmission point) that is configured in a semi-static manner. More specifically, as parameters, for example, the number of CRS ports when transmitting and receiving the PDSCH, the position of the CRS in frequency domain, the position of the MBSFN subframe, and the position of the ZP-CSIRS, the position of the CRS in frequency domain in the cell (or the transmission point) that is configured in a semi-static manner, the position of the MBSFN subframe, and the position of the ZP-CSIRS are used. Furthermore, as the starting position of the PDSCH, a starting position based on a region of a physical control channel in the cell (or the transmission point) that is configured in a semi-static manner is configured is configured. Furthermore, the DMRS on the PDSCH is regarded as being co-located with the CSIRS that is transmitted from the cell (or the transmission point) that is configured in a semi-static manner. Additionally, as the cell identity in the DMRS, the physical cell identity of the cell (or the transmission point) that is configured in a semi-static manner is used as the virtual cell identity. Accordingly, because the cell (or the transmission point) of which a channel state is comparatively satisfactory as the cell (or the transmission point) that is configured in a semi-static manner can be configured, the base station can perform the PDSCH transmission from the cell (or the transmission point) of which the channel state is comparatively satisfactory by using the DCI format 1A. Furthermore, by using the virtual cell identity, the cell identity in the DMRS can retain the orthogonality to the DMRS on the PDSCH that is intended for a different terminal and that is transmitted from the cell (or the transmission point) that is configured in a semi-static manner.

According to (E4), one parameter set that is indicated by a bit in a predetermined field in the DCI format 1A among one or more parameter sets is used, and the physical cell identity is used as the cell identity. That is, the PDSCH that is triggered with the EPDCCH is regarded as being transmitted from multiple cells (or transmission points) that are dynamically selected from among cells (or transmission points) that are configured in a semi-static manner. More specifically, as parameters, for example, the number of CRS ports when transmitting and receiving the PDSCH, the position of the CRS in frequency domain, the position of the MBSFN subframe, and the position of the ZP-CSIRS, the position of the CRS in frequency domain in the cell (or the transmission point) that is dynamically selected, the position of the MBSFN subframe, and the position of the ZP-CSIRS are used. Furthermore, as the starting position of the PDSCH, a starting position based on a region of a physical control channel in the cell (or the transmission point) that is dynamically configured is configured. Furthermore, the DMRS on the PDSCH is regarded as being co-located with the CSIRS that is transmitted from the cell (or the transmission point) that is dynamically selected. Additionally, as the cell identity in the DMRS, the physical cell identity is used. Accordingly, because the cell (or the transmission point) of which a channel state is satisfactory as the cell (or the transmission point) that is dynamically selected can be selected, the base station can perform the PDSCH transmission from the cell (or the transmission point) of which the channel state is satisfactory by using the DCI format 1A. On the other hand, the cell identity in the DMRS can retain the orthogonality with the DMRS that is transmitted from the serving cell by using the physical cell identity.

According to (E5) one parameter set that is indicated by a bit in a predetermined field in the DCI format 1A among one or more parameter sets is used, and $X_0$ that is the virtual cell identity corresponding to the sequence identity 0 is used as the cell identity. That is, the PDSCH that is triggered with the EPDCCH is regarded as being transmitted from multiple cells (or transmission points) that are dynamically selected from among cells (or transmission points) that are configured in a semi-static manner. More specifically, as parameters, for example, the number of CRS ports when transmitting and receiving the PDSCH, the position of the CRS in frequency domain, the position of the MBSFN subframe, and the position of the ZP-CSIRS, the position of the CRS in frequency domain in the cell (or the transmission point) that is dynamically selected, the position of the MBSFN subframe, and the position of the ZP-CSIRS are used. Furthermore, as the starting position of the PDSCH, a starting position based on a region of a physical control channel in the cell (or the transmission point) that is dynamically selected is configured.

Furthermore, the DMRS on the PDSCH is regarded as being co-located with the CSIRS that is transmitted from the cell (or the transmission point) that is dynamically selected. Additionally, as the cell identity in the DMRS, the physical cell identity of the cell (or the transmission point) that is configured in a semi-static manner can be used as the virtual cell identity. Accordingly, because the cell (or the transmission point) of which a channel state is satisfactory as the cell (or the transmission point) that is dynamically selected can be selected, the base station can perform the PDSCH transmission from the cell (or the transmission point) of which the channel state is satisfactory by using the DCI format 1A. Furthermore, by using the virtual cell identity, the cell identity in the DMRS can retain the orthogonality to the DMRS on the PDSCH that is intended for a different terminal and that is transmitted from the cell (or the transmission point) that is configured in a semi-static manner.

According to (E6), one parameter set that corresponds to the EPDCCH set that includes the search space in which the EPDCCH that triggers the PDSCH is arranged is used, and the physical cell identity is used as the cell identity. That is, the PDSCH that is triggered with the EPDCCH is regarded as being transmitted from a cell (or a transmission point) from which the EPDCCH is transmitted. More specifically, as parameters, for example, the number of CRS ports when transmitting and receiving the PDSCH, the position of the CRS in frequency domain, the position of the MBSFN subframe, and the position of the ZP-CSIRS, the position of the CRS in frequency domain in the cell (or the transmission point) from which the EPDCCH is transmitted, the position of the MBSFN subframe, and the position of the ZP-CSIRS are used. Furthermore, as the starting position of the PDSCH, a starting position based on a region of a physical control channel in the cell (or the transmission point) from which the EPDCCH is transmitted is configured. Furthermore, the DMRS on the PDSCH is regarded as being co-located with the CSIRS that is transmitted from the cell (or the transmission point) from which the EPDCCH is transmitted. On the other hand, as the cell identity in the DMRS, the physical cell identity of the serving cell is used. Accordingly, because the cell (or the transmission point) of which a channel state is satisfactory as the cell (or the transmission point) from which the EPDCCH is transmitted can be selected, the base station can perform the PDSCH transmission from the cell (or the transmission point) of which the channel state is satisfactory by using the DCI format 1A. On the other hand, the cell identity in the DMRS can retain the orthogonality with the DMRS that is transmitted from the serving cell by using the physical cell identity.

According to (E7), one parameter set that corresponds to the EPDCCH set that includes the search space in which the EPDCCH that triggers the PDSCH is arranged is used, and $X_0$ that is the virtual cell identity corresponding to the sequence 0 is used as the cell identity. That is, the PDSCH that is triggered with the EPDCCH is regarded as being transmitted from a cell (or a transmission point) from which the EPDCCH is transmitted. More specifically, as parameters, for example, the number of CRS ports when transmitting and receiving the PDSCH, the position of the CRS in frequency domain, the position of the MBSFN subframe, and the position of the ZP-CSIRS, the position of the CRS in frequency domain in the cell (or the transmission point) from which the EPDCCH is transmitted, the position of the MBSFN subframe, and the position of the ZP-CSIRS are used. Furthermore, as the starting position of the PDSCH, a starting position based on a region of a physical control channel in the cell (or the transmission point) from which the EPDCCH is transmitted is configured. Furthermore, the DMRS on the PDSCH is regarded as being co-located with the CSIRS that is transmitted from the cell (or the transmission point) from which the EPDCCH is transmitted. Additionally, as the cell identity in the DMRS, the physical cell identity of the cell (or the transmission point) from which the EPDCCH is transmitted can be used as the virtual cell identity. Accordingly, because the cell (or the transmission point) of which a channel state is satisfactory as the cell (or the transmission point) from which the EPDCCH is transmitted can be selected, the base station can perform the PDSCH transmission from the cell (or the transmission point) of which the channel state is satisfactory by using the DCI format 1A. Furthermore, by using the virtual cell identity, the cell identity in the DMRS can retain the orthogonality to the DMRS on the PDSCH that is intended for a different terminal and that is transmitted from the cell (or the transmission point) that is configured in a semi-static manner.

A case where the base station transmits the DCI format 1A to the terminal using the PDCCH and a case where the base station transmits the DCI format 1A to the terminal using the EPDCCH are described, but these cases can be freely combined with each other. For example, the base station can use the case (L1) in which the DCI format 1A is transmitted to the terminal using the PDCCH, and can use the case (E1) in which the DCI format 1A is transmitted to the terminal using the EPDCCH. In this manner, when transmission and reception processing in a case where the triggering is performed by the PDCCH, and transmission and reception processing in a case where the triggering is performed by the EPDCCH are set to be common, complexity of processing operations in the base station and the terminal can be suppressed. On the other hand, for example, the base station can use the case (L2) in which the DCI format 1A is transmitted to the terminal using the PDCCH, and can use the case (E7) in which the DCI format 1A is transmitted to the terminal using the EPDCCH. In this manner, when the transmission and reception processing in the case where the triggering is performed by the PDCCH, and the transmission and reception processing in the case where the triggering is performed by EPDCCH are set to be different from each other, the base station can adaptively select the transmission and reception processing in the case where the PDCCH is used and the transmission and reception processing in the case where the EPDCCH is used. Furthermore, in addition to the case where the transmission to the terminal takes place using the PDCCH and the case where the transmission to the terminal takes place using the EPDCCH, these operations can also be switched in either of a case where a normal dynamic scheduling (scheduling by the DCI format (for example, the DCI format that is transmitted on the PDCCH or the EPDCCH and to which CRC parity bits scrambled with C-RNTI are attached) that is masked with a normal terminal identity, scheduling by which the DCI format that performs triggering and the PDSCH that is triggered are arranged in one subframe) is performed and a case where semi-static scheduling (scheduling by the DCI format (for example, the DCI format that is transmitted on the PDCCH or the EPDCCH and to which the CRS parity bits scrambled with SPS C-RNTI are attached) that is masked with a terminal identity for semi-static scheduling, scheduling by which the PDSCH in multiple subframes can be triggered by the DCI format in one subframe) is performed. Furthermore, these operations can be switched depending on whether PDSCH transmission and reception in a normal subframe (a subframe that is not the MBSFN subframe) or PDSCH transmission and reception in the MBSFN subframe takes place.

For example, in dynamic scheduling that uses the DCI format 1A, in the transmission modes 1 to 9, in both of a normal subframe and the MBSFN subframe, (L1) is set to be used in both of a case of the PDCCH arranged on the CSS and a case of the PDCCH arranged on the USS, and (E1) is set to be used in a case of the EPDCCH arranged on the USS. Furthermore, in the transmission mode 10, in the case of the PDCCH arranged on the CSS, (L1) is set to be used, any one (for example, (L3)) of (L2) to (L5) is set to be used in the case of the PDCCH arranged on the USS, and any one (for example, (E3)) of (E1) to (E7) is set to be used in the case of the EPDCCH arranged on the USS. On the other hand, in the transmission mode 10, in the MBSFN subframe, any one (for example, (L3)) of (L2) to (L5) is set to be used in both of the case of the PDCCH arranged on the CSS and the case of the PDCCH arranged on the USS, and any one (for example, (E3)) of (E1) to (E7) is set to be used in the case of the EPDCCH arranged on the USS.

On the other hand, in the semi-static scheduling that uses the DCI format 1A, in both of a normal subframe and the MBSFN subframe, in the transmission modes 1 to 9, in both of a normal subframe and the MBSFN subframe, (L1) is set to be used in both of a case of the PDCCH arranged on the CSS and a case of the PDCCH arranged on the USS, and (E1) is set to be used in a case of the EPDCCH arranged on the USS. Furthermore, for both of the normal subframe and the MBSFN subframe, in the transmission mode 10, any one (for example, (L3)) of (L2) to (L5) is set to be used in both of the case of the PDCCH arranged on the CSS and the case of the PDCCH arranged on the USS, and any one (for example, (E3)) of (E1) to (E7) is set to be used in the case of the EPDCCH arranged on the USS.

Accordingly, processing other than the transmission and reception processing of the PDCCH arranged on the CSS can be set to be common to the normal subframe and the MBSFN subframe. Furthermore, processing other than the transmission and reception processing of the PDCCH arranged on the CSS can be set to be common to the dynamic scheduling and the semi-static scheduling. For this reason, the complexity of the transmission processing in the base station and of the transmission processing the terminal can be suppressed.

To sum up, the base station arranges the physical downlink shared channel in a subframe, using a parameter set that is based on at least one among the transmission mode (the transmission modes 1 to 9, or the transmission mode 10) for the transmission on the physical downlink shared channel, the downlink physical channel (the PDCCH or the EPDCCH) that is used for the transmission of a downlink control information format which indicates the transmission of the physical downlink shared channel, and the search space (the CSS or the USS) that detects the downlink control information format. The terminal device determines a parameter set relating to the physical downlink shared channel that is arranged in the subframe, based on at least one among the transmission mode for the transmission on the physical downlink shared channel, the physical downlink shared channel that is used for the transmission of the downlink control information format that indicates the transmission of the physical downlink shared channel, and the search space that detects the downlink control information format. At this point, the parameter set includes at least one, among the starting position ((P4)) of the resource element to which the physical downlink shared channel in the first slot is mapped, the positions ((P1), (P2), (P3), and (P5)) of the element resources to which the physical downlink shared channel is not mapped, and the quasi co-location (P6) of the UE-specific reference signal that is added to the physical downlink shared channel.

A device configuration according to the present embodiment will be described below.

Figure 23:
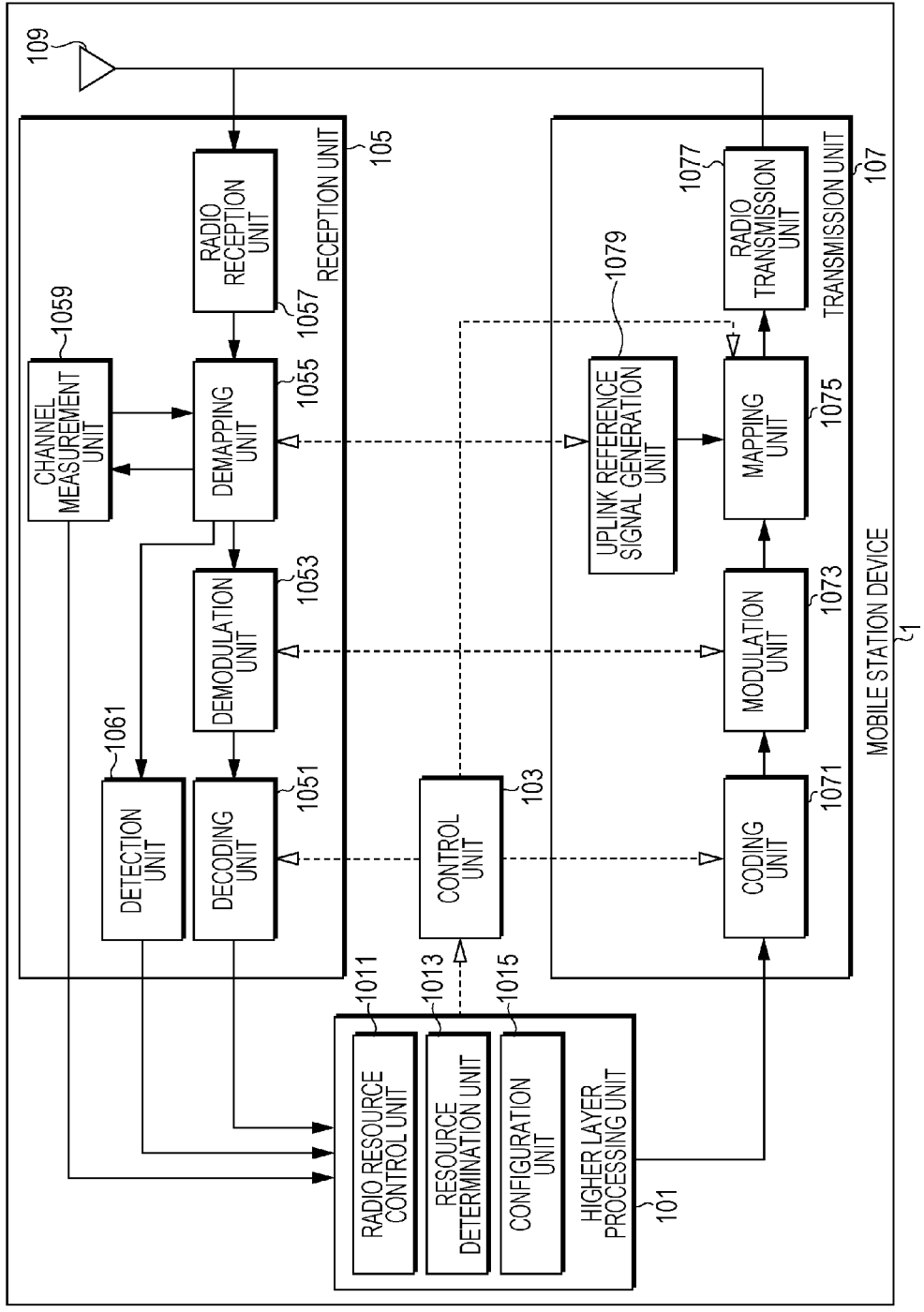
FIG. 23 is a schematic block diagram illustrating a configuration of the mobile station device 1 according to the present embodiment.

FIG. 23 is a schematic block diagram illustrating a configuration of the mobile station device 1 according to the present embodiment. As illustrated, the mobile station device 1 is configured to include a higher layer processing unit 101, a control unit 103, a reception unit 105, a transmission unit 107, and a transmit and receive antenna 109. Furthermore, the higher layer processing unit 101 is configured to include a radio resource control unit 1011, a resource determination unit 1013, and a configuration unit 1015. Furthermore, the reception unit 105 is configured to include a decoding unit 1051, a demodulation unit 1053, a demapping unit 1055, a radio reception unit 1057, a channel measurement unit 1059, and a detection unit 1061. Furthermore, the transmission unit 107 is configured to include a coding unit 1071, a modulation unit 1073, a mapping unit 1075, a radio transmission unit 1077, and an uplink reference signal generation unit 1079.

The higher layer processing unit 101 outputs uplink data (the transport block) generated by a user operation and the like, to the transmission unit 107. The higher layer processing unit 101 performs processing of a Medium Access Control (MAC) layer, a Packet Data Convergence Protocol (PDCP) layer, a Radio Link Control (RLC) layer, and a Radio Resource Control (RRC) layer. Furthermore, the radio resource control unit 1011 generates information that is arranged in each uplink channel and outputs the generated information to the transmission unit 107.

The resource determination unit 1013 that is included in the higher layer processing unit 101 determines resource elements on which demapping of the downlink physical channel and the downlink physical signal is performed. The resource determination unit 1013 instructs the demapping unit 1055 to de-map (extract) the downlink physical channel and the downlink physical signal from the downlink resource elements through the control unit 103. For example, the resource determination unit 1013 determines the resource elements from which the PDSCH is de-mapped, using any of the examples in FIGS. 10 to 22.

Furthermore, the resource determination unit 1013 determines the resource elements to which the uplink physical channel and the uplink physical signal are mapped. The resource determination unit 1013 instructs the mapping unit 1075 to map the uplink physical channel and the uplink physical signal to uplink resource elements through the control unit 103.

The configuration unit 1015 that is included in the higher layer processing unit 101 manages various pieces of configuration information of the mobile station device 1 itself. For example, the configuration unit 1015 performs various configurations according to the higher-layer signal received from the base station device 3.

Based on the control information from the higher layer processing unit 101, the control unit 103 generates a control signal for performing control of the reception unit 105 and the transmission unit 107. The control unit 103 outputs the generated control signal to the reception unit 105 and the transmission unit 107 and performs the control of the reception unit 105 and the transmission unit 107.

In accordance with a control signal, which is input from the control unit 103, the reception unit 105 separates, demodulates, and decodes a receive signal that is received from the base station device 3 through the transmit and receive antenna 109, and outputs the resulting information to the higher layer processing unit 101.

The radio reception unit 1057 converts (down-converts) a downlink signal received through the transmit and receive antenna unit 109 into an intermediate frequency, removes unnecessary frequency components, controls an amplification level in such a manner as to suitably maintain a signal level, performs orthogonal demodulation based on an in-phase component and an quadrature component of the received signal, and converts the resulting orthogonally-demodulated analog signal into a digital signal. The radio reception unit 1057 removes a portion equivalent to a guard interval (GI) from the digital signal that results from the conversion, performs Fast Fourier Transform (FFT) on the signal from which the guard interval is removed, and extracts a signal in the frequency domain.

The demapping unit 1055 separates the extracted signal into the PHICH, the PDCCH, the EPDCCH, the PDSCH, and the downlink reference signal. Furthermore, the demapping unit 1055 performs compensation of channels, that is, the PHICH, the PDCCH, the EPDCCH, and the PDSCH, from a channel estimate, which is input from the channel measurement unit 1059. Furthermore, the demapping unit 1055 outputs the separated downlink reference signals that result from the separation to the channel measurement unit 1059.

The demodulation unit 1053 multiplies the PHICH by a corresponding code for composition, performs demodulation in compliance with a Binary Phase Shift Keying (BPSK) modulation scheme on the resulting composite signal, and outputs a result of the demodulation to the decoding unit 1051. The decoding unit 1051 decodes the PHICH intended for the mobile station device 1 itself, and outputs the HARQ indicator that results from the decoding to the higher layer processing unit 101.

The demodulation unit 1053 performs demodulation on the PDSCH in compliance with the modulation scheme notified with the downlink grant, such as Quadrature Phase Shift keying (QPSK), 16 Quadrature Amplitude Modulation (QAM), or 64 QAM, and outputs a result of the demodulation to the decoding unit 1051. The decoding unit 1051 performs the decoding based on information relating to a coding rate that is notified with the downlink control information, and outputs the downlink data (the transport block) that results from the decoding to the higher layer processing unit 101.

The channel measurement unit 1059 measures a downlink path loss or a channel state from the downlink reference signal, which is input from the demapping unit 1055, and outputs the measured path loss or channel state to the higher layer processing unit 101. Furthermore, the channel measurement unit 1059 calculates a downlink channel estimate from the downlink reference signal and outputs the calculated downlink channel estimate to the demapping unit 1055.

The detection unit 1061 performs detection of the downlink control information with the PDCCH and/or the EPDCCH, and outputs the detected downlink control information to the higher layer processing unit 101. The detection unit 1061 performs demodulation in compliance with the QPSK modulation scheme and decoding on the PDCCH and/or the EPDCCH. The detection unit 1061 attempts to perform blind decoding of the PDCCH and/or the EPDCCH. In a case where the blind decoding succeeds, the detection unit 1061 outputs the downlink control information to the higher layer processing unit 101.

The transmission unit 107 generates the uplink reference signal in accordance with the control signal, which is input from the control unit 103, performs the coding and the modulation on the uplink data (the transport block), which is input from the higher layer processing unit 101, multiplexes the PUCCH, the PUSCH, and the generated uplink reference signal, and transmits a result of the multiplexing to the base station device 3 through the transmit and receive antenna 109.

The coding unit 1071 performs the coding, such as convolutional coding and block coding, on the uplink control information, which is input from the higher layer processing unit 101. Furthermore, the coding unit 1071 performs turbo coding, based on information that is used for the scheduling of PUSCH.

The modulation unit 1073 performs the modulation on coded bits, which are input from the coding unit 1071, in compliance with the modulation scheme notified with the downlink control information, such as BPSK, QPSK, 16 QAM, or 64 QAM, or a modulation scheme that is determined in advance on every channel. Based on the information that is used for the scheduling of the PUSCH, the modulation unit 1073 determines the number of sequences of pieces of data that are spatial multiplexed, maps multiple pieces of uplink data that are transmitted on the same PUSCH, to multiple sequences, by using Multiple Input Multiple Output Spatial Multiplexing (MIMO SM), and performs precoding on the sequences. The modulation unit 1073 spreads the PUCCH using a cyclic shift and/or an orthogonal sequence.

The uplink reference signal generation unit 1079 generates a reference signal sequence based on a Physical layer Cell Identity (PCI) and a virtual cell identity for identifying the base station device 3.

In accordance with the control signal, which is input from the control unit 103, the mapping unit 1075 rearranges modulation symbols of the PUSCH in parallel and then performs Discrete Fourier Transform (DFT) on the rearranged modulation symbols. Furthermore, the mapping unit 1075 multiplexes PUCCH and PUSCH signals and the generated uplink reference signal for every transmit antenna port. To be more precise, the mapping unit 1075 arranges (maps) the PUCCH and PUSCH signals and the generated uplink reference signal in the resource elements for every transmit antenna port.

The radio transmission unit 1077 performs Inverse Fast Fourier Transform (IFFT) on the multiplexed signal, performs the modulation in compliance with an SC-FDMA scheme, adds the guard interval to the SC-FDMA-modulated SC-FDMA symbol, generates a digital signal in a baseband, converts the digital signal in the baseband into an analog signal, generates an in-phase component and an quadrature component in an intermediate frequency from the analog signal, removes frequency components unnecessary for an intermediate frequency band, converts (up-converts) the signal in the intermediate frequency into a high frequency signal, removes unnecessary frequency components, performs power amplification, and outputs a final result to the transmit and receive antenna 109 for transmission.

Figure 24:
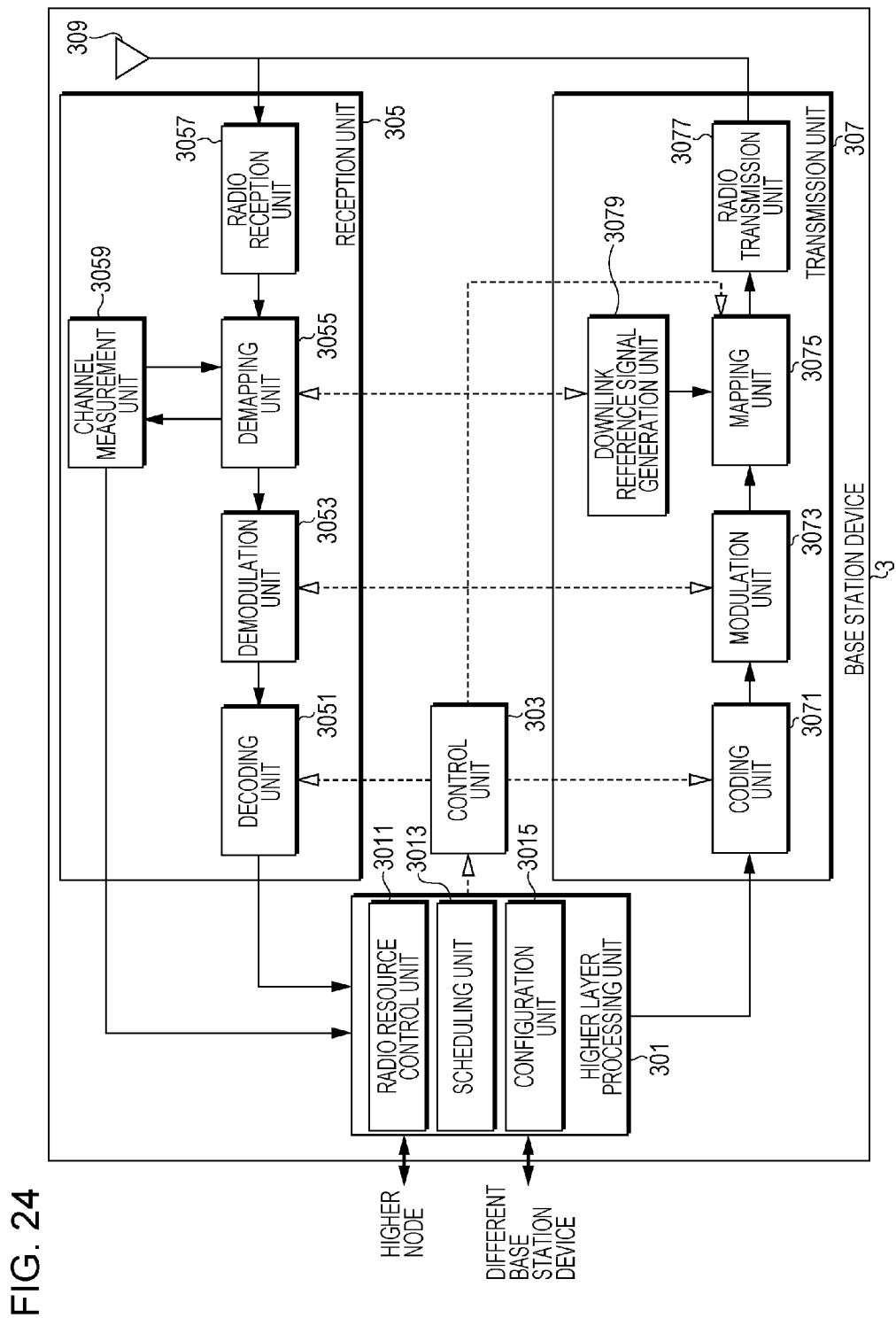
FIG. 24 is a schematic block diagram illustrating a configuration of the base station device 3 according to the present embodiment.

FIG. 24 is a schematic block diagram illustrating a configuration of a configuration of the base station device 3 according to the present embodiment. As is illustrated, the base station device 3 is configured to include a higher layer processing unit 301, a control unit 303, a reception unit 305, a transmission unit 307, and a transmit and receive antenna 309. Furthermore, the higher layer processing unit 301 is configured to include a radio resource control unit 3011, a scheduling unit 3013, and a configuration unit 3015. Furthermore, the reception unit 305 is configured to include a decoding unit 3051, a demodulation unit 3053, a demapping unit 3055, a radio reception unit 3057, and a channel measurement unit 3059. Furthermore, the transmission unit 307 is configured to include a coding unit 3071, a modulation unit 3073, a mapping unit 3075, a radio transmission unit 3077, and a downlink reference signal generation unit 3079.

The higher layer processing unit 301 performs the processing of the Medium Access Control (MAC) layer, the Packet Data Convergence Protocol (PDCP) layer, the Radio Link Control (RLC) layer, and the Radio Resource Control (RRC) layer. Furthermore, the higher layer processing unit 301 generates control information for performing control of the reception unit 305 and the transmission unit 307 and outputs the generated control information to the control unit 303.

The radio resource control unit 3011 that is included in the higher layer processing unit 301 generates, or acquires from a higher node, downlink data (a transport block) that is arranged in the downlink PDSCH, a system information block, an RRC signal, a MAC control element (CE), and the like, and outputs a result of the generation or of the acquirement to the transmission unit 307. Furthermore, the radio resource control unit 3011 manages various pieces of configuration information on each of the mobile station devices 1.

The scheduling unit 3013 that is included in the higher layer processing unit 301 determines a frequency and a subframe and resource elements to which the physical channel (the PDSCH and the PUSCH) is allocated, a coding rate and a modulation scheme of the physical channel (the PDSCH and the PUSCH), transmission power, and the like, from a channel estimate, channel quality, or the like, which is input from the channel measurement unit 3059. The scheduling unit 3013 generates the control information in order to perform the control of the reception unit 305 and the transmission unit 307 based on a result of the scheduling, and outputs the generated information to the control unit 303. Furthermore, the scheduling unit 3013 outputs a result of the scheduling of the physical channel (the PDSCH and the PUSCH) to a control information generation unit 3015.

The scheduling unit 3013 instructs the mapping unit 3075 to map the downlink physical channel and the downlink physical signal to downlink resource elements through the control unit 103. For example, the scheduling unit 3013 determines the resource elements to which the PDSCH is mapped, using any of the examples in FIGS. 10 to 22.

Based on the control information from the higher layer processing unit 301, the control unit 303 generates the control signal for performing the control of the reception unit 305 and the transmission unit 307. The control unit 303 outputs the generated control signal to the reception unit 305 and the transmission unit 307 and performs the control of the reception unit 305 and the transmission unit 307.

In accordance with the control signal, which is input from the control unit 303, the reception unit 305 separates, demodulates, and decodes a receive signal that is received from the mobile station device 1 through the transmit and receive antenna 309, and outputs the resulting information to the higher layer processing unit 301. The radio reception unit 3057 converts (down-converts) an uplink signal received through the transmit and receive antenna unit 309 into an intermediate frequency, removes unnecessary frequency components, controls an amplification level in such a manner as to suitably maintain a signal level, performs orthogonal demodulation based on an in-phase component and a quadrature component of the received signal, and converts the resulting orthogonally-demodulated analog signal into a digital signal.

The radio reception unit 3057 removes a portion corresponding to the guard interval (GI) from the digital signal that results from the conversion. The radio reception unit 3057 performs Fast Fourier Transform (FFT) on the signal from which the guard interval is removed, extracts the signal in the frequency domain, and outputs the resulting signal to the demapping unit 3055.

The demapping unit 3055 separates the signal, which is input from the radio reception unit 3057, into the PUCCH, the PUSCH, and the signal such as the uplink reference signal. Moreover, the separation is performed based on radio resource assignment information that is determined in advance in the radio resource control unit 3011 by the base station device 3, and that is included in the uplink grant notified to each mobile station device 1. Furthermore, the demapping unit 3055 performs the compensation of channels, that is, the PUCCH and the PUSCH, from the channel estimate, which is input from the channel measurement unit 3059. Furthermore, the demapping unit 3055 outputs the separated uplink reference signal to the channel measurement unit 3059.

The demodulation unit 3053 performs Inverse Discrete Fourier Transform (IDFT) on the PUSCH, acquires the modulation symbol, and performs the demodulation of the receive signal with respect to each of the modulation symbols of the PUCCH and the PUSCH, using the modulation scheme determined in advance, such as Binary Phase Shift Keying (BPSK), QPSK, 16 QAM, or 64 QAM, or the modulation scheme that is notified by the base station device 3 itself in advance with the uplink grant to each of the mobile station devices 1. The demodulation unit 3053 separates the modulation symbol of the multiple pieces of uplink data that are transmitted on the same PUSCH by using MIMO SM, based on the number of space-multiplexed sequences that is notified in advance with the uplink grant to each of the mobile station devices 1 and on information indicating the precoding that is performed on the sequences.

The decoding unit 3051 performs the decoding on the demodulated coded bits of the PUCCH and the PUSCH at the coding rate in compliance with a coding scheme determined in advance, which is determined in advance, or is notified in advance with the uplink grant to the mobile station device 1 by the base station device 3 itself, and outputs uplink data and the uplink control information that are decoded to the higher layer processing unit 301. In a case where the PUSCH is retransmitted, the decoding unit 3051 performs the decoding using the coded bits that are input from the higher layer processing unit 301 and that are retained in a HARQ buffer, and the demodulated coded bits. The channel measurement unit 3059 measures the channel estimate, the channel quality, and the like, based on the uplink reference signal, which is input from the demapping unit 3055, and outputs a result of the measurement to the demapping unit 3055 and the higher layer processing unit 301.

The transmission unit 307 generates the downlink reference signal in accordance with the control signal, which is input from the control unit 303, codes and modulates the HARQ indicator, the downlink control information, and the downlink data that are input from the higher layer processing unit 301, multiplexes the PHICH, the PDCCH, the EPDCCH, the PDSCH, and the downlink reference signal, and transmits a result of the multiplexing to the mobile station device 1 through the transmit and receive antenna 309.

The coding unit 3071 performs the coding on the HARQ indicator, the downlink control information, and the downlink data, which are input from the higher layer processing unit 301. When performing the coding, the coding unit 3071 uses the coding scheme that is determined in advance, such as block coding, convolutional coding, or turbo coding, or a coding scheme that is determined by the radio resource control unit 3011. The modulation unit 3073 performs the modulation on the coded bits, which is input from the coding unit 3071. When performing the modulation, the modulation unit 3073 uses the modulation scheme that is determined in advance, such as BPSK, QPSK, 16 QAM, or 64 QAM, or the modulation scheme that is determined by the radio resource control unit 3011.

The downlink reference signal generation unit 3079 generates as the downlink reference signal a sequence that is already known to the mobile station device 1, which is acquired according to a predetermined rule that is determined in advance based on the physical cell identity (PCI) for identifying the base station device 3, and the like. The mapping unit 3075 multiplexes the modulated modulation symbol of each channel and the generated downlink reference signal. To be more precise, the mapping unit 3075 arranges the modulated modulation symbol of each channel and the generated downlink reference signal in the resource elements.

The radio transmitting unit 3077 performs Inverse Fast Fourier Transform (IFFT) on the multiplexed modulation symbol, performs the modulation in compliance with an OFDM scheme, adds the guard interval to the OFDM-modulated OFDM symbol, generates a digital signal in a baseband, converts the digital signal in the baseband into an analog signal, generates an in-phase component and a quadrature component in an intermediate frequency from the analog signal, removes frequency components unnecessary for an intermediate frequency band, converts (up-converts) the signal in the intermediate frequency into a high frequency signal, removes unnecessary frequency components, performs power amplification, and outputs a final result to the transmit and receive antenna 309 for transmission.

As described above, the mobile station device 1 and the base station device 3 according to the present invention determine the starting position of the resource element to which the PDSCH is mapped in the first slot in a certain subframe, based on at least one of the transmission mode for the transmission on the PDSCH, the DCI format that is used for scheduling of the PDSCH, the downlink physical channel that is used for the transmission of the PDSCH, the search space on which the DCI format is detected, and the antenna port that is used for the transmission of the PDSCH.

Accordingly, the base station device 3 and the terminal device 1 can determine the starting position of the resource element to which the PDSCH is mapped and can perform efficient communication.

A program running on the base station device 3 and the mobile station device 1 according to the present invention may be a program (a program for causing a computer to operate) that controls a CPU (Central Processing Unit) and the like in such a manner as to realize the functions according to the embodiments of the present invention, which are described above. Then, the information that is handled in these devices is temporarily stored in a Random Access Memory (RAM) while being processed. Thereafter, the information is stored in various types of ROM such as a Flash Read Only Memory (ROM) or a Hard Disk Drive (HDD) and is read by the CPU to be modified or rewritten if need be.

Moreover, one portion of each of the mobile station device 1 and the base station device 3 according to the embodiments, which are described above, may be realized by the computer. In that case, this one portion may be realized by recording a program for realizing such control functions on a computer-readable medium and causing a computer system to read the program stored on the recording medium for execution.

Moreover, the "computer system" here is defined as a computer system built into the mobile station device 1 or the base station device 3 and as including an OS or hardware components such as a peripheral device. Furthermore, the "computer-readable recording medium" refers to a portable medium such as a flexible disk, a magneto-optical disk, a ROM, and a CD-ROM, and a storage device such as a hard disk that is built into the computer system.

Moreover, the "computer-readable recording media" may include a medium that dynamically retains the program for a short period of time, such as a communication line that is used when transmitting the program over a network such as the Internet or over a communication circuit such as a telephone circuit and a medium that retains the program for a constant period of time, such as a volatile memory within the computer system, which functions as a server or a client in a case of including the program dynamically. Furthermore, the program may be one for realizing some of the functions described above and additionally may be one that can realize the functions described above in combination with a program that is already recorded on the computer system.

Furthermore, the base station device 3 according to the embodiments, which are described above, can be realized as an aggregation (a device group) that is configured from multiple devices. Each device that makes up the device group may be equipped with some portion of or all portions of each function or each functional block of the base station device 3 according to the embodiment, which is described. The device group itself may have each general function or each general functional block of the base station device 3. Furthermore, the mobile station device 1 according to the embodiments, which are described, can also communicate with the base station device as the aggregation.

Furthermore, some portions of or all portions of the mobile station device 1 and the base station device 3 according to the embodiment, which is described, may be realized as an LSI that is a typical integrated circuit and be realized as a chip set. Each functional block of each of the mobile station device 1 and the base station device 3 may be individually realized as a chip, and some of, or all of the functional blocks may be integrated into a chip. Furthermore, a circuit integration technique is not limited to the LSI, and an integrated circuit for the functional block may be realized with a dedicated circuit or a general-purpose processor. Furthermore, if with advances in a semiconductor technology, a circuit integration technology with which an LSI is replaced appears, it is also possible to use an integrated circuit to which such a technology is applied.

Furthermore, according to the embodiments, as described above, the mobile station device is described as one example of a terminal device or a communication device, but the present invention is not limited to this, and can be applied also to a terminal apparatus or a communication apparatus, such as a fixed-type electronic apparatus that is installed indoors or outdoors, or a stationary-type electronic apparatus, for example, an AV apparatus, a kitchen apparatus, a cleaning or washing machine, an air-conditioning apparatus, office equipment, a vending machine, and other household apparatuses.

The embodiments of the invention are described in detail above referring to the drawings, but the specific configuration is not limited to the embodiments and includes an amendment to a design that falls within a scope that does not depart from the gist of the present invention. Furthermore, various modifications are possible within the scope of the present invention defined by claims, and embodiments that are made by suitably combining technical means disclosed according to the different embodiments are also included in the technical scope of the present invention. Furthermore, a configuration in which a constituent element that achieves the same effect is substituted for the constituent element that is described according to each of the embodiments is also included in the technical scope of the present invention.

DESCRIPTION OF REFERENCE NUMERALS 1 (1A, 1B, 1C) MOBILE STATION DEVICE
3 BASE STATION DEVICE
101 HIGHER LAYER PROCESSING UNIT
103 CONTROL UNIT
105 RECEPTION UNIT
107 TRANSMISSION UNIT
109 TRANSMIT AND RECEIVE ANTENNA
1011 RADIO RESOURCE CONTROL UNIT
1013 RESOURCE DETERMINATION UNIT
1015 CONFIGURATION UNIT
1051 DECODING UNIT
1053 DEMODULATION UNIT
1055 DEMAPPING UNIT
1057 RADIO RECEPTION UNIT
1059 CHANNEL MEASUREMENT UNIT
1061 DETECTION UNIT
1071 CODING UNIT
1073 MODULATION UNIT
1075 MAPPING UNIT
1077 RADIO TRANSMISSION UNIT
1079 UPLINK REFERENCE SIGNAL GENERATION UNIT
301 HIGHER LAYER PROCESSING UNIT
303 CONTROL UNIT
305 RECEPTION UNIT
307 TRANSMISSION UNIT
309 TRANSMIT AND RECEIVE ANTENNA
3011 RADIO RESOURCE CONTROL UNIT
3013 SCHEDULING UNIT
3015 CONFIGURATION UNIT
3051 DECODING UNIT
3053 DEMODULATION UNIT
3055 DEMAPPING UNIT
3057 RADIO RECEPTION UNIT
3059 CHANNEL MEASUREMENT UNIT
3071 CODING UNIT
3073 MODULATION UNIT
3075 MAPPING UNIT
3077 RADIO TRANSMISSION UNIT
3079 DOWNLINK REFERENCE SIGNAL GENERATION UNIT

The invention claimed is:

1. A user equipment (UE) comprising:
a configuration processor programmed/configured to configure a parameter set on the basis of higher layer signaling; and
a decoder programmed/configured to decode a first physical downlink shared channel (PDSCH) and a second PDSCH in a serving cell;
wherein
in a resource element mapping for the first PDSCH and the second PDSCH, positions of cell-specific reference signals are given with at least a frequency shift of the cell-specific reference signals, and
in a case that the UE is configured in transmission mode 10 for the serving cell, to decode the first PDSCH or the second PDSCH according to a detected PDCCH/EPDCCH with DCI format 1A:
for the first PDSCH transmission on antenna port 7, the decoder uses the parameter set for determining RE mapping for the first PDSCH and the frequency shift is derived from a first parameter of the parameter set; and
for the second PDSCH transmission on antenna port 0-3, the frequency shift is derived from a physical cell identity of the serving cell.

2. The user equipment (UE) of claim 1, wherein
the decoder is further programmed/configured to decode a third PDSCH, and
to decode the third PDSCH according to a detected PDCCH/EPDCCH with DCI format 1A with CRC scrambled with SPS C-RNTI, the decoder uses the first parameter set for determining the third PDSCH RE mapping, and the frequency shift is derived from the first parameter of the parameter set.

3. The user equipment (UE) of claim 1, wherein
the parameter set further includes information indicating the number of cell-specific reference signal ports.

4. The user equipment (UE) of claim 1, wherein
the parameter set further includes information indicating Multimedia Broadcast and Multicast Service Single-Frequency Network (MBSFN) subframe(s).

5. The user equipment (UE) of claim 1, wherein
the transmission mode 10 is a transmission mode in which a plurality of Channel State Information Reference Signals (CSIRSs) can be configured.

6. The user equipment (UE) of claim 1, wherein
the parameter set is a parameter set among up to 4 parameter sets,
the parameter sets are configured by higher layer signaling, and
an identity of the parameter set is one.

7. The user equipment (UE) of claim 1, wherein
the DCI format 1A is a DCI format which can be used in any of transmission modes.

8. A method comprising:
a step of configuring a parameter set on the basis of higher layer signaling;
a step of decoding either a first physical downlink shared channel (PDSCH) or a second PDSCH in a serving cell;
wherein
in a resource element mapping for the first PDSCH and the second PDSCH, positions of cell-specific reference signals are given with at least a frequency shift of the cell-specific reference signals, and
in a case that the UE is configured in transmission mode 10 for the serving cell, to decode the first PDSCH or the second PDSCH according to a detected PDCCH/EPDCCH with DCI format 1A:
for the first PDSCH transmission on antenna port 7, the parameter set is used for determining RE mapping for the first PDSCH and the frequency shift is derived from a first parameter of the parameter set; and
for the second PDSCH transmission on antenna port 0-3, the frequency shift is derived from a physical cell identity of the serving cell.

9. A circuit programmed/configured to perform:
configuring a parameter set on the basis of higher layer signaling;
decoding either a first physical downlink shared channel (PDSCH) or a second PDSCH in a serving cell;
wherein
in a resource element mapping for the first PDSCH and the second PDSCH, positions of cell-specific reference signals are given with at least a frequency shift of the cell-specific reference signals, and
in a case that the UE is configured in transmission mode 10 for the serving cell, to decode the first PDSCH or the second PDSCH according to a detected PDCCH/EPDCCH with DCI format 1A:

for the first PDSCH transmission on antenna port 7, the parameter set is used for determining RE mapping for the first PDSCH and the frequency shift is derived from a first parameter of the parameter set; and for the second PDSCH transmission on antenna port 0-3, the frequency shift is derived from a physical cell identity of the serving cell.

10. A base station device comprising:

a transmitter processor programmed/configured to transmit:

a higher layer signaling indicating a parameter set; and a first physical downlink shared channel (PDSCH) and a second PDSCH in a serving cell;

wherein in a resource element mapping for the first PDSCH and the second PDSCH, positions of cell-specific reference signals are given with at least a frequency shift of the cell-specific reference signals, and in a case that transmission mode 10 is configured for the serving cell, to transmit the first PDSCH or the second PDSCH according to a PDCCH/EPDCCH with DCI format 1A:

for the first PDSCH transmission on antenna port 7, the transmitter uses the parameter set for determining RE mapping for the first PDSCH and the frequency shift is derived from a first parameter of the parameter set; and for the second PDSCH transmission on antenna port 0-3, the frequency shift is derived from a physical cell identity of the serving cell.

11. The base station device of claim 10, wherein the transmitter is further programmed/configured to transmit a third PDSCH, and to transmit the third PDSCH according to a detected PDCCH/EPDCCH with DCI format 1A with CRC scrambled with SPS C-RNTI, the transmitter uses the first parameter set for determining the third PDSCH RE mapping, and the frequency shift is derived from the first parameter of the parameter set.

12. The base station device of claim 10, wherein the parameter set further includes information indicating the number of cell-specific reference signal ports.

13. The base station device of claim 10, wherein the parameter set further includes information indicating Multimedia Broadcast and Multicast Service Single-Frequency Network (MBSFN) subframe(s).

14. The base station device of claim 10, wherein the transmission mode 10 is a transmission mode in which a plurality of Channel State Information Reference Signals (CSIRSs) can be configured.

15. The base station device of claim 10, wherein the parameter set is a parameter set among up to 4 parameter sets, the parameter sets are configured by higher layer signaling, and an identity of the parameter set is one.

16. The base station device of claim 10, wherein the DCI format 1A is a DCI format which can be used in any of transmission modes.

17. A method comprising:

a step of transmitting a higher layer signaling indicating a parameter set;

a step of transmitting either a first physical downlink shared channel (PDSCH) or a second PDSCH in a serving cell;

wherein in a resource element mapping for the first PDSCH and the second PDSCH, positions of cell-specific reference signals are given with at least a frequency shift of the cell-specific reference signals, and in a case that transmission mode 10 is configured for the serving cell, to transmit the first PDSCH or the second PDSCH according to a PDCCH/EPDCCH with DCI format 1A:

for the first PDSCH transmission on antenna port 7, the parameter set is used for determining RE mapping for the first PDSCH and the frequency shift is derived from a first parameter of the parameter set; and for the second PDSCH transmission on antenna port 0-3, the frequency shift is derived from a physical cell identity of the serving cell.

18. A circuit programmed/configured to perform:

transmitting a higher layer signaling indicating a parameter set;

transmitting either a first physical downlink shared channel (PDSCH) or a second PDSCH in a serving cell;

wherein in a resource element mapping for the first PDSCH and the second PDSCH, positions of cell-specific reference signals are given with at least a frequency shift of the cell-specific reference signals, and in a case that transmission mode 10 is configured for the serving cell, to transmit the first PDSCH or the second PDSCH according to a PDCCH/EPDCCH with DCI format 1A:

for the first PDSCH transmission on antenna port 7, the parameter set is used for determining RE mapping for the first PDSCH and the frequency shift is derived from a first parameter of the parameter set; and for the second PDSCH transmission on antenna port 0-3, the frequency shift is derived from a physical cell identity of the serving cell.

* * * * *